United States Patent
Bland

(10) Patent No.: US 11,174,185 B2
(45) Date of Patent: Nov. 16, 2021

(54) METHODS AND SYSTEMS FOR MULTI-STAGE ENCAPSULATION OF WASTES AND PRODUCTION THEREOF INTO AGGREGATE PRODUCTS

(71) Applicant: Ash Management Engineering, Inc., Laramie, WY (US)

(72) Inventor: Alan E. Bland, Laramie, WY (US)

(73) Assignee: Ash Management Engineering, Inc., Laramie, WY (US)

(*) Notice: Subject to any disclaimer, the term of this patent is extended or adjusted under 35 U.S.C. 154(b) by 0 days.

(21) Appl. No.: 17/054,480

(22) PCT Filed: May 10, 2019

(86) PCT No.: PCT/US2019/031861
§ 371 (c)(1),
(2) Date: Nov. 10, 2020

(87) PCT Pub. No.: WO2019/217919
PCT Pub. Date: Nov. 14, 2019

(65) Prior Publication Data
US 2021/0188706 A1    Jun. 24, 2021

Related U.S. Application Data

(60) Provisional application No. 62/669,861, filed on May 10, 2018.

(51) Int. Cl.
| | | |
|---|---|---|
| *C04B 18/02* | (2006.01) | |
| *C04B 18/04* | (2006.01) | |
| *C04B 28/04* | (2006.01) | |
| *C04B 20/12* | (2006.01) | |
| *C02F 11/00* | (2006.01) | |
| *C04B 20/10* | (2006.01) | |
| *C04B 111/60* | (2006.01) | |
| *C02F 103/10* | (2006.01) | |
| *C04B 111/00* | (2006.01) | |
| *C04B 111/52* | (2006.01) | |
| *C02F 11/122* | (2019.01) | |
| *C02F 11/147* | (2019.01) | |

(52) U.S. Cl.
CPC .......... *C02F 11/008* (2013.01); *C04B 18/021* (2013.01); *C04B 18/049* (2013.01); *C04B 20/1077* (2013.01); *C04B 20/126* (2013.01); *C04B 28/04* (2013.01); *C02F 11/122* (2013.01); *C02F 11/147* (2019.01); *C02F 2103/10* (2013.01); *C04B 2111/0075* (2013.01); *C04B 2111/52* (2013.01); *C04B 2111/60* (2013.01)

(58) Field of Classification Search
CPC ....... C04B 18/021; C04B 18/18; C04B 18/06; C04B 18/061; C04B 18/062; C04B 18/065; C04B 18/08; C04B 18/24; C04B 18/0463; C04B 18/0472; C04B 18/049; C04B 20/1077; C04B 20/126; C04B 26/26; C04B 28/04; C04B 40/006; C04B 2103/008; C04B 2103/0093; C04B 2103/20; C04B 2103/304; C02F 11/008
See application file for complete search history.

(56) References Cited

U.S. PATENT DOCUMENTS

| | | |
|---|---|---|
| 3,765,920 A | 10/1973 | Humphrey |
| 3,959,172 A | 5/1976 | Brownell et al. |
| 4,206,080 A | 6/1980 | Sato et al. |
| 4,234,632 A | 11/1980 | Lubowitz |
| 4,250,134 A | 2/1981 | Minnick |
| 4,344,796 A | 8/1982 | Minnick |
| 4,539,119 A | 9/1985 | Cann |
| 4,687,373 A | 8/1987 | Falk et al. |
| 4,772,330 A | 9/1988 | Kobayashi et al. |
| 4,880,582 A | 11/1989 | Spanjer et al. |
| 5,002,611 A | 3/1991 | Rademaker |
| 5,037,286 A | 8/1991 | Roberts |
| 5,100,473 A | 3/1992 | Mitsuda et al. |
| 5,152,837 A | 10/1992 | Rademaker |
| 5,196,620 A | 3/1993 | Gustin |
| 5,211,750 A | 5/1993 | Smith et al. |
| 5,286,430 A | 2/1994 | Downs et al. |
| 5,342,442 A | 8/1994 | Nechvatal et al. |
| 5,364,572 A | 11/1994 | Wu et al. |
| 5,669,969 A | 9/1997 | Meade et al. |
| 5,681,384 A | 10/1997 | Liskowitz |
| 6,334,895 B1 | 1/2002 | Bland |

(Continued)

FOREIGN PATENT DOCUMENTS

| | | |
|---|---|---|
| CN | 101314536 A | 12/2008 |
| WO | 2019217919 A1 | 11/2019 |

OTHER PUBLICATIONS

Dutre' et al, Solidification/stabilisation of hazardous arsenic containing waste from a copper refining process, Department of Chemical Engineering, Katholieke Universiteit, Leuven, W. de Croylaan 46, 3001 Heverlee, Belgium, Journal of Hazardous Materials 40 (1995) 55-68, received Nov. 5, 1993; accepted in revised form Jul. 8, 1994, 14 pages.
R. Duval et al, Influence of Silica Fume on the Workability and Compressive Strength of High-Performance Concretes, Cement and Concrete Research, vol. 28, No. 4, 533-547, Jan. 8, 1998, 15 pages.
Edmeades et al, Cement Admixtures, 65 pages. Date unknown.
Environmental Protection Agency (EPA), Clarification of the Regulatory Determination for Wastes From the Exploration, Development and Production of Crude Oil, Natural Gas and Geothermal Energy, Federal Register vol. 58, No. 53, Mar. 22, 1993, 12 pages.

(Continued)

*Primary Examiner* — Anthony J Green
(74) *Attorney, Agent, or Firm* — Santangelo Law Offices, P.C.

(57) ABSTRACT

Embodiments of the present invention may provide encapsulation of waste (2) materials in a first (1), double (5), triple (7), or even quadruple (44) encapsulation. Encapsulation may include waste (2), ash (4), Portland cement (3), water, chemicals, or the like. Agglomerates formed perhaps with high energy mixing may be processed, cured, or the like.

20 Claims, 11 Drawing Sheets

(56) References Cited

U.S. PATENT DOCUMENTS

| | | | |
|---|---|---|---|
| 6,416,691 | B1 | 7/2002 | Pildysh |
| 6,517,631 | B1 | 2/2003 | Bland |
| 6,808,562 | B2 | 10/2004 | Bland |
| 6,936,087 | B2 | 8/2005 | Wommack |
| 7,413,383 | B2 | 8/2008 | Adams |
| 7,754,169 | B2 | 7/2010 | Constantz et al. |
| 8,303,823 | B1 | 11/2012 | Skandan |
| 8,741,054 | B2 | 6/2014 | Fried |
| 2005/0059849 | A1 | 3/2005 | Liu |
| 2008/0237141 | A1 | 10/2008 | Kerfoot |
| 2009/0245939 | A1 | 10/2009 | Burns et al. |
| 2013/0243674 | A1 | 9/2013 | Constantz et al. |
| 2013/0248455 | A1 | 9/2013 | Blumenschein et al. |
| 2014/0261089 | A1 | 9/2014 | Bisque et al. |

OTHER PUBLICATIONS

Fitzgerald, M, Common Misconceptions About the RCRA Subtitle C Exemptions for Wastes from Crude Oil and Natural Gas Exploration, Sep. 1-12, 1990, 12 pages.

Fuessle et al, Stabilization of Arsenic and Barium-Rich Glass Manufacturing Waste, Journal of Environmental Engineering, Mar. 2000, 7 pages.

Fuessle et al, Stabilization of Arsenite Wastes with Prior Oxidation, J. Environ. Eng., 2004, 130(9): 1063-1066, 4 pages.

Garcia et al, Low-grade MgO used to stabilize heavy metals in highly contaminated soils, Chemosphere 56 (2004) 481-491, www.elsevier.com/locate/chemosphere, Apr. 21, 2004, 11 pages.

Gartner et al, Hydration of Portland Cement, Structure and Performance of Cement, 2002, 58 pages.

Georgiou et al, Geotechnical Characteristics and Landfilling of CFBC Residue, Fluidized Bed Combustion ASME 1991, 8 pages.

Georgiou et al, Laboratory Evaluation of a Low Sulphur Coal CFBC Residue for Use as a Structural Fill, Fluidized Bed Combustion—vol. 1 ASME 1993, 11 pages.

Ghosh et al, Hydraulic Conductivity and Leachate Characteristics of Stabilized Fly Ash, J. Environ. Eng., 1998, 124(9): 812-820, 9 pages.

Gitipour et al, The Use of Modified Bentonite for Removal of Aromatic Organics from Contaminated Soil, Journal of Colloid and Interface Science 196, 191-198 (1997) Article No. CS975063, Jul. 1, 1997, 8 pages.

F.P. Glasser, Fundamental aspects of cement solidification and stabilisation, Journal of Hazardous Materials 52 (1997) 15 1-170, 1997, 20 pages.

Gong et al, Evaluation of organics leaching from solidified/stabilized hazardous wastes using a powder reactivated carbon additive, Environmental Technology, ISSN: 0959-3330 (Print) 1479-487X (Online) Journal homepage: http://www.tandfonline.com/loi/tent20, Dec. 17, 2008, 12 pages.

Halim et al, Implications of the structure of cementitious wastes containing Pb(II), Cd(II), As(V), and Cr(VI) on the leaching of metals, Cement and Concrete Research 34 (2004) 1093-1102, Nov. 24, 2003, 10 pages.

Hay et al, Lightweight Aggregate Production and Use in Florida, EPRI Electric Power Research Institute, Prepared by American Coal Ash Association Washington, D.C., EPRI GS-7162 vol. 1 Project 3176 Proceedings Jan. 1991, 11 pages.

Hay et al, AARDALITE An Economical Lightweight Aggregate from Fly Ash, Tacks BQQK-Q Book/Journal Title proceedings: Eighth International Ash Utilization Symposium / AARDALITE An Economical Lightweight Aggregate from Fly AshProceedings: Eighth International Ash Utilization Symposium I, Oct. 28, 1987, 8 pages.

Hills et al, The Effect of Alite Content on 'Portland' Cement Solidified Waste Forms, Environmental Technology, ISSN: 0959-3330 (Print) 1479-487X (Online) Journal homepage: http://www.tandfonline.com/loi/tent20, May 11, 2010, 12 pages.

Iribane et al, Proceedings of the 1993 International Conference on Fluidized Bed Combustion : FBC's role in the world energy mix, 12th FBC, San Diego, California May, The Phase Analysis of Coal Combustion Residual, May 9-13, 1993, 8 pages.

Jing et al, Immobilization Mechanisms of Arsenate in Iron Hydroxide Sludge Stabilized with Cement, Center for Environmental Engineering, Stevens Institute of Technology, Hoboken, New Jersey 07030, Environmental Science & Technology / vol. 37, No. 21, 2003, 7 pages.

D. L. Kantro, Tricalcium Silicate Hydration in the Presence of Various Salts, Copyright 1975 by ASTM International, 10 pages.

Kashi et al, Innovative lightweight Synthetic Aggregates Developed from Coal Fly Ash, Proceedings : 13th International Symposium on Use and Management of Coal Combustion Products (CCPs), Jan. 11-15, 1999, 17 pages.

Kulatos et al, Adsorption of surfactants on unburned carbon in fly ash and development of a standardized foam index test, Cement and Concrete Research 33 (2003) 2091-2099, 9 pages.

Leist et al, The fixation and leaching of cement stabilized arsenic, Waste Management 23 (2003) 353-359, Jul. 19, 2002, 7 pages.

Li et al, Heavy metal speciation and leaching behaviors in cement based solidified/stabilized waste materials, Journal of Hazardous Materials A82 (2001) 215-230, Dec. 5, 2000, 16 pages.

Lo et al, Modified Clays for Waste Containment and Pollutant Attenuation, Journal of Environmental Engineering / Jan. 1997, 8 pages.

B. G. Lottermoser et al, Mobilization of heavy metals from historical smelting slag dumps, north Queensland, Australia, Mineralogical Magazine, Aug. 2002, vol. 66(4), pp. 475-490, 16 pages.

Macias et al, Impact of Carbon Dioxide on the Immobilization Potential of Cemented Wastes: Chromium, Cement and Concrete Research, vol. 27, No. 2, pp. 215-225, 1997, 11 pages.

Miller et al, Treatment of Arsenic-Contaminated Soils. II: Treatability Study and Remediation, Journal of Environmental Engineering / Nov. 2000, 9 pages.

Mollah et al, An infared spectroscopic examination of cement-based solidification/stabilization systems—Portland types V and IP with zinc, Journal of Environmental Science & Health Part A, ISSN: 1077-1204 (Print) (Online) Journal homepage: http://www.tandfonline.com/loi/lesa19, Dec. 15, 2008, 19 pages.

Mollah et al, The Interfacial Chemistry of Solidification/Stabilization of Metals in Cement and Pozzolanic Material Systems, Waste Management, vol. 15, No. 2, pp. 137-148, Jan. 30, 1995, 12 pages.

Montgomery et al, Treatment of Organic-Contaminated Industrial Wastes Using Cement-Based Stabilization/Solidification— I. Microstructural Analysis of Cement-Organic Interactions, Waste Management & Research 9, 103-111, Aug. 18, 1990, 9 pages.

Moon et al, Arsenic immobilization by calcium-arsenic precipitates in lime treated soils, Science of the Total Environment 330 (2004) 171-185, Mar. 18, 2004, 15 pages.

Mulder, et al, Artificial Gravel as a Gravel Substitute in Asphaltic Concrete, TNO-division Environment and Energy, 11 pages. Date unknown.

Nechvatal et al, Manufacturing Lightweight Aggregate from Various Fly Ashes and Studges Using the Minergy Process, Proceedings : 12th International Symposium on Coal Combustion By-Product (CCB) Management and Use, Jan. 26-30, 1997, Orlando, Florida, Jan. 26-30, 1997, 12 pages.

Palfy et al, Processing of arsenic waste by precipitation and solidification, Waste Management 19 (1999) 55-59, Jan. 6, 1998, 5 pages.

Paria et al, Solidification-Stabilization of Organic and Inorganic Contaminants Using Portland Cement: a Literature Review, Apr. 30, 2006, 39 pages.

Park et al, Hydration and solidification of hazardous wastes containing heavy metals using modified cementitious materials, Cement and Concrete Research 30 (2000) 429-435, Dec. 17, 1995, 7 pages.

Ren, J., 2015, Laboratory Evaluation of Freezing-Thawing Resistance of Aggregate for concrete pavement using Iowa Pore Index Tests, Masters Thesis, Iowa State University, 146 pages. 2015.

Ross et al, Field Demonstiation of Fluidized Bed Combustion Residue Management, FBC—technology for today: proceedings of the 1989 International Conference on Fluidized Bed Combustion, held in San Francisco, California, Apr. 30, 1989, 7 pages.

(56) References Cited

OTHER PUBLICATIONS

Rukavina, Mitchell, CEMENT + ASH—New Aggregate, Rock Products. 93.8 (Aug. 1990): p53+, Copyright: Copyright 1990 Mining Media, Inc http://www.mining-media.com, Aug. 1990, 2 pages.

Seco et al, A study of the leachate toxicity of metal-containing solid wastes using Daphnia magna, Ecotoxicology and Environmental Safety 56 (2003) 339-350, Jun. 2, 2003, 12 pages.

Shastry et al, Waste Water Treatment Using Eco Friendly Oxidising Agent Fe (VI), Hydrology Current Research, 2011, 2:5 DOI, 10.4172/2157-75B7.1000123 Department of Chemistry, SEA College of engineering and Technology, Bangalore, India, vol. 2 • Issue 5, 2011, 4 pages.

Shigetomi et al, Characteristics of High Performance Aggregate Produced From Fly Ash using a Rotary Kiln and Properties of Concrete Used This Aggregate, Proceedings : 13th International Symposium on Use and Management of Coal Combustion Products (CCPs), Jan. 11-15, 1999, 14 pages.

Shih et al, Arsenic contaminated site at an abandoned copper smelter plant: waste characterization and solidification/stabilization treatment, Chemosphere 53 (2003) 691-703, Apr. 30, 2003, 13 pages.

Sone et al, Characteristics of Concrete Containing Artificial Coarse Aggregate using Coal Ash as Raw Material, Proceedings, 11th International Symposium on Use & Management of Coal Combustion Byproducts (CCBs): Jan. 15-19, 1995, Orlando, Florida, 19 pages.

Akhter et al, Solidification/ stabilization of arsenic salts: Effects of long cure times, Journal of Hazardous Materials 52 (1997) 247-264, 18 pages.

Al-Tabba et al, Part III Binders and technologies—applications, Proc. of the International Conf. on Stabilisation/Solidification Treatment and Remediation, © 2005 Taylor & Francis Group, London, ISBN 04 1537 460 X, 21 pages.

Adams, Thomas H., Coal Ash Recycling Reaches Record 56 Percent Amid Shifting Production and Use Patterns, American Coal Ash Association, American Coal Ash Association, 4 pages.

Andersen, P. J., The Effect of Superplasticizers and Air-Entraining Agents on the Zeta Potential of Cement Particles, The Engineering Academy of Denmark Chemical Department, Bygning 375 2800 Lyngby, Denmark*, Cement and Concrete Research. vol. 16, pp. 931-940, 1986, printed in the USA. 0008-8846/86 $3.00+00 Copyright (c) 1986 Pergamon Journals, Ltd, 10 pages.

Anthony, et al, Study of Hydration During Curing of Residues from Coal Combustion with Limestone Addition, Natural Resouices Canada Ottawa, Ontario Canada, University of Toronto, Library of Congress Catalog No. 87-70969, 1995, 11 pages.

ICF Consulting, API Overview of Exploration & Production Waste Volumes & Watse Management Practices in the United States, May 2000, 82 pages.

API Survey of Onshore and Costal Exploration & Production Operations for 1995, 30 pages.

ASTM, Standard Specification for Mineral Filler For Bituminous Paving Mixtures1, Designation: D242/D242M-09 (Reapproved 2014), Copyright by ASTM Int'l (all rights reserved); Wed Mar. 20, 16:20:24 EDT 2019 Downloaded/printed by University of Wyoming Libraries, 2 pages.

ASTM, Standard Test Method for Soundness of Aggregates by Use of Sodium Sulfate or Magnesium Sulfate1, Designation: C88-13, Copyright by ASTM Int'l (all rights reserved); Fri Aug. 17, 16:34:59 EDT 2018 Downloaded/printed by University of Wyoming Libraries, 5 pages.

ASTM, Standard Specification for Coal Fly Ash and Raw or Calcined Natural Pozzolan for Use in Concrete, Designation: C618-19, Copyright by ASTM Int'l (all rights reserved); Wed Mar. 20 16:22:34 EDT 2019 Downloaded/printed by University of Wyoming Libraries, 5 pages.

ASTM, Standard Specification for Concrete Aggregates1, Designation: C33/C33M-08, Copyright by ASTM Int'l (all rights reserved); Fri Aug. 17, 16:37:04 EDT 2018 Downloaded/printed by University of Wyoming Libraries, 11 pages.

ASTM, Standard Test Methods for Compressive Strength of Cylindrical Concrete Specimens 04.02, Designation: C39/C39M-09a, Copyright by ASTM Int'l (all rights reserved); Mon Aug. 13, 17:48:12 EDT 2018 Downloaded/printed by University of Wyoming Libraries, 7 pages.

ASTM, Standard Test Method for Relative Density (Specific Gravity) and Absorption of Coarse Aggregate1, Designation: C127-15, Copyright by ASTM Int'l (all rights reserved); Mon Mar. 18, 18:15:17 EDT 2019 Downloaded/printed by University of Wyoming Libraries, 5 pages.

ASTM, Standard Specification for Lightweight Aggregates for Concrete Masonry Units1, Designation: C331-05, Copyright by ASTM Int'l (all rights reserved); Wed Aug. 15, 10:48:16 EDT 2018 Downloaded/printed by University of Wyoming Libraries, 4 pages.

ASTM, Standard Test Method for Measurement of Rate of Absorption of Water by Hydraulic-Cement Concretes1, Designation: C1585-13, Copyright by ASTM Int'l (all rights reserved); Mon Mar. 18, 18:13:44 EDT 2019 Downloaded/printed by University of Wyoming Libraries, 6 pages.

ASTM, Standard Specification for Mixing Water Used in the Production of Hydraulic Cement Concrete1, Designation: C1602/C1602M-18, Copyright by ASTM Int'l (all rights reserved); Wed Mar. 20, 16:18:12 EDT 2019 Downloaded/printed by University of Wyoming Libraries, 5 pages.

ASTM, Standard Test Methods for Freezing and Thawing Compacted Soil-Cement Mixtures, Designation: 560-89, Soil-Cement Laboratory Handbook, Portland Cement Assn., 1971, 6 pages.

ASTM, Standard Test Methods for Laboratory Compaction Characteristics of Soil Using Standard Effort (12,400 ft-lbf/ft3 (600 kN-m/m3))1, Designation: D698-12'2, Copyright by ASTM Int'l (all rights reserved); Mon Aug. 13, 18:00:53 EDT 2018 Downloaded/printed by University of Wyoming Libraries, 13 pages.

ASTM, Standard Test Methods for Laboratory Compaction Characteristics of Soil Using Standard Effort (12 400 ft-lbf-ft3 (600 kN-m-m3))1 Designation: D698-07'1, Copyright by ASTM Int'l (all rights reserved); Thu Aug. 16, 13:20:08 EDT 2018 Downloaded/printed by University of Wyoming Libraries, 13 pages.

ASTM, Standard Specification for Fine Aggregate for Asphalt Paving Mixtures1, Designation: D1073-16, Copyright by ASTM Int'l (all rights reserved); Wed Mar. 20, 16:16:46 EDT 2019 Downloaded/printed by University of Wyoming Libraries, 3 pages.

ASTM, Standard Specification for Fine Aggregate for Bituminous Paving Mixtures1, Designation: D1073-07, Copyright by ASTM Int'l (all rights reserved); Wed Aug. 15, 15:19:54 EDT 2018 Downloaded/printed by University of Wyoming Libraries, 3 pages.

ASTM, Standard Testing Methods for Laboratory Compaction Characteristics of Soil Using Modified Effort, Designation: D1557-12'1, Copyright by ASTM Int'l (all rights reserved); Mon Aug. 13, 17:59:15 EDT 2018 Downloaded/printed by University of Wyoming Libraries, 14 pages.

ASTM, Test Methods for Laboratory Compaction Characteristics of Soil Using Modified Effort 58,000 ft-lbf-ft3, Designation: D1557-09, Copyright by ASTM Int'l (all rights reserved); Thu Aug. 16, 15:20:46 EDT 2018 Downloaded/printed by University of Wyoming Libraries, 13 pages.

ASTM, Standard Test Method for Unconfined Compressive Strength of Cohesive Soil, Designation: D2166-91,1994, 5 pages.

Baykal et al, Lightweight Concrete Production Using Unsintered Fly Ash Pellet Aggregate, American Coal Ash Association, Proceedings : 13th International Symposium on Use and Management of Coal Combustion Products (CCPs), vol. 1 TR-111829-V1 Proceedings, Jan. 1999 Jan. 11-15, 1999 Orlando, Florida, 16 pages.

Bergerson, K. L., Synthetic Aggregate from Fly Ash and AFBC By-Products, Proceedings: 11th international symposium on use and management of coal combustion by-products (CCBs): Jan. 15-19, 1995, Orlando, Florida, 11 pages.

Bland, A. E., Effect of Curing Conditions on the Geotechnical and Geochemical Properties of CFB C Ashes, Proceedings of the 15th

(56) References Cited

OTHER PUBLICATIONS

International Conference on Fluidized Bed Combustion May 16-19, 1999 Savannah, Georgia Copyright © 1999 by ASME, 18 pages.
Bland, A. E., Pelletization as a Mine Back-Haul or Aggregate Production Ash Management Option, Ash Management Engineering, Inc., 5 pages. Date unknown.
Bland, et al, Pelletization as An Ash Management Option for CFBC Ash Handling and Utilization, Ash Management Engineering, Inc., Fluidized Bed Combustion—vol. 2 ASME 1993, 10 pages.
Bland, et al, Ash Management Options for AFBC, 11 pages. Date unknown.
Bland, et al, Enhanced FBC Waste Management Using Pelletization, Fluidized Bed Combustion ASME 1991, 6 pages.
Bland, et al, Utilization of CFBC Ashes in Roller Compacted Concrete Applications, 11th International Conference on Fluidized Bed Combustion, Monlreal, Canada, Apr. 1991, pp. 857-863, Fluidized Bed Combustion ASME 1991, 8 pages.
Bland, et al, Sea Water Conditioning of CFBC Ash, Fluidized Bed Combustion—vol. 2 ASME 1993, 13 pages.
Bland, et al, Laboratory Evaluation of CFBC Waste Disposal and Utilization Options, 8 pages. Date Unknown.
Blondin et al, A New Approach To Hydration of FBC Residues, Fluidized Bed Combustion, vol. 2, ASME 1993, 8 pages.
Buchler et al, Solidification—Stabilization of Arsenic—Effects of Arsenic Speciation, 1996, 9 pages.
Burnet et al, Experimental Studies of the Production of Lightweight Aggregate from Fly Ash Coal Cleaning Refuse Mixtures, Proceedings: Eighth International Ash Utilization Symposium, Volume/Issue: / EPRI-CS-5362, pp. 61-1-61-15, Oct. 1987, 17 pages.
Burwell et al, Fluidized Bed Combustion Ash Concrete, vol. 2 ASME 1993, 12 pages.
Chandra et al, Interaction of Polymers and Organic Admixtures on Portland Cement Hydration, Cement and Concrete Research. vol. 17, pp. 875-890, 1987. Printed in the USA, 0008-8846/87 $3.00+00. Copyright (c) 1987 Pergamon Journals, Ltd., 16 pages.
Cioffi et al, Stablization of Chloro-orgamics, Waste Management 21 (2001) 651-660, Received Jun. 16, 2000, Accepted Oct. 16, 2000, 10 pages.
Conner et al, The History of Stabilization/Solidification Technology, Critical Reviews in Environmental Science and Technology ISSN: 1064-3389 (Print) 1547-6537 (Online) Journal homepage: http://www.tandfonline.com/loi/best20, published Jun. 30, 2010, 73 pages.
Courts, Gary D., The Aggregate of the Future is Here Today; Ninth International Ash Use Symposium, 10 pages. Date unknown.
Cullinane et al, EPA-540-2-86-001 Handbook for Stabilization—solidification of Hazardous Wastes, 1986, 4 pages.
Day et al, Relationship between Permeability and Microstructual Charateristics of Fly Ash Mortars, Received Nov. 30, 1989, 12 pages.
Dutre' et al, Solidification/Stabilisation of Arsenic-Containing Waste: Leach Tests and Behaviour of Arsenic in the Leachate, Waste Management, vol. 15, No. I, pp. 55-62, 1995 Copyright © 1995 Elsevier Science Ltd Printed in the USA. All rights reserved 0956-053X/95 $9.50 + .00, 8 pages.
Dutre' et al, Oxidation of arsenic bearing fly ash as pretreatment before solidification, Journal of Hazardous Materials B68 1999. 205-215 www.elsevier.nlrlocaterjhazmat, 11 pages.
Dutre' et al, Immobilization Mechanism of Arsenic in Waste Solidified Using Cement and Lime, Department of Chemical Engineering, Katholieke Universiteit, Leuven, W. de Croylaan 46, 3001 Heverlee, Belgium, Environ. Sci. Technol. 1998, 32, 2782-2787, 6 pages.
Stephens et al, Use of Class C Fly Ash in Lightweight Aggregate and Concrete masonry Units, Proceedings, 11th International Symposium on Use & Management of Coal Combustion Byproducts (CCBs): Jan. 15-19, 1995, Orlando, Florida, pp. 55-1-55-11, 14 pages.
Styron, R. W., Fly ash Lightweight Aggregate: The Agglite Process, Proceedings: Eighth International Ash Utilization Symposium, Oct. 28-31, 1987, 13 pages.

Tabatabai et al, Investigation of Testing Methods to Determine Long-Term Durability of Wisconsin Aggregates, University of Wyoming—Milwaukee, Dept. of Civil Engineering and Mechanics and Wisconsin Highway Research Porgram102.WisDOT No. 0092-10-08, Jan. 2013, 102 pages.
Terpordel, V. V., Construction Aggregates, Mining Engineering, Jun. 1993, pp. 567-568, 3 pages.
Terukina et al, Manufacturing Process of Artificial Ultra Light-Weight Aggregates from Coal Fly, Proceedings: 13th International Symposium on Use and Management of Coal Combustion Products (CCPs) / prepared by American Coal Ash Association, Jan. 11-15, 1999, pp. 7-1-7-11, 12 pages.
Terukina et al, Manufacturing Process of Artificial Ultra Light-Weight Aggregates from Coal Fly, Proceedings: 13th International Symposium on Use and Management of Coal Combustion Products (CCPs) / prepared by American Coal Ash Association, Jan. 11-15, 1999, pp. 1-1-1-13, 14 pages.
Terukina et al, Characteristics of Lightweight Concrete Manufactured from Ultra-Weight Aggregates Using Fly Ash, Proceedings : 13th International Symposium on Use and Management of Coal Combustion Products (CCPs), Jan. 11-15, 1999, pp. 45-1-45-14, 17 pages.
Wu et al, Production of Manufactured Aggregates from Coal Combustion, Proceedings: 13th International Symposium on Use and Management of Coal Combustion Products (CCPs) / prepared by American Coal Ash Association, Jan. 15-19, 1999, pp. 6-1-6-11, 12 pages.
Yilmaz et al, Solidification/Stabilization of Hazardous Wastes Containing Metals and Organic Contaminants, Journal of Environmental Engineering, Apr. 2003, 129(4): 366-376, 11 pages.
Vilalobos, J., Water Challenges in the Permain a Basin, Water Technology Sep./Oct. 2018, 4 pages.
Murphy, et al, Emerging Technologies for Water Challenges in Oil and Gas Operations, Water Technology Solutions for Industrial Water Management, Trade Show Preview AHR Expo, Nov./Dec. 2018, 5 pages.
ASTM, Standard Test Method for Resistance of Concrete to Rapid Freezing and Thawing, Designation: C 666-92, 6 pages. Published Nov. 1992.
ASTM, Standard Test Method for Specific Gravity and Absorption of Fine Aggregate 1, Designation: C 128-93, Jun. 1993, 5 pages.
International PCT Application No. PCT/US19/031861 filed May 10, 2019, First Named Inventor: Bland.
International PCT Application No. PCT/US19/031861 filed May 10, 2019, First Named Inventor: Bland. International Search Report dated Sep. 9, 2019. 6 pages.
International PCT Application No. PCT/US19/031861 filed May 10, 2019, First Named Inventor: Bland. Written Opinion of the International Searching Authority dated Sep. 9, 2019. 15 pages.
U.S. Appl. No. 62/669,861, filed May 10, 2018. First Named Inventor: Bland.
Toutanji et al, Effect of supplementary cementitious materials on the compressive strength and durability of short-term cured concrete, Science Direct, www.sciencedirect.com, Cement and Concrete Research 34 (2004) 311-319, Aug. 11, 2003, 9 pages.
USEPA 1994 Method 1312 Synthetic Precipitation Leaching procedure. In EPA SW 846 Test Methods for Evaluating Solid Waste Physical Chemical Methods, CD-ROM, Sep. 1994, 30 pages.
Willet, Jason Christopher, USGS 2015 Mineral Yearbook—Sand and Gravel, Construction [Advance Release], 2015. Mar. 2018, 10 pages.
Voigt et al, Chemical fixation of arsenic in contaminated soils, Pergamon, Applied Geochemistry, vol. 11, pp. 633-643, 1996 Copyright 1996 Elsevier Science Ltd, Oct. 29, 1995, 11 pages.
Weinberg et al, Field Study of Wastes From Fluidized Bed Combustion Technologies, Fluidized Bed Combustion ASME, 1991, 7 pages.
Wolfe et al, Laboratory Determination of Engineering Properties of Dry FGD By-Products, 6 pages. Date unknown.
Wu et al, Properties of Synthetic Aggregates made from FBC and Dry FGD By Products, 11th International Symposium on Use & Management of Coal Combustion Byproducts (CCBs), p. 55-1-55-11, Jan. 15-19, 1995, 6 pages.

(56) References Cited

OTHER PUBLICATIONS

ASTM, Standard Test Method for Air-Entraining Admixtures for Concrete, Designation: C233-07, Copyright by ASTM Int'l (all rights reserved); Wed Aug. 15, 10:37:06 EDT 2018 Downloaded/printed by University of Wyoming Libraries, 5 pages.

Stegemann et al, Prediction of Unconfined Compressive Strength of Cement Paste Containing Industrial Wastes, Waste management 23 (2003) 321-332. May 11, 2001. 11 pages.

Bland, et al, Ash Management Options for Bubbling Bed AFBC Technologies, ASME Joint Power Generation Conference, Dallas, Oct. 22-26, FACT vol. 6, pp. 9-19, 1989.

Sora et al, Chemistry and microstructure of cement pastes admixed with organic liquids, Journal of the European Ceramic Society 22 (2002) 1463-1473, Sep. 26, 2001, 11 pages.

Sora et al, Matrix optimisation for hazardous organic waste sorption, Science Direct, Applied Clay Science 28 (2005) 43-54, www.sciencedirect.com, Jul. 15, 2004, 12 pages.

METHODS AND SYSTEMS FOR MULTI-STAGE ENCAPSULATION OF WASTES AND PRODUCTION THEREOF INTO AGGREGATE PRODUCTS

PRIORITY CLAIM

This application is the US National Phase of PCT International Application No. PCT/US2019/031861, filed May 10, 2019, which claims priority to and the benefit of U.S. Provisional Application No. 62/669,861 filed May 10, 2018, both applications are hereby incorporated by reference herein in their entirety.

FIELD OF THE INVENTION

Generally, the embodiments of the present invention relate to processes for the encapsulation of wastes. Wastes may include metals, metals containing inorganic and/or organic (e.g., hydrocarbon) wastes, Section D Resource Conservation and Recovery Act ("RCRA") wastes, Section C RCRA wastes, or the like. Some embodiments of the present invention may provide a series of encapsulation steps such as using combustion ashes, Portland cement, and other specialty chemicals which may produce aggregate for beneficial uses perhaps in concrete for a range of construction and other products. A process may focus on materials listed as Section C and potentially Section D hazardous-exempt wastes from the Oil and Gas Exploration and Production (E&P) oil containing wastes, combustion-related ashes produced in the power production industry, and perhaps even metals containing wastes from the mining and processing industry and even the manufacturing industry, or the like.

Embodiments of the present invention may include basic ideas and concepts which can address problems associated with cured consolidation encapsulation materials perhaps from cold bonding processes. As such, the present invention may provide, in embodiments, apparatus and methods for the processing, consolidation and even curing of Portland cement perhaps with or without coal combustion ash, and encapsulated RCRA Oil and Gas E&P wastes and/or mining and processing metals contaminants to form novel materials, as well as, for the improvement of various characteristics relating to cured composite encapsulated materials processed by existing technology.

Embodiments of the present invention may relate to a system for the encapsulation of RCRA inorganic and even metals wastes from the mining industry or even RCRA organic wastes from Oil and Gas E&P wastes perhaps with treatment with ashes or residues from the combustion of carbonaceous fuels, with or without Portland cement and even specialty additives, or the like. The invention may provide, in embodiments, methods and apparatus which may control various physical and even chemical characteristics of Portland cement/combustion ash/RCRA wastes as they may relate to cold bonding processes, and as they may relate to the cured consolidated materials which may result from these processes in effectively encapsulating the inorganic metals and/or hydrocarbon RCRA wastes from Oil and Gas E&P wastes or other RCRA wastes from mining and manufacturing. Specifically, embodiments of the present invention may relate to cured consolidated encapsulated materials which may be standardized for use as normal weight aggregate and other novel product applications.

BACKGROUND

The oil and gas industry, the power industry and even the mining and processing industry produce a variety of wastes that have been categorized by the Resources Conservation and Recovery Act ("RCRA") as exempt wastes and non-exempt wastes. Exempt wastes may be large volume wastes which may have had limited environmental exposure while non-exempt wastes may be those that may have potentially high risks of environmental impact. For a further discussion, see the Federal Register notice, Clarification of the Regulatory Determination for Waste from the Exploration, Development, and Production of Crude Oil, Natural Gas and Geothermal Energy, Mar. 22, 1993, Federal Register Volume 58, Pages 15284 to 15287, hereby incorporated by reference herein in its entirety.

The oil and gas, mining, and waste treatment industries produce a number of wastes that qualify under Section C and D of the RCRA. Processes used for solidification/stabilization of these wastes may involve a single encapsulation step (if any) or perhaps even dilution for disposal or other non-commercial applications. For example, these may include large volume wastes that may require large volumes of water that can be dewatered and the petroleum contaminated portion may be treated perhaps allowing the water to be reused. This may save space in disposal sites, may reduce costs, and may even save on water consumption. This may even be the case for produced waters and fracked backflow waters. Examples of RCRA exempt Oil and Gas Exploration and Production (E&P) industry wastes (RCRA-D) may include: produced waters, drilling fluids, drill cuttings, rig-wash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site. Non-exempt wastes in the Oil and Gas Exploration and Production (E&P) industry (RCRA-C) may include: used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids. Source: M. Fitzgerald, 1990.

Although non-E&P wastes perhaps generated from crude oil and even tank bottom reclamation operations (e.g., waste equipment cleaning solvent) may be non-exempt, residuals derived from exempt wastes (e.g., produced water separated from tank bottoms) may be exempt.

A source of material which may be used in embodiments of the present invention may include ashes from coal, oil, or even incinerator combustion that may be a source of inorganic metals that can create environmental issues if not treated or solidified/stabilized. The American Coal Ash Association in 2016 estimated that the industry recycled about 56% (about 60.2 million tons) of the coal combustion ash of the about 107.4 million tons generated. Approximately 14.4 million tons was used in concrete. Approximately 9.9 million tons of synthetic gypsum wallboard may have been manufactured from sulfur emissions control process wastes. Other uses of coal combustion ash may include use in blasting grit, roofing granules, and a variety of geotechnical and agricultural applications.

Combustion of carbonaceous fuels for the production of electricity, process steam or the like by the utility and even industrial sectors may be a major generator of combustion ash. Combustion technologies such as, but not limited to, fluidized bed combustion ("FBC") and pressurized fluid bed combustion ("PFBC") may not be widely implemented. Apprehension about pollution from the smoke stack industries and utilities has led to the implementation of clean coal technologies that may address flue gas contaminants, perhaps not only for particulate, but also for gaseous emission, such as sulfur oxides or the like. These flue gas desulfurization ("FGD") technologies may be widespread and may cover a range of techniques such as wet scrubbers or wet FGD; dry scrubber FGD (e.g., spray driers or the like); sorbent injection technologies; and perhaps even fluidized bed combustion technologies or the like, each of which may produce a particular type of ash as a by-product. Not all ashes may be the same. Ashes may vary with the composition of the fossil fuel, its origin, and perhaps even the type of combustion technology, or the like. This may arise in the production of Class C ashes from subbituminous coal, Class F ashes from bituminous coals, ashes from atmospheric circulation fluidized bed combustion technology and even pressurized circulating fluidized bed combustion and their fuel characteristics. In addition, ashes maybe off spec Class F and even Class C fly ashes that may contain unburnt carbon that is above the limit for unburned carbon, which may be in excess in order to be certified for use, such as for a pozzolan for Portland cement. These ashes may be pozzolanic (e.g., can solidify with lime and even water) and may not be used with Portland cement in concrete due to impacts on concrete additives such as air entraining agents. Typically, these ashes have not been used with numerous prior encapsulation applications that employed single encapsulation steps. In addition, many of these high unburnt carbon ashes may not be used as in Portland cement, thus disposal may be the only option.

The development of re-use technologies for many of these ashes, as well as those that result from the combustion of carbonaceous fuels even without FGD technologies, has been slow. The obstacles may have been both technical, as well as regulatory and even legislative. One of the prominent technical issues may be the inability to produce ash-based products which may have certain required engineering properties or may need to meet particular standards in the construction industry.

In the mining and processing industry, inorganic metals wastes and even mining waste associated with hard rock mining may have to be treated and even landfilled. In addition, incineration of certain wastes rich in metals may also have to be treated. The processing of these ore or preparation of coal to obtain marketable products may leave behind a number of exempt wastes that may often produce slurries that need to be managed. Some of these mineral and coal processing wastes may meet the EPA's high-volume, low-hazard criteria and may therefore remain exempt under the Bevill exclusion for subtitle C regulation. This includes red and brown muds; treated residue from roasting/leaching operations; process wastewater; slags; air pollution control of dust and sludge from blast furnaces and even open-hearth furnace slags from carbon steel production; and perhaps even slags from zinc, copper processing, elemental phosphorous, lead processing and iron blast furnace slag, or the like. A number of the slag materials can be crushed, sized and may even be used as an aggregate. A number of these other wastes can be solidified/stabilized and may be used in the production of construction products or even fill materials according to various embodiments of the present invention.

However, many of these materials may require additional processing, such as encapsulation and/or disposal of in lined or even protective containment facilities which may incur considerable costs. Hazardous wastes in the above-mentioned sectors may require treatment such as to prevent the contaminant mobility into the environment and may require specific permits as to handling/processing and even final disposition.

The base metal industry has left an environmental legacy that still to this date may continue to threaten the health of populations for the future. A couple of examples include the Telluride tailings in Colorado and the mountains of lead gangue associated with the Tar Creek Pritcher government processing waste in Oklahoma. Embodiments of the present invention may provide encapsulation processes that may allow the use of the encapsulated material in various applications, including mine backfilling and/or other applications such as road base.

Heavy metal encapsulation testing has been based on adding a pH adjustment chemical to raise to pH of the solution waters to the pH that may provide the lowest solubility of the heavy metals of concern. The solubility of certain metals can be controlled by the addition of pH adjustment compounds, such as lime (CaO), see Table 2. Table 1 shows the composition of leachate metals from slag dumps in Australia. This report provides typical heavy metal compositions from four slags and seepage composition. These slag dumps have a major impact on the environmental nature of the slag and the neighboring areas impacted by the slag seepage waters.

TABLE 1

Concentration of various metals associated with non-ferrous slag dumps in Australia

| | Chillagoie Slag Composition ppm | Mt. Moollag Slag Composition ppm | Mt. Garnat Slag Composition ppm | Montalbion Slag Composition ppm |
| --- | --- | --- | --- | --- |
| As | 281 | 49 | 24 | 635 |
| Ag | 13 | 2 | 37 | 284 |
| Cd | 15 | 165 | 24 | 13 |
| Cu | 5223 | 6287 | 8585 | 1410 |
| Sb | 85 | 16 | 22 | 1617 |
| Pb | 7605 | 241 | 90 | 51620 |
| Zn | 23643 | 47866 | 58560 | 1226 |

(Lottermoser, 2002)

Table 2 shows the impact of a low-grade MgO compared to lime (CaO) with respect to raising the pH and perhaps lowering the solubilities of various metals in the leachate. The MgO at similar addition rates may be more efficient in raising the pH and thereby reducing the solubilization of the heavy metals. CaO may tend to increase the pH to the higher pH level (e.g., pH of 12+) which may be in the range that facilitates higher solubilities of many of these heavy metals.

TABLE 2

Selective Comparison of the Efficiency of Low-Grade MgO Compared with CaO in Reducing Solubility of Heavy Metals

| | | | Stabilizer | | | | | | | | |
|---|---|---|---|---|---|---|---|---|---|---|---|
| Percentage | Inert (A) Regulation | Non-Special Regulation | Stabilizer 0% | LG-MgO 5% | LG-MgO 10% | LG-MgO 15% | LG-MgO 20% | CaO 5% | CaO 10% | CaO 15% | CaO 20% |
| pH | 5.5 < x < 12 | 4 < x < 13 | 2.67 | 9.3 | 8.7 | 9.3 | 9.4 | 12.0 | 12.4 | 12.8 | 13.2 |
| Cond. | 6.0 | 50.0 | 2.87 | 1.9 | 2.5 | 2.63 | 2.95 | 8.2 | 7.6 | 9.2 | 8.85 |
| Metals[2] | | | | | | | | | | | |
| Zn | 2.0 | 5.0 | 169.87 | 0.02 | 0.22 | 0.02 | 0.09 | 2.54 | 1.84 | 2.70 | 2.55 |
| Pb | 0.5 | 1.0 | 1.83 | 0.10 | 0.22 | 0.16 | 0.05 | 1.91 | 7.66 | 2.55 | 15.54 |
| Cd | 0.1 | 0.2 | 0.21 | <0.01 | <0.01 | <0.01 | 0.08 | 0.98 | <0.01 | 0.43 | 0.22 |
| Cu | 2.0 | 5.0 | 120.38 | 0.02 | 0.30 | 0.08 | <0.01 | <0.01 | 0.39 | <0.01 | <0.01 |
| Cations[2] | | | | | | | | | | | |
| SO-4 | 500 | 1500 | 3907 | 1151 | 1704 | 958 | 2003 | 533 | 2198 | 758 | 927 |

1. mScm−1;
[2] mg//L;
Bold - Does not meet the regulations;
(Garcia, M. A., et. al, 2000)

Cement-based Solidification/Stabilization ("S/S") techniques may have been used in the past to treat and even encapsulate organic wastes, as well as inorganic wastes. Cement may be a popular solidifying and even stabilizing agent. Cement based S/S may have advantages including, but not limited to: 1) relatively low cost and ease of use and processing; 2) composition of Portland cement may be consistent from source to source, perhaps eliminating some of the variables in designing the S/S process; 3) good long-term stability, perhaps both chemical and physical, 4) good compaction and even high compressive strength; 5) non-toxicity of the chemical ingredients used; 6) high resistance to biodegradation; and perhaps even 7) relatively low water permeability, or the like. In S/S processes, immobilization of contaminants, depending on their nature, may occur perhaps by any one of or any combination of three main mechanisms: 1) chemical fixation of contaminants by interactions between the hydration products of cement and the contaminants, 2) physical adsorption of contaminants on the surface of cement hydration products, or perhaps even 3) physical encapsulation of contaminated waste.

For heavy metals, cement-based S/S technology may have been shown to be effective in immobilization of the contaminants, perhaps even without any additives. In applying cement-based S/S for treating organic contaminants, the use of adsorbents such as organophilic clay or carbon or the like, perhaps either as a pretreatment or as additives in the cement mix, can improve contaminant immobilization in the solidified/stabilized waste.

The encapsulation of oily wastes produced in the Oil and Gas Exploration and Production (E&P) activities may include Conventional Oil and Gas Exploration and Production and perhaps even Unconventional Gas Production such as associated with shale gas resources. For example, the American Petroleum Institute (API) estimates that there may be approximately 1.21 barrels of drilling wastes for every foot of drilling, resulting in over about 29 million cubic feet of waste. Of this, approximately 50% may be solids and the rest may be drilling muds and oily wastes or the like. These wastes may be treated by use of filtration, chemical treatment, biological treatment, thermal treatment, extraction, chemical stabilization, incineration, landfarming, landspreading, or disposed in landfills, solidification, burial, and underground injection/disposal, or the like. Many of these processes produce enriched hydrocarbon streams that may require further treatment. In Unconventional Gas Production employing hydraulic fracturing, there may be process wastes, such as contaminated fracture solids and even hydrocarbon containing backflow injection fluids, or the like. In addition, there may be secondary hydrocarbon processing wastes generated during the primary treatment of these wastes. Additives used with Portland Cement in a solidification/stabilization processes may include: cement; gypsum, lime, and fly ash; cement, lime, fly ash, and $H_2O_2$; pozzolan, lime:lime and kaolinite; cement and lime; cement, lime and $H_2O_2$; cement and $H_2O_2$; cement and iron; cement, lime, and iron; cement and fly ash; and perhaps even cement and organophilic clay.

Past systems for encapsulation of inorganic and even organic wastes may have certain issues such as, but not limited to: (1) the reduction of pore volumes that may impact the water leachability and the formation of problematic compounds that can cause cracking and perhaps even increased durability; (2) the mobility of metals through aging of the S/S cured materials perhaps as a result of specific immobilization pH; (3) reduction of the setting times of Portland cement based systems such as by organic wastes; and (4) deterioration of the strength such as under Freeze/Thaw (F/T) cycles perhaps due to water penetration and expansion with freezing; or the like. Examples of additives used in S/S processing of inorganic and organic waste may include: activated carbon, neutralizing agents, reducing agents, slag, organic latex, concrete additives, organophilic clays, rubber particulates, soluble silicates, surfactants, iron and aluminum compounds, phosphates, silica fume, sorbent, fly ash, clays, minerals, sulfides, inorganic sulfides, and organic sulfides.

To resolve these problems, embodiments of the present invention may provide that a reduction of pores may be accomplished perhaps by reducing the water content of the Portland cement/fly ash/waste mixture. The mobility of inorganic metals can be reduced perhaps by maintaining the pH of the mixture between about 10 to about 11 pH. The retardation of the setting time of the Portland cement/organic waste mixture may be addressed by multiple encapsulation steps. The Freeze/Thaw (F/T) and even climatic environmental conditions issues may be addressed by incorporation of air entraining agents that may produce bubbles in the final concrete product that may allow the contraction/expansion of gas with temperature cycles. For example, organic wastes may be sorbed by the pores or even encapsulated in the pores, and their leachability may depend on their solubility in water and perhaps even their diffusivity through a waste matrix. Almost all organic compounds may be retarders in a cement setting, and many organic acids that may strongly chelate calcium may also have strong retarding capability. Organic compounds may retard the cement setting process perhaps by forming a protective layer around the cement grain, thus it may hinder the formation of calcium hydroxide that may contribute to strength development.

The durability of concrete under cold conditions may impact the integrity of the solidified/stabilized wastes perhaps due to the osmotic pressure in the cement paste and even the aggregate mainly due to the about 9% expansion of water in resultant concrete. At these pressures, micro-cracks may begin to form, and ruptures may occur perhaps when the pressure exceeds the tensile strength of the paste and aggregate may result in exposing encapsulated wastes to leachability.

It has been found that F/T resistance can be increased with the use of small particle additives, low water/cement ratio, the right amount of cement content, and perhaps even proper curing conditions, or the like. This can include silica fume and even fly ashes which may improve F/T resistance and may increase compressive strength and may reduce detrimental chloride penetration associate with wet/dry (W/D) cycles.

Organic additives which may include surfactants perhaps for AEA air entraining admixtures may create bubbles that may resist freeze/thaw cycles and may even improve dispersion perhaps by reducing interparticle attraction between cement grains which may prevent the particles to agglomerate, perhaps reducing the amount of hydration water for required workability. The amount of air entrapment may depend on a liquid/cement ratio and perhaps even a surfactant concentration. The cement porosity may increase the water/cement ratio and perhaps even a surfactant concentration and may decrease strength.

In the area of metals encapsulation, past patents may have included U.S. Pat. No. 4,687,373 to Falk et al. which may describe an aqueous silicate solution containing potassium oxide and silicon dioxide and a catalytic amount of an aqueous sodium borate solution and a fixative containing solid calcium oxide coating of incinerator wastes. U.S. Pat. No. 5,037,286 to Roberts may discuss a method of coating incinerator ash with a cementitious coating material which may be added to coat balls in a multi-segment rotary drum. U.S. Pat. No. 5,286,430 to Downs et al. may describe the use of cement only to encapsulate metals containing waste which may be a high cost option since cement is already costly. U.S. Pat. No. 7,754,169 and U.S. Pat. Pub. No. 2013/0243674 A1 both to Constantz et al. may describe a method of precipitating metals containing waste material with contact with $CO_2$ or bicarbonate.

In the area of encapsulation of oily wastes associated with the Oil and Gas E&P RCRA wastes, past patents include U.S. Pat. Pub. No. US20080237141A1 to Kerfoot which may describe a method and apparatus for hydrocarbon recovery and/or treatment of frac water including introducing a volume of water into a formation, recovering the introduced water, with the recovered introduced water further comprising suspended hydrocarbon product. The recovered liquid may be treated to remove substantial amounts of suspended hydrocarbon product. In addition, U.S. Pat. No. 4,539,119 to Cann may provide that contaminated waters may be treated for re-use and disposal with acceptable environmental improvements perhaps by adding a sulfate salt or aluminum and/or iron alkalized to form a waste cohering hydroxide floc in one or more treatment plants, recovering the flocs and wastes by contacting with sulfur oxides to re-dissolve the aluminum and/or iron for reuse. However, these patents do not describe the encapsulation of the oily wastes as included in the various embodiments of the present invention.

U.S. Pat. No. 4,206,080 to Sato et al. may describe a method of treating oily wastes, wherein a composition of melt may be kneaded by mixing and crushing the ingredients while cross-linking the polymers, and may produce an oil absorbing composition perhaps useful for removing oil for an oil contaminated water comprising a granulated mixture of about 5-80 weight % of an inorganic filler capable of absorbing oil and about 95-20 weight % of a cross-linked polymer.

U.S. Pat. Pub. No. 2009/0245939 A1 to Burns et al. may describe a two-component, water based micro encapsulation composition and method for the cleanup of hydrocarbon spills or contaminates on various surfaces and media. The two-part formulation may include: a first solution including water in a predetermined ratio of a water soluble alkaline silicate solution having at least one alkali metal and a predetermined ratio of at least one water soluble surfactant; and a second solution including water, a predetermined ratio of water soluble acid, a predetermined ratio of water dispersible polymer, a predetermined ratio of water soluble hydrotrope, and a predetermined ratio of a least one water soluble flocculating agent.

U.S. Pat. No. 3,959,172 to Brownell et al. may describe a method of handling radionuclides associated with Oil and Gas E&P wastes whereby radionuclides may be immobilized in an insoluble form by reacting at a temperature of at least 90° C. as aqueous alkaline mixture having a solution pH of at least 10, containing a source of silicon, the radionuclide waste, and a metal cation. From a gel complex, metalosilicates may crystallize to entrap the radionuclides within the resulting condensed crystal lattice. The product may be a silicious stone-like material which may be virtually insoluble and non-leachable in alkaline or neutral environment.

In the area of encapsulation and production of aggregate, U.S. Pat. No. 4,344,796 to Minnick may include that pulverized fuel ash, such as Class F fly ash, when added to FBC spent bed ash, was beneficial to the production of strong aggregate. This patent may also designate that the mixture should contain FBC spent bed ash, Class F fly ash, and a sodium silicate binder.

Bland, et al, "Ash Management Options for AFBC," Proc., IO.sup.th International Conference on Fluidized Bed Combustion, San Francisco, Calif., Apr. 30-May 3, 1989, pp. 323-334, later showed that pulverized fuel ash (PFA), such as Class F fly ash, when added to FBC spent bed ash, was also beneficial to the production of more stabilized disposal cells. However, the dimensional characteristics of the compacted ash mixtures may deteriorate with time.

U.S. Pat. No. 4,880,582 to Spanjer et al. may describe the mixing of fly ash lime, water, and other components. The other components may include residues of combustion processes, such as bottom ash, ash from fluidized boilers, and other types of ashes. Once again, this patent may employ the use of other ashes combined with CaO or $Ca(OH)_2$ containing FBC ash to provide the strength needed for producing the aggregate.

U.S. Pat. No. 5,152,837 to Rademaker may disclose the addition of CaO $CaSO_4$ free ashes to CaO and CaSO4 containing ashes which may produce calcium silicates that add strength to the pelletized aggregate.

From a commercial manufacturing perspective, there remain several significant problems to resolve. First, with regard to the use of sintering processes, such as those disclosed by U.S. Pat. No. 3,765,920 to Humphrey; U.S. Pat. No. 4,772,330 to Kobayshi et al.; U.S. Pat. No. 5,342,442 to Nechvatal et al.; and U.S. Pat. No. 5,669,969 to Meade et al., the processes may be increasingly less economical because of the high costs of energy required to produce the products at temperatures of between about 1650 to about 2190 degrees Fahrenheit, and perhaps because of the high maintenance cost of the sintering and mechanical handling equipment. Also, the sintering processes do not appear promising because certain ashes that contain sulfate and sulfide from FBC and FGD technologies result in unacceptable $SO_x$ emissions during the sintering process.

Earlier research by Bland (1991) may have employed the use of a number of chemical additives to react with CaO containing FBC ashes perhaps to produce calcium silicates that may act as a cementing agent. The strength data on lime kiln dust, lime, cement, and even micro-silica were published and these additives can be beneficial in increasing strength. Improvement in expansion characteristics were not reported. FBC and FGD combustion ashes are examples of ashes which tend to exhibit expansion sufficient to limit their options for use and often cause difficulty in the construction of stable landfills as discussed in "Ash Management Options For AFBC," Bland et al. 1989 which is hereby incorporated by reference herein. An approach to dealing with the problem of expansion in oxide rich combustion ash may be disclosed by U.S. Pat. No. 5,364,572 to Wu et al.; U.S. Pat. No. 5,100,473 to Mitsuda et al.; U.S. Pat. No. 4,250,134 to Minnick; U.S. Pat. No. 4,344,796 to Minnick; and Blondin et al. "A New Approach To Hydration Of FBC Residues," Proceedings of the 1993 International Conference on Fluidized Bed Combustion: FBC's role in the world energy mix, 12th FBC, San Diego, Calif. May Journal Volume: 12th vol. 2, Pages: 847-858, 1993, hereby incorporate by reference herein. Each may teach that all the free lime or other oxides may be initially slaked or nearly completely converted to a non-expansive hydrate prior to further processing steps. However, several problems may be associated with using sufficient water to slake or nearly completely convert oxides to the corresponding hydrates which can relate to handling problems and even reduced early strength development in the cured consolidated combustion ash materials.

Another concern related to the production of construction related materials from certain lime and sulfate containing ashes, such as FBC ashes, may be the subsequent formation of the minerals such as calcium sulfo-aluminate hydrate (ettringite), calcium sulfate di-hydrate (gypsum), calcium silicate hydrates, and even calcium aluminate hydrates perhaps as discussed in Bland, "Effect of Curing Conditions on the Geotechnical and Geochemical Properties of CFBC Ashes," Proceedings of the 15th International Conference on Fluidized Bed Combustion, 1999 which is hereby incorporated by reference herein. Slow formation of these compounds may have been linked to the observed expansion in FBC and other ashes, poor strength development in consolidated combustion ash materials, and perhaps with the disintegration of cured consolidated materials. As cured consolidated combustion ash materials age, the formation of such minerals may continue and perhaps subsequently a portion of the pore volume may be decreased within the material. The deposition of these minerals in the pores of the cured consolidated combustion ash material, left unchecked, may ultimately create enough force to crack the cured material adjacent to the pore. These micro-cracks may lead to a substantial loss of strength and abrasion resistance in the cured consolidated combustion ash material.

A number of researchers have shown the benefit of soluble silicate addition to ashes containing free lime, such as FBC ashes. For example, as disclosed by U.S. Pat. Nos. 5,002,611 and 5,152,837 both to Rademaker may focus on the addition of other ashes having soluble silicates to FBC ash. The soluble silicates in the ash may react with the free lime in the FBC ash and may form calcium silicates perhaps preferentially to the compound ettringite. This approach, however, may have at least two problems associated with it. First, it may be applicable to only certain ashes, and secondly, it may be costly because it may require additional steps related to procuring fly ash perhaps with suitable amounts of soluble silicate and the additional steps of processing the fly ash with the FBC ash.

In the past, a method has been disclosed that may be designed to increase strength and resistance to abrasion perhaps by increasing density through compaction. Increased compactive effort applied to soils may have been known to increase the load bearing capacity and even the strength of soils. The soils may have improved strength perhaps due to the expulsion of water from the pores. U.S. Pat. No. 5,211,750 to Smith et al. may provide that an intermittent compacting of lime, fly ash, FGD sludge, and water mixture may be beneficial to the production of an abrasion resistant material that might be used as synthetic aggregate. Compaction may take place over several days perhaps by repeated passes of compactive devises, such as roll compactors or the like. Extended curing times in the range of about 28 days to over about 6 months may be required.

From the perspective of producing normal-weight and even light-weight aggregate produced with ash-based composition, U.S. Pat. No. 6,517,631 to Bland may have showed how aggregate may be made and in U.S. Pat. No. 6,334,895 to Bland with combinations of various ashes where the aggregate may have met the ASTM and AASHTO specifications, included how one can assess the most technically viable composites and even processing options that can lead to the economical products. Also, U.S. Pat. No. 6,808,562 to Bland may discuss a system for cold bond processing of combustion ash. Some of the processing options/equipment could have application in the various embodiments of the present invention. In these patents, composition of aggregates did not include Portland cement and did not encapsulate RCRA C or D Oil and Gas (E&G) nor metals containing wastes.

DISCLOSURE OF INVENTION

Accordingly, it is a broad object of the present invention to provide a system for the encapsulation of wastes including, but not limited to, RCRA exempt and certain non-exempt wastes perhaps associated with the oil and gas industry, coal combustion ash generated in the electric power and heat and steam industry, wastes generated by the mining industry, as well as the metals wastes generated in the manufacturing industry based on cold-bonding, or the like. These cured multi-encapsulated wastes may be suitable for producing an aggregate used in the production of a Portland cement-based concrete for various construction applications, such as, but not limited to Jersey barriers, noise barriers, ornamental exterior products (e.g., pavers and decorative exterior products, or the like); roller compacted concrete; and other construction or Oil and Gas E&P operations, or the like.

Embodiments of the present invention may be based on cold bonding composite materials in the presence of O&G E&P gasoline range organics (GRO) and diesel range organics (DRO) and perhaps even metals containing RCRA wastes with or without cement that may relate to a novel technology for the production of normal-weight synthetic aggregate and other products.

One specific goal in this respect may be to provide methods and apparatus for a cold bonded encapsulation of RCRA O&G E&P wastes and/or metals containing RCRA wastes from the mining and processing industry using coal combustion ashes with or without Portland cement, and specialty additives that meet the strength, dimensional stability and ASTM and AASHTO specifications normal weight aggregates in concrete and other products, or the like.

A second broad objective of the present invention may be to provide technology which may improve previously disclosed or even presently used processes for cold bonding encapsulation process for RCRA-D and C wastes and Portland cement, combustion ash, and chemicals to produce the minerals that enhance strength, decrease expansion and can survive freeze/thaw cycles and other specifications for normal weight aggregate for various construction, and other applications. Such technology may improve the products of existing technologies so as to be more readily accepted in existing markets or may even allow the improved products to be introduced into new markets, or may simply make the existing technologies more economical, or the like.

A specific objective of the present invention may be to control the amount of expansion of certain combustion ashes which may contain high levels of oxide when the combustion ash may be combined with water. Controlling the molar volume expansion of oxides may decrease the linear expansion and may improve the unconfined compressive strength of cured consolidated combustion ash materials. For certain applications, the hydrated combustion ash material may be intentionally designed to expand to fill a specific volume.

Another specific objective of the present invention may be to control the potential for the formation of minerals, such as ettringite and gypsum, in cured consolidated combustion ash materials. Controlling the potential for formation of such minerals and in turn the amount of deposition of such minerals in the pore volume of consolidated or cured combustion ash materials may allow manufacturers to predetermine and perhaps even select certain attributes of the cured consolidated combustion ash material to meet certain specifications or the requirements of various markets.

Another specific objective of the present invention may be to assess and even control the manner of combining various types combustion ash with water, Portland cement, RCRA waste and other additives. By controlling the manner of combining the combustion ash with water, various characteristics of the cured consolidated product may be adjusted. A significant goal in this respect may be to broaden the achievable range for some characteristics. Specifically, this may allow for cured consolidated product which may have an increased density and perhaps unconfined compressive strength, as well as perhaps decreased linear expansion. The manner of combining the combustion ash with the water may also result in a density, such as that achievable using an ASTM D-1557 compactive effort, using a lower standard of compactive effort, such as an ASTM D-698 compactive effort. Since density may be related to characteristics such as, but not limited to, strength development, permeability, abrasion resistance, soundness, and expansion, a simple and economic method to increase density with reduced compactive effort could be highly valuable tool. A related goal may be to reduce the water-solids ratios of the combined material. Another related goal may be to decrease the need for additives which may be presently used to impart increased strength to cured consolidated materials produced by existing processes. Similarly, another goal may be to allow for the use of a wider variety of ashes/wastes such as, but not limited to: Oil and Gas E&P oily wastes, metals contaminated mining and processing wastes, off specification high unburnt carbon ashes perhaps in the production normal weight aggregates.

Another specific objective of the present invention may be to increase the strength of cured consolidated combustion ash material with or without Portland cement perhaps so as to compensate for the decrease in strength attributed to the encapsulation of Oil and Gas E&P and or metals containing RCRA wastes. A specific goal with respect to increasing the strength may be to identify additives which may have been shown to be beneficial in enhancing strength development by effectively filling pore space without over-filling and hence, cracking the cured composite.

Yet another objective of the present invention may be to disclose apparatus and methods which may allow for the use of/or improvement in the processing of a wide variety of combustion ashes, non-limiting examples include, but is not limited to: fly ash which may result from the combustion of fossil fuels which may be entrained in flue gases and may then be collected; bottom ash which may result from the combustion of fossil fuels that may not become entrained in the flue gases and may be removed from the bottom of the combustor, bed ash which may result from the combustion of FBC, CFBC, or PFBC combustion of fossil fuel, or the like; Class C ash which may result from the combustion of low ranked coals, such as lignites and subbituminous coals, or the like, which may meet the specifications of ASTM C-618, hereby incorporated by reference; class C combustion ash which may result from the combustion of low ranked coals such as lignites and subbituminous coals, or the like, but which may not meet all the specifications of ASTM C-618 perhaps due to the high levels of unburnt carbon; Class F ash which may result from the combustion of bituminous and anthracite coal and which may meet the specifications of ASTM 618; off specification Class F ash which may result from the combustion of anthracite and bituminous coals but which may not meet the specifications of ASTM 618 perhaps due to levels of unburnt carbon; spray dryer ash which may be produced from the spray driers used to clean the flue gases from the combustion of fossil fuels; sorbent injection ashes which may be produced from the injection of a sorbent to capture gaseous sulfur; and incinerator ash which may be produced from the combustion of municipal waste; or other ash types as they are identified or are developed; or the like. By allowing use of any kind of ash, embodiments of the present invention may allow local sources of ash thereby reducing costs perhaps while maintaining the required strength development, reduced expansion and even encapsulation efficiency of RCRA Oil and Gas, E&P RCRA wastes, and even metals containing RCRA wastes from mining, processing and manufacturing industry.

Still another objective of the present invention may be to make use of a variety of waste waters such as, but not limited to: coal pile runoff perhaps produced by rain percolating through or running off coal piles which may be required to be treated before discharge; cooling tower blowdown perhaps produced at power plants such as a result of being associated with cooling towers and which must be treated prior to discharge; paper mill liquors or effluent perhaps produced in association with paper mills and which may require treatment prior to discharge; or the like. In some embodiments, seawater and brackish water (seawater) perhaps associated with coastal influx of seawater may be used.

Another objective of the present invention may be to provide set retarding chemicals which may retard the rate at which consolidated Portland cement/combustion ash material sets (flash setting). These additives may be critical to processing some types of self-cementing combustion ash, and with respect to others, may allow certain techniques to be accomplished prior to the time the consolidated combustion ash materials set.

Specifically, with regard to encapsulated waste via the various materials to be introduced into the market for normal weight aggregate, it may be an objective of the present invention to meet or even exceed American Society for Testing Materials (ASTM) and American Association of State Highway Transportation Officials (AASHTO) specifications, which are hereby incorporated by reference herein. Related specifications for aggregate include ASTM and AASHTO specifications related to normal weight aggregate to be used in concrete (ASTM C-33 and AASHTO M-80 and M6); fine aggregate for bituminous paving mixtures (ASTM D-1073 and AASHTO M 29); specifications for mineral filler for bituminous paving materials (ASTM D-242 and AASHTO M 42).

Naturally, further objections, goals and embodiments of the invention are disclosed throughout other areas of the specification, claims, and figures.

BRIEF DESCRIPTION OF DRAWINGS

The following descriptions and referenced drawings are for selected embodiments of the present invention. Naturally, changes may be made to the disclosed embodiments while still falling within the scope and spirit of the present invention and patent.

MODE(S) FOR CARRYING OUT THE INVENTION

Figure 1:
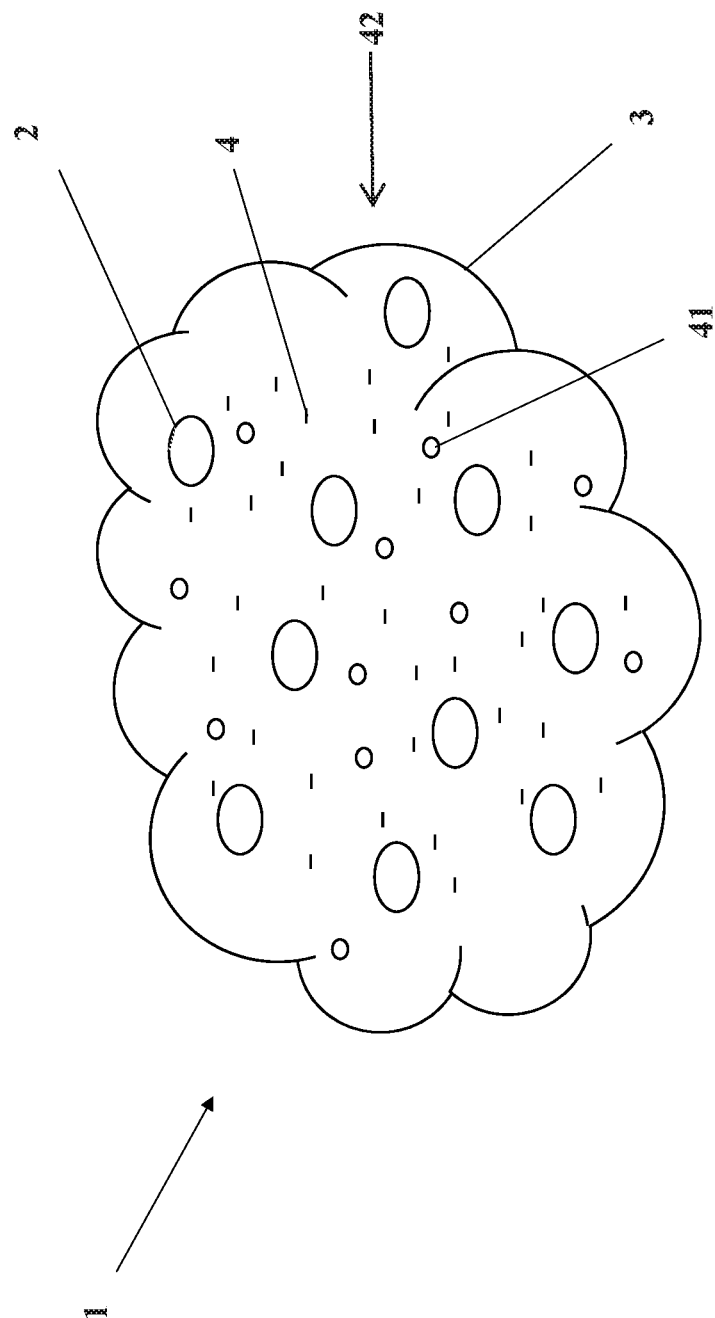
FIG. 1 shows a non-limiting example of a first encapsulation of waste in accordance with some embodiments of the present invention.

The present invention includes a variety of aspects, which may be combined in different ways. The following descriptions are provided to list elements and describe some of the embodiments of the present invention. These elements are listed with initial embodiments; however, it should be understood that they may be combined in any manner and in any number to create additional embodiments. The variously described examples and preferred embodiments should not be construed to limit the present invention to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may include a method for reusing contaminants comprising the steps of providing waste from an oil and gas flocculant process; providing ash; providing a first supply of Portland cement; high energy mixing said waste from said oil and gas flocculant process, said ash, and said Portland cement to create a plurality of agglomerates; processing said agglomerates; and even encapsulating said agglomerates. Embodiments of the present invention may include a method for reusing contaminants comprising the steps of providing waste from a fracturing process; providing ash; providing a first supply of Portland cement; high energy mixing said waste from said fracturing process, said ash, and said Portland cement to create a plurality of agglomerates; processing said agglomerates; and even encapsulating said agglomerates. Embodiments of the present invention may include a contaminant reuse system comprising a plurality of agglomerates comprising waste from an oil and gas flocculant process, ash, and a first supply of Portland cement resulting from high energy mixing; an agglomerates processor; and a plurality of encapsulated agglomerates. Embodiments of the present invention may include a contaminant reuse system comprising a plurality of agglomerates comprising waste from a fracturing process, ash, and a first supply of Portland cement resulting from high energy mixing; an agglomerates processor; and a plurality of encapsulated agglomerates.

There are a number of processing factors and desired product performance that may be important for a cured encapsulation product, including, but not limited to, any one of or any combination or permutation of the following: (1) high strength development, comparable of meeting aggregate soundness and attrition specifications (ASTM Specifications); (2) impact when oily waste may tend to retard the strength development when mixed with Portland cement, for example oily wastes may tend to coat the cement hydration products that result in strength development, thereby aggregate strength development; (3) decreased linear expansion, perhaps via controlling the mineral composition developed in the pores of the composite material; (4) reduction of the pore size filling that may impact the residual pore volume that impacts the cured product oxygen penetration and water; (5) infiltration, negating the potential mobility of the encapsulated wastes; or perhaps even (6) the attainment of the correct pH or even chemical stabilization in order to facilitate the insolubility of metals in the encapsulated RCRA waste; or the like.

The determination of the optimal performance and economics of chosen components such as ingredients for the encapsulation matrix may be a function of the materials of encapsulation, their interaction with the RCRA wastes being encapsulated, and perhaps even the economics of the available encapsulation material. Portland cement may be the highest price component of most encapsulation composites used in industry and there may be a need for specialty chemicals which may be required to offset detrimental impacts of the combining of certain ashes and Portland cement with certain RCRA Oil and Gas, as well as metals RCRA waste associated with the mining and manufacturing industries. Embodiments of the present invention may provide a lower amount of Portland cement per unit of Oil and Gas E&P RCRA wastes or even mining and processing industry metals RCRA wastes. In addition, these characteristics may impact the performance of the final composite of the produced aggregate and subsequent use in concrete, cold asphalt paving material and other final products, or the like. Of course, other coatings or encapsulating materials may be used besides Portland cement which may be substituted in any of the various embodiments of the present invention.

In some embodiments, certain steps may be used to define the selection of ashes to be combined with or without the Portland cement and its impact on processing options. This may include, but is not limited to, any one of or any combination or permutation of the following steps: Step 1. Assess sources of combustion ashes, RCRA waste, and Portland cement availability and perhaps even delivered costs that may impact the costs of producing the aggregate or other final or intermediate products, perhaps so as to estimate the market competitiveness in proposed markets. Step 2. Assess the chemical and mineral characteristics of each component under consideration as potential encapsulation composite. This may assume that the potential Portland cement may have a well-established composition across the US and within the local processing locality. Step 3. Conduct laboratory and/or pilot-scale proportioning, mixing (e.g., high energy mixing) of the key components and perhaps even curing the mixed composite, perhaps to assess the strength development, linear expansion, and even leaching test results (and comparing to state and local leachate levels for various constituents require for beneficial use permits). The chemical and mineral constituents in the cured composite could be determined and may be compared to the results of Step 2. Step 4. Modify the components with specialty chemicals, pretreatment of ashes, a need for a low water/solids ratio, and even a need to pre-treat the RCRA Oil and Gas E&P RCRA wastes to dewater the wastes, perhaps in order to maintain the required low water/solids ratio, based on the results of Step 3. Step 5. Retest Step 3 perhaps with changes in the made in Step 4 and perhaps including freeze/thaw resistance and other aggregate tests such as soundness and abrasion (if required). Those tests may be critical tests (which may determine parameters) in addition with the strength, linear expansion and leachate test data needed to a beneficial reuse permit. Step 6. Assess the composite material and even the level of RCRA waste, as well as the Portland cement/RCRA Oil and Gas E&P waste or mining RCRA waste ratio. The objective may be to lower the Portland cement amount plus a safety addition increase to provide the lowest overall cost of the products and hence the market potential.

A general process for the treatment of ashes or residues from the combustion of carbonaceous fuels may be a series of processes perhaps involving agglomeration and compaction concepts coupled with novel chemical additives to result in aggregate properties. This general process may be discussed first, and then additional embodiments of the present invention are discussed separately.

There may be different scenarios for executing various embodiments of the present invention. For example, the following lists three non-limiting examples of scenarios that may take advantage of multiple encapsulation processes perhaps while maintaining a marketability of the cured product as an aggregate for Portland cement concrete and other products. The selection of a scenario may be based on the type of waste to be encapsulated and perhaps even the characteristics of the encapsulation in stabilizing the mobility of the waste.

EXAMPLE SCENARIO 1: Ingredients such as but not limited to fly ash (4), waste (2), and even Portland cement (3) may be mixed together to provide a first encapsulation (1) and this material may then be compacted, crushed, screened, or the like. The resulting material may then be used in a Portland concrete mix to create a double encapsulation of the ingredients which may be used perhaps for various construction products. Fines from screening may be recycled into future mixes. A waste may include but is not limited to RCRA waste material(s).

EXAMPLE SCENARIO 2: A combination of waste (2), fly ash (4), Portland cement (4), and perhaps any recycled fines (41) may be mixed together to form small beads such as agglomerates (42) of the mixture to provide a first encapsulation. The agglomerate (42) of waste (2), fly ash (4), Portland cement (4) may be a composite and may then be coated with Portland cement (6) which may provide a double encapsulation (5). The resulting double encapsulated balls may be cured, and the rounded encapsulated balls may be used as an aggregate for Portland cement concrete applications which may provide a triple encapsulation. In scenario 2, the mobility of the waste may be prevented if the Portland cement may be compromised or even cracked. The use of the produced aggregate, perhaps due to its shape, may dictate the type of Portland cement concrete applications that can be realized.

Figure 2:
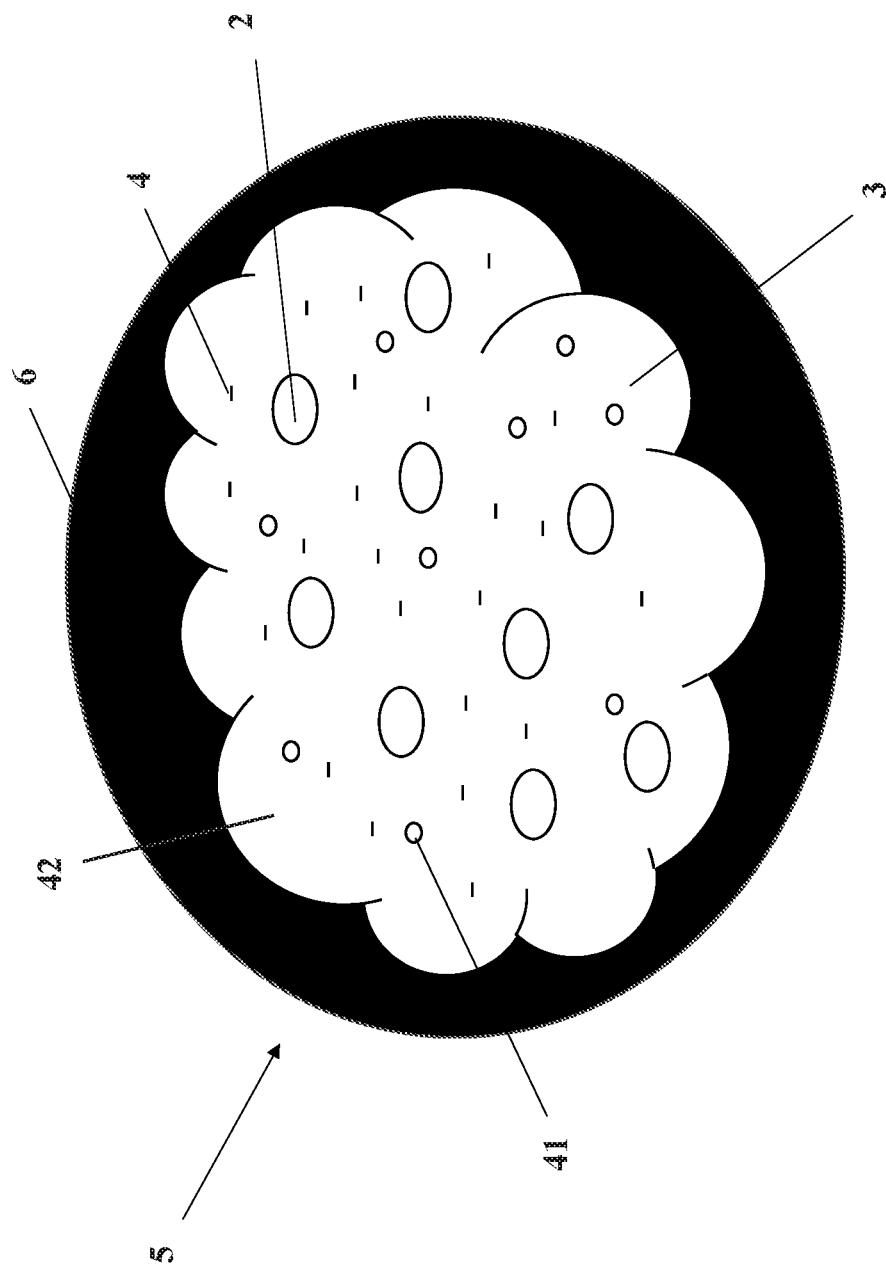
FIG. 2 shows a non-limiting example of a double encapsulation of waste in accordance with some embodiments of the present invention.
Figure 3:
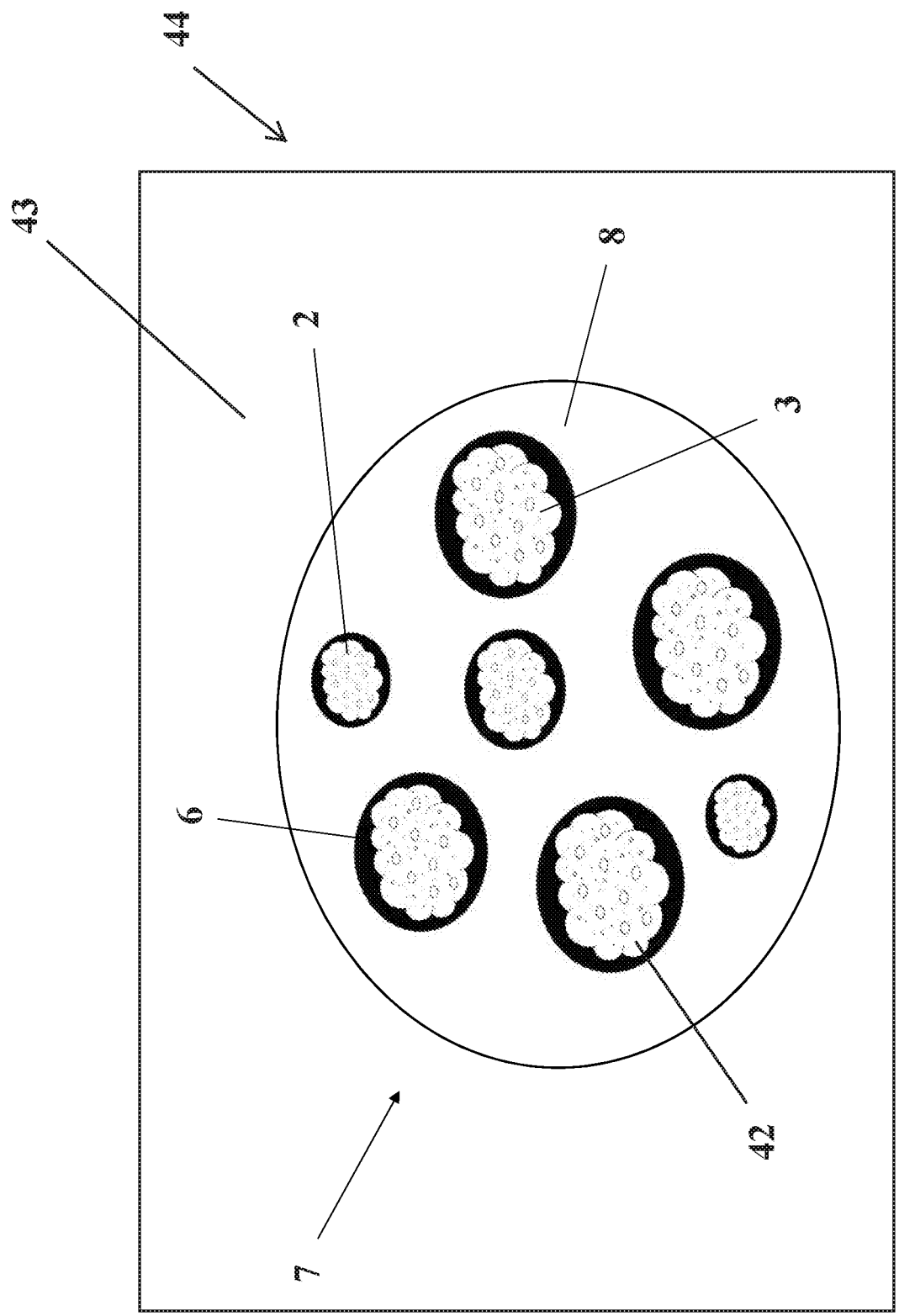
FIG. 3 shows a non-limiting example of a triple encapsulation of waste in accordance with some embodiments of the present invention.

EXAMPLE SCENARIO 3: Scenario 3 may be a combination of Scenario 1 and 2 wherein the waste/ash/Portland cement (and even recycle fines) may be mixed to form small beads such as agglomerates (42) of the mixture to provide a first encapsulation. This may be followed by coating the first encapsulation beads with Portland cement (6) to provide a double encapsulation. At the same time, an ash/Portland cement/water mixture (8) may be mixed and even blended with the first and even second encapsulated coated beads perhaps to provide a triple encapsulation. The combined triple encapsulation (7) mixture may then be compacted and even cured, reclaimed, crushed, screened or the like to make and aggregate materials. Fines may be recycled to feed the first encapsulation step. The use of this aggregate in Portland cement concrete (43) may represent a quadruple encapsulation (44). A graphic representation of the differences in encapsulation of the waste may be understood in FIGS. 1-3.

The selection of a scenario to be used may depend on the quantity of the waste contaminant, the results of leachate tests (e.g., an efficiency of encapsulation) and perhaps the resulting impacts on the final aggregate produced.

A more detailed summary of various embodiments of the present invention is described below. The processing of encapsulation of Oil and Gas E&P oily wastes or metals contaminated RCRA wastes from the mining and processing and manufacturing industries to produce aggregate may involve the production of a cured consolidated or even a compacted product which may have the properties of construction aggregate and may meet various ASTM and AASHTO specifications.

Embodiments of the present invention may provide waste (2) perhaps from an oil and gas flocculant process, from a fracturing process, from base metal mining and processing, from contaminated soil, hydrocarbon containing soil, or the like which can be encapsulated perhaps in an agglomerate (42) which may be an encapsulated agglomerate. Ash (4) may be provided and may even encapsulated in an agglomerate (42). Portland cement (4), perhaps a first supply of Portland cement, may be mixed with a waste and even ash which may create a mixture of Portland cement, waste, and ash. This mixture may be high energy mixed perhaps to create a plurality of agglomerates (42). Agglomerates, which may include waste, a first supply of Portland cement, and ash perhaps as a result from high energy mixing, may be processed perhaps with an agglomerates processor (50) and may encapsulated perhaps to provide a plurality of encapsulated agglomerates (42).

Waste from a fracturing process may include but is not limited to back flow fluid waste, fracture sand, waste water, fracturing fluid, gasoline range organics, diesel range organics, heavy metals, lead, cadmium, arsenic, Resource Conservation and Recovery Act (RCRA) wastes, Section C RCRA wastes, Section D RCRA wastes, produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, waste crude oil from primary Field Site, unused fracture fluid/wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, miscellaneous solids, any combination thereof or the like. Waste from an oil and gas flocculant process may include but is not limited to oil and gas exploration and production contaminated wastewater treatment flocculant, gasoline range organics, diesel range organics, heavy metals, lead, cadmium, arsenic, Resource Conservation and Recovery Act (RCRA) wastes, Section C RCRA wastes, Section D RCRA wastes, produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, waste crude oil from primary Field Site, unused fracture fluid/wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, miscellaneous solids, any combination thereof or the like.

Waste from base metal mining and processing may include but is not limited to tailings, gangue materials, treatment components from preventing release of metals, components from processing base metals; components from smeltering base metals; components from processing of slag; components from disposal of slag, ore, lead, chromium, zinc, copper, cadmium, nickel, any combination thereof, or the like. Waste from said contaminated soil, hydrocarbon containing soil, or the like may include waste from diesel contaminated soil. Portland cement may be Type I/II, Type V, Type I/II/V, or the like. Ash (4) may include but is not limited to flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; any combination thereof; or the like.

In embodiments of the present invention, water (13), chemicals (51), or even fines (15) may be added to a mixture of waste, ash, and even Portland cement. Accordingly, agglomerates (42) may include water, chemicals, fines, or the like. A chemical (51) or other elements may include but is not limited to air entraining agents, retarding agents, chemical additives for Portland cement concrete, any combination thereof, or the like all of which may be added to a mixture of waste, ash, and even Portland cement. In some embodiments, an organic compound, such as but not limited to a surfactant and even air entraining admixture surfactants may be added to a mixture of waste, ash, and even Portland cement.

Figure 4:
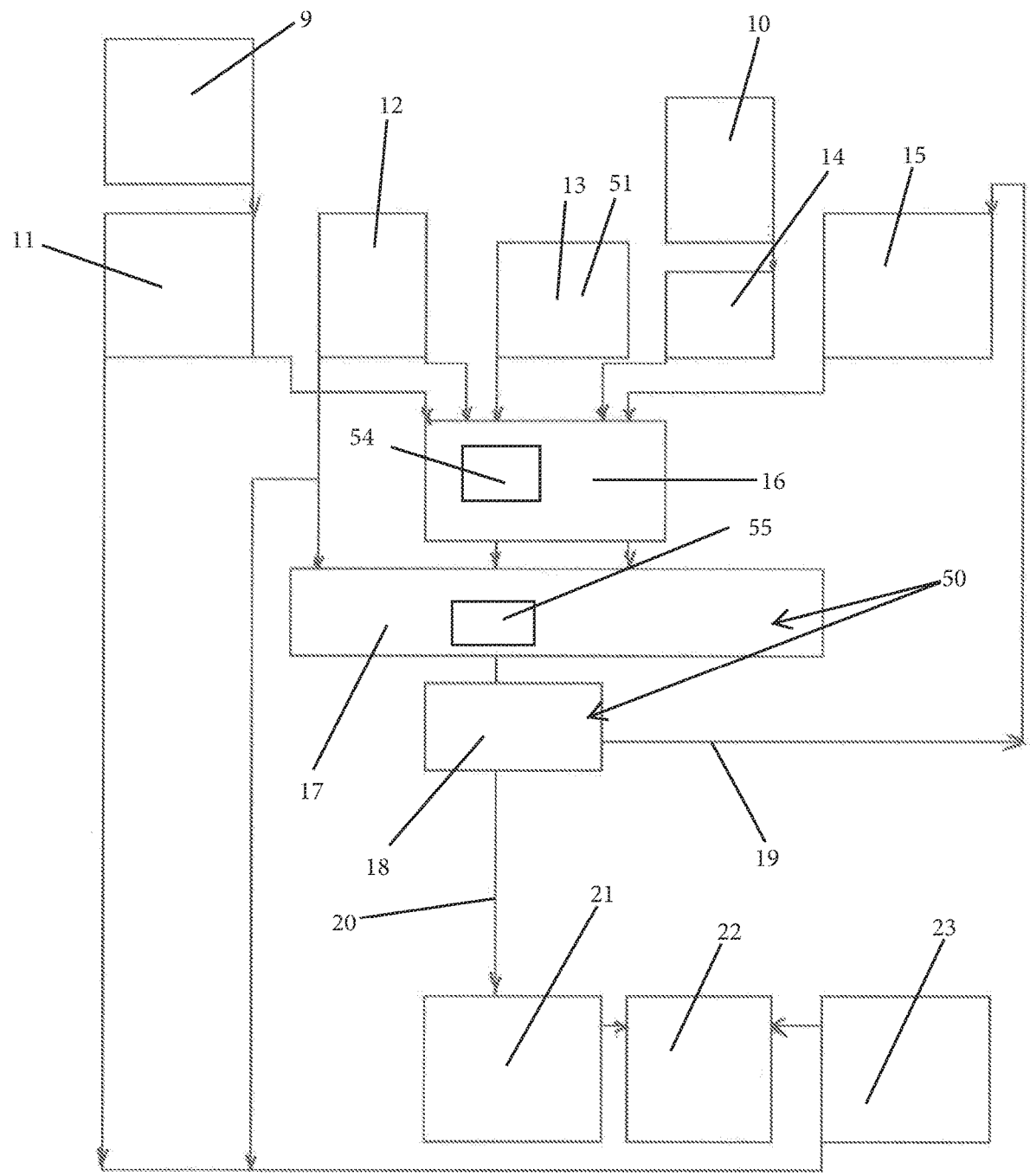
FIG. 4 shows a non-limiting example of a flow diagram for a scenario of encapsulation processing and aggregate production and concrete in accordance with some embodiment of the present invention.

FIG. 4 shows a non-limiting example of the processing steps for example scenario 1 encapsulation processing. The ashes selected for use in the encapsulation process may be pretreated (9) perhaps with an ash pretreatment, if required, perhaps to condition the ash with lime, oxide or the like and hydrate the ashes. The wastes such as Oil and Gas E&P RCRA waste or the metals containing mining and processing wastes to be encapsulated, may be pretreated (10), if required. Waste pretreatment (10) may include but is not limited to dewatering of waste perhaps with a dewatering processor (53), adding ash to the waste such as off-spec Class C or F fly ashes, adding chemicals or minerals to the waste perhaps to fixate the oily wastes, adjusting a pH of the waste perhaps with a pH adjuster (54), perhaps and in the case of metals-containing waste, treat for appropriate pH or conversion to a less soluble chemical form (e.g., carbonated) and/or to dewater the metals-containing wastes, or the like. In some embodiments, a pH of a waste may be between about 10 to about 11 pH. The conditioned ashes (11), the treated wastes (14), such as Oil and Gas E&P wastes or mining and processing or manufacturing industry metals containing wastes, along with Portland cement (12), water (13), specialty chemicals (51), and even fines (15) or recycled fines perhaps produced from a processing step such as a screening step (18) or the like may be introduced to a high energy mixing step (16). The high energy mixer may effectively mix the individual ingredients and the composite may begin to agglomerate into small spheres perhaps with a damp soil like texture. As such, agglomerates (42) may have a sphere shape and may be coated with Portland cement (3) to create a first encapsulation (1) of the wastes (2). The agglomerated composite may then be processed (17) perhaps with an agglomerates processer, such as by pelletizing and even coated with Portland cement to create a first encapsulation (1). Pelletizing of agglomerates may be accomplished by a pelletizer (55). A first encapsulation may be processed (18) perhaps by curing, screening, and even sorting to create a gross product (20). Fines (19) from a curing, screening, or even sorting processing may be recycled as recycled fines (15). A final aggregate may include the encapsulated agglomerates. The final aggregate materials (21) may be mixed with mixtures of Portland cement/fly ash and specialty chemicals (23) to make a Portland cement concrete (22) for various applications, such as but not limited to Portland cement concrete, asphaltic construction applications, highway construction concrete, Jersey barriers, noise barriers, ornamental exterior products, pavers, roller compacted concrete, or the like. The specialty chemicals in (23) may include, but are not limited to, air entraining agents, retarding agents, and other standard chemical additives for Portland cement concrete, or the like.

Figure 5:
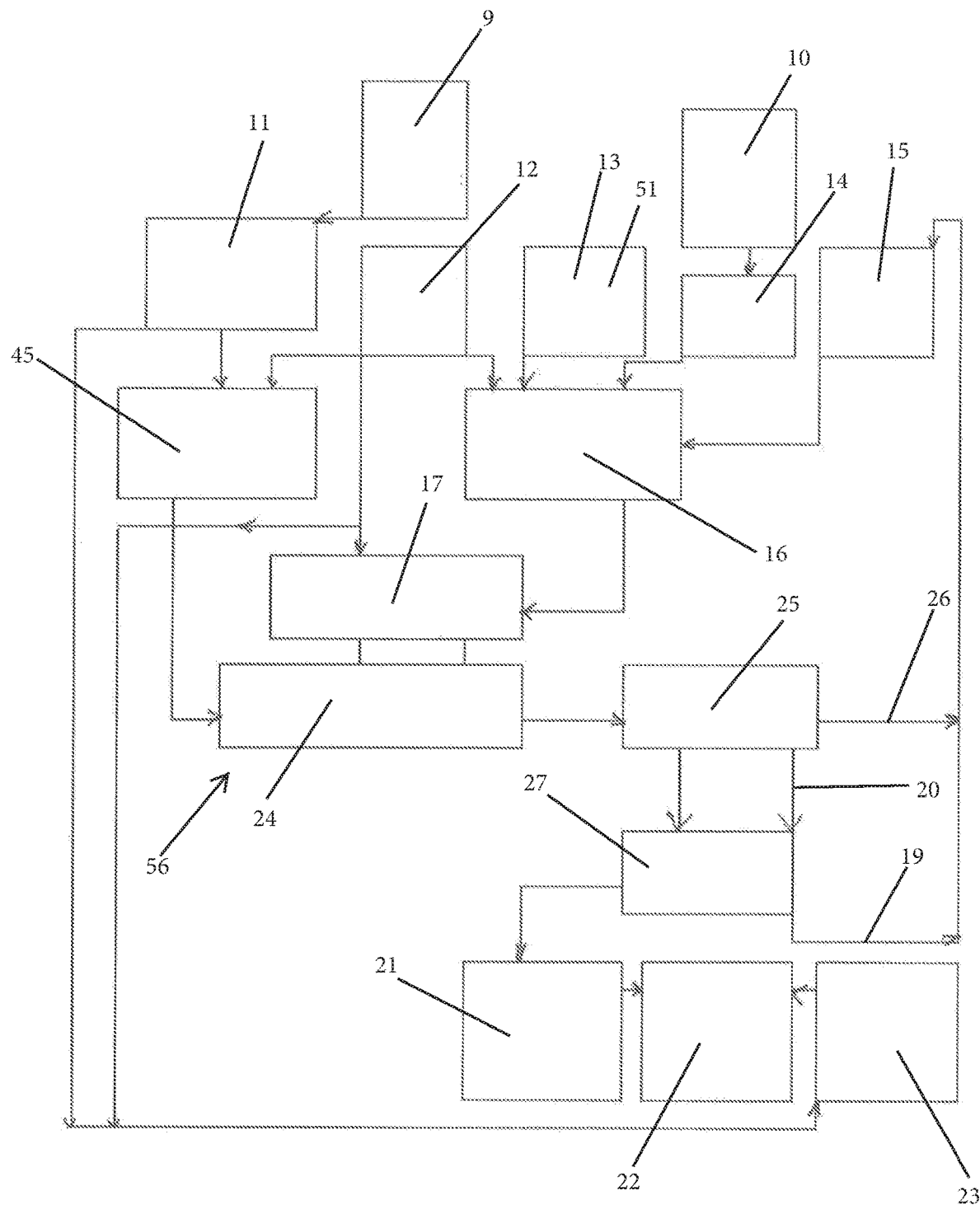
FIG. 5 shows a non-limiting example of a flow diagram for a second scenario of encapsulation processing and aggregate production and concrete in accordance with some embodiment of the present invention.

FIG. 5 shows a non-limiting example of the processing steps for example scenario 2. As with scenario 1, the ashes selected for use in the encapsulation process may be pretreated (9), if required, perhaps to hydrate lime and other oxides in the ashes. Wastes such as Oil and Gas E&P RCRA waste or the metals containing mining and processing wastes to be encapsulated may be treated, if required (10). Waste pretreatment may include but is not limited to dewatering of the Oil and Gas E&P waste, addition of off-spec Class C or F fly ashes or other chemicals/minerals perhaps to fixate the oily wastes, or in the case of metals-containing waste, treat for maintaining appropriate pH or conversion to a less soluble chemical form (e.g., carbonated) and/or to dewater the metals-containing wastes. The treated wastes (14) may be combined with Portland cement (12), water (13), specialty chemicals (51), and perhaps even recycled fines (15) which may have been produced from a reclaiming and/or crushing step (25) and may be introduced to a high energy mixing step (16). A high energy mixer may effectively mix the individual ingredients and the composite may begin agglomeration into small spheres. As such, agglomerates (42) may have a sphere shape and may be coated with Portland cement (3) to create a first encapsulation (1) of the wastes (2). The agglomerated composite may then be processed (17) such as by pelletizing and even coated with Portland cement. Treated ash (11) may be high energy mixed (45) in a separate step which may be added, perhaps along with a second supply of Portland cement (6) to the agglomerates (42) to be processed (24) with blending and compaction perhaps to ASTM D-1557 standards or the like. The final aggregate from the single encapsulation may be added to a second supply of Portland cement which may create a double encapsulation (5). A double encapsulation (5) may have a final aggregate with a second supply perhaps coating of Portland cement that may be with or without ash and with or without chemicals. A compacted encapsulation composite such as a double encapsulation (5) may be processed (25) perhaps by reclaiming with a reclaiming process, crushed with a crushing process, cured with a curing process, sorted with a sorter, and even screened with a screener (27) to produce a gross product (20), fines (19) and even dust (26). Fines and dust may be recycled to recycle fines (15). A gross product (20) may be screened (27) to produce an aggregate that may provide a final aggregate (21) which may be a marketable size fraction and may include coarse aggregate and even fine aggregates. A final aggregate (21) may be mixed with Portland cement, fly ash and even specialty chemicals (23) perhaps to produce Portland cement concrete (22) for a variety of applications as discussed herein. As with Scenario 1, the specialty chemicals in (23) may include air entraining agents, retarding agents, and other standard chemical additives for Portland cement concrete, or the like.

In some embodiments, the present invention may provide pelletizing agglomerates, coating said agglomerates with Portland cement to create a first encapsulation, coating a first encapsulation with a second supply of Portland cement to create a double encapsulation of waste, blending and compacting a double encapsulation, curing a double encapsulation, reclaiming a double encapsulation; crushing a double encapsulation, screening a double encapsulation; and perhaps even creating a final aggregate.

Figure 6:
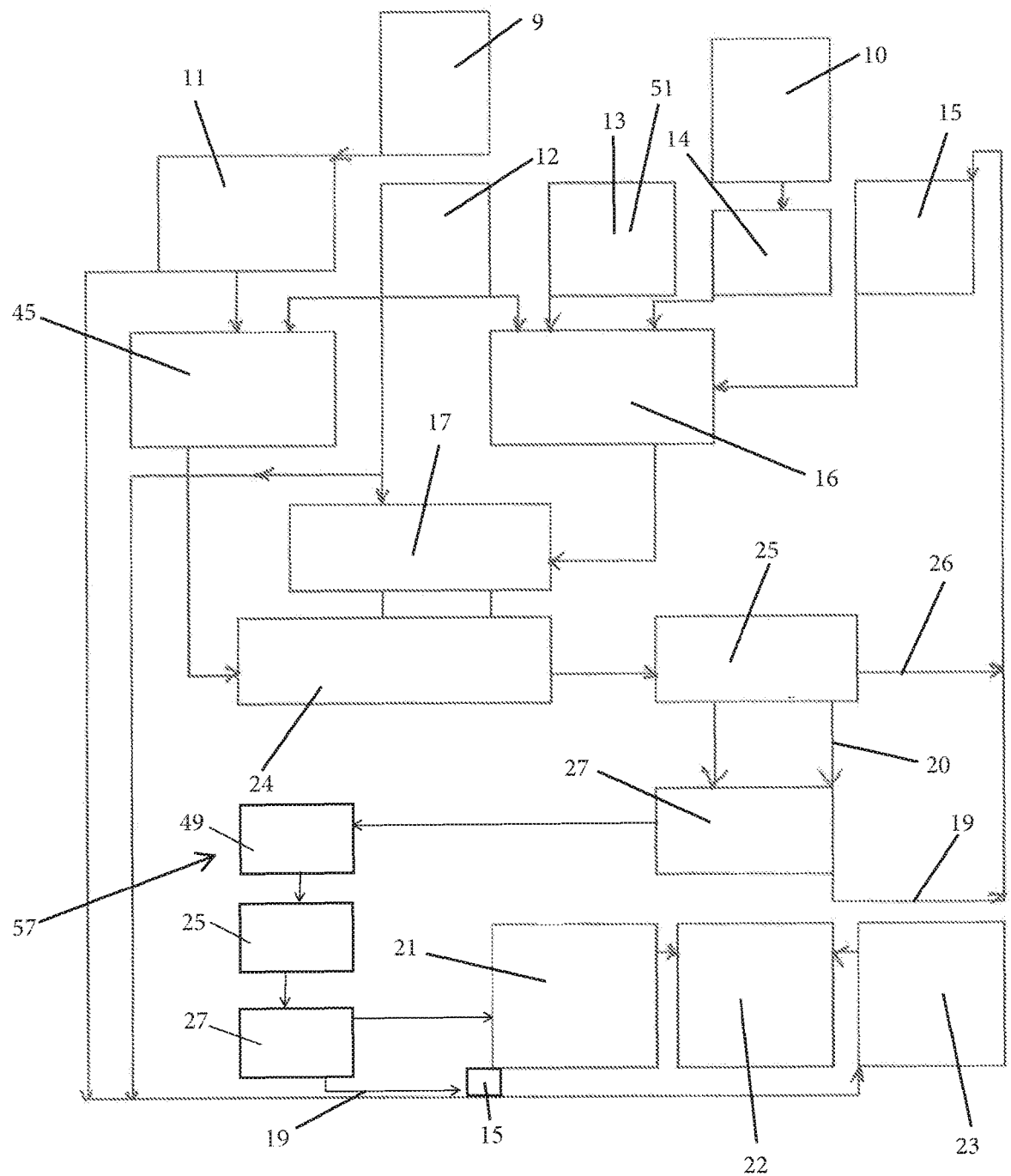
FIG. 6 shows a non-limiting example of a flow diagram for a third scenario of encapsulation processing and aggregate production and concrete in accordance with some embodiment of the present invention.

FIG. 6 shows a non-limiting the processing steps for example scenario 3 encapsulation and processing. With respect to the scenario 3 processing option, this may be a combination of scenario processing options 1 and 2. Ashes may be pretreated (9) and waste may be pretreated (10). The treated wastes (14) may be combined with Portland cement (12), water (13), specialty chemicals (51), and perhaps even recycled fines (15) and may be introduced to a high energy mixing step (16). A high energy mixer may effectively mix the individual ingredients and the composite may begin agglomeration into small spheres. As such, agglomerates (42) may have a sphere shape and may be coated with Portland cement (3) to create a first encapsulation (1) of the wastes (2). The agglomerated composite may then be processed (17) such as by pelletizing and even coated with Portland cement. Treated ash (11) along with a second supply of Portland cement (12) may be high energy mixed (45) in a separate step which may be added to the agglomerates (42) to be processed (24) perhaps with blending and compaction to an equivalent Proctor density of ASTM D1557 compactive energy or the like. The uncured coated spheres from product (17) in the blended product (24) may be somewhat flatted but the coating may not be destroyed perhaps providing integrity of the encapsulated mixture contained within. This compaction can be accomplished by a number of operations, such as roller and/or vibratory compaction processes, as well and pelletization, briquetting, or even extrusion, or the like. This may create a double encapsulation (5). A double encapsulation (5) may have a second coating of Portland cement that may be with or without ash. A compacted encapsulation composite such as a double encapsulation (5) may be processed (25) perhaps by reclaiming with a reclaiming process, crushed with a crushing process, cured with a curing process, sorted with a sorter, and even screened with a screener (27) to produce a gross product (20), fines (19) and even dust (26). Fines and dust may be recycled to recycle fines (15). A gross product (20) may be screened (27) and may be combined with a third supply of Portland cement (49) which may or may not include ash to provide a triple encapsulation (7). The final aggregate from the double encapsulation may be added to a third supply of Portland cement which may create a triple encapsulation (7) of waste. A triple encapsulation (7) may have a final aggregate with a third supply perhaps coating of Portland cement that may be with or without ash and with or without chemicals. A triple encapsulation may be processed (25) perhaps by reclaiming with a reclaiming process, crushed with a crushing process, cured with a curing process, sorted with a sorter, and even screened with a screener (27) to produce an aggregate that may provide a final aggregate (21) which may be a marketable size fraction and may include coarse aggregate and even fine aggregates. A final aggregate (21) may be mixed with Portland cement, fly ash and even specialty chemicals (23) perhaps to produce Portland cement concrete (22) for a variety of applications as discussed herein. A final aggregate (21) which may include a triple encapsulation of waste may be added to Portland cement (43) (which may be considered a fourth supply of Portland cement), perhaps with or without ash and chemicals to produce a quadruple encapsulation (44).

In some embodiments, the present invention may provide an agglomerates processor (50) which may be a pelletizer processor, a double encapsulation including an encapsulated agglomerates coated with a second supply of Portland cement, a double encapsulation processor (56) which may include a blending processor, compacting processor, curing processor, reclaiming processor, crushing processor, screening processor, or the like, a triple encapsulation with may include a processed double encapsulation coated with a third supply of Portland cement; and perhaps even a triple encapsulation processor (57) which may include a reclaiming processor, crushing processor, screening processor, or the like which may be configured to produce a final aggregate.

Ashes involved in the processing and encapsulation embodiments of the present invention may include both flue gas desulfurization ("FGD") technologies, including wet scrubbers or wet FGD, dry scrubber FGD (e.g., spray driers) sorbent injection technologies, fluidized bed combustion (FBC technologies) that may include the fly ash and even bottom ash (FBC bed ashes), and perhaps even Class C and Class F pozzolanic fly ashes or Pulverized Fuel Ashes (PFA) or the like.

A high intensity of mixing of the Portland cement/ash with metal waste and/or Oil and Gas E&P RCRA wastes with or without water and additives, as compared to an intensity which may be typically used in the industry (e.g., a low intensity), may be an intensity which the instant invention describes as high energy mixing. The high energy mixing at low water/solids ratio may provide a number of encapsulation composite materials with high strength, high dimensional stability and even high density (e.g., low pore space) perhaps required for encapsulating wastes. These physical characteristics for ash only composites were substantiated for ash/water combination under U.S. Pat. Nos. 6,334,895, 6,808,562, and 6,517,631. Similar performance may be expected and may be supported for the proposed Portland cement/ash/metals and/or Oil and Gas E&P RCRA wastes process and final product performance as related to mobility of the RCRA wastes having been encapsulated. An example of characteristics of what may be meant by high energy mixing may be specified in U.S. Pat. Nos. 6,334,895 and 6,517,631 as reference to an ASTM "Standard Method For Mechanical Mixing Of Hydraulic Cement Pastes And Mortars of Plastic Consistency." Embodiments of the present invention may provide that produced agglomerates meet ASTM or even AASHTO specifications.

An embodiment of the present invention may include the effect of mixing energy on the strength development of combustion ash-water combinations. While the use of high energy or even high energy mixing may be beneficial to combining all types of all combinations of components with water, it may show unanticipated levels of increased strength development when mixed with high energy. The amount of energy can be quantitated perhaps with reference to an ASTM "Standard Method for Mechanical Mixing Of Hydraulic Cement Pastes And Mortars of Plastic Consistency" which may be periodically updated. As mentioned above, the standard may be used to equate common commercial processing practices, such as the use of a pug mill (about 20 to about 40 seconds of processing time in a pug mill may be equated to a 1982 ASTM standard of about eight seconds in a Hobart N-50 mixer set at speed level 1). In embodiments of the present invention, one may combine about 2000 grams of combustion ash with about 200 to about 800 grams of water perhaps in a Hobart mixer for about one minute perhaps at speed level 1 and then may continue to mix the combination material for above about 2 minutes more perhaps at speed level 2 (which may mix at a faster rate than speed level 1) which may be an non-limiting example of high energy mixing. High energy mixing (16) may include but is not limited to mixing waste, ash, and even Portland cement in a Hobart mixer for about one minute at a first speed; and continuing to mix for two minutes at a higher speed where a first speed may be level one and a second speed may be level two. It is notable that it may be possible to mix dry mix components with water perhaps at this intensity and perhaps even for these extended times perhaps because the components-water mixture may not manifest thixotropic properties or even other processing problems which may preclude this level of high energy mixing. Low energy with regard to the tables and figures disclosed herein may relate to an equivalent of a Hobart mixer operating with about 2000 grams of components and perhaps between about 200 to about 800 grams of water combined perhaps at speed level 1 for one minute and perhaps at speed level 2 for two minutes.

In embodiments of the present invention, high energy mixing of combustion ash and Oil and Gas E&P RCRA oily wastes with or without Portland cement and water may dramatically improve unconfined compressive strength perhaps with regard to certain types of ash, such as FBC combustion fly ash. Although the specific increase in strength may vary from one type of ash to the other, combining combustion ash perhaps with high energy with or without Portland cement and RCRA metals containing wastes and/or Oil and Gas E&P RCRA wastes may enhance the unconfined compressive strength of consolidated encapsulation material The enhanced effect of high energy mixing on strength development may cover a broad range of water/solids ratios. As one may expect, a mixing energy may have a larger effect at low water/solids ratios than at high water/solids ratios. This may be due to the benefit of high energy mixing on the dispersion of the solids and water, perhaps allowing an increase in the density (e.g., smaller pore size) and even increasing strength development. Significantly, consolidated Portland cement/combustion ash encapsulated waste material of commercial value can be produced.

Also related to the use of high energy mixing and even an increase in density of the Portland cement/combustion ash/water Oil and Gas E&P oily wastes (gasoline range organics ("GRO") and diesel range organics ("DRO") containing RCRA waste) may be the reduction in the size of the pore volume in the consolidation material. Smaller high energy mixing pore sizes may enhance the density and even unconfined compressive strength of consolidated combustion ash materials but may also be detrimental in consolidated materials prepared from certain ashes. Certain ashes may tend to produce certain minerals which may grow in the small pores that with growth may result in cracking of the consolidated encapsulated composite material.

As with high energy mixing of ash, the high energy may be used with the encapsulation process, a maximum dry density may be achieved using an ASTM D-698 compactive effort which may be comparable to that achieved using an ASTM I)-1557 compactive effort on encapsulation composite combinations mixed at low energy. As such, with high energy mixing, the compactive density can achieve an ASTM D-1557 compactive effort with an ASTM D-698 compactive effort which may also provide the associated strength development perhaps with less compactive effort.

Another beneficial effect of high energy mixing of Portland cement/ashes/metals and/or Oil and Gas E&P RCRA wastes and water may be that it may enhance dimensional stability of consolidated combustion ash-water combinations. The use of high energy mixing may have a positive effect of lowering the expansion characteristics of encapsulated waste composites, perhaps providing dimensional stability, providing enhanced immobilization of the encapsulated waste.

In embodiments of the present invention, an interesting observation may include the use of off-spec Class F or Class C fly ashes that may have unburnt carbon contents above the ASTM C-618 specifications which can assist such that these materials can be introduced with the Oil and Gas E&P oily waste. The effect may be that the unburnt carbon can assist with the GRO and DRO constituents to adhere to an extent, perhaps enhancing the immobility of the GRO and DRO wastes. Other high carbon fly ashes perhaps from stoker fired steam heating systems may be used at residential heat systems. The fly ash in these systems may represent approximately 80% bottom ash and about 20% fly ash, but the fly ash may often contain unburnt carbon contents of about 30%, perhaps allowing for lower amounts of these unburnt carbon residues, as compared to about 5% carbon off-spec Class F or Class C ashes. The reason that these wastes are not used may be because they may hinder the application of air entraining admixtures used to generate bubbles in the Portland cement to protect against F/T cycles.

Another embodiment of the present invention may include the preconditioning process as may be further described in detail below. Additives may be added to the Portland cement/combustion ash(es)/RCRA-D and/or RCRA-C waste and water perhaps to control various chemical reactions and may alter various properties of the finished cured consolidated Portland cement/combustion ash material/RCRA-D waste or even potential RCRA-C. These chemical reactions may involve the conversion of oxides to hydroxides and even the conversion of soluble compounds such as, but not limited to, sulfates, alumina, and silicates and other compounds such as calcium silicate, calcium aluminate, or calcium sulfa-aluminate to minerals, or the like. When these chemical reactions may be properly controlled, the resulting hydroxides and minerals, individually or even collectively, may enhance various properties of the cured consolidated encapsulation waste combination material as described in detail below. The amounts of the RCRA waste/Portland cement/RCRA waste/combustion ash(es), of the water, and of the additives may be subsequently combined. The manner of combining the Portland cement/combustion ash(es)/RCRA waste, water, and additives may be of substantial importance and examples thereof are addressed in detail below. The combination of Portland cement/combustion ash(es)/RCRA waste material may then be consolidated by an encapsulation process. Below are five basic encapsulation non-limiting examples of processes concepts and a number of variations on each concept.

Embodiments of the present invention may address one of the primary concerns related to the production of construction related materials from certain ashes containing lime, soluble sulfates, calcium aluminate, and calcium sulfoaluminate (precursor pore filling compounds) or the like which may enter the pore volume of the cured consolidated combustion ash materials and may subsequently form minerals such as ettringite, gypsum, calcium silicate hydrates and calcium aluminate hydrates (pore filling compound) or the like. Ettringite may have needle-like crystals which may easily fill the pore volumes and with increased formation may result in micro-cracks leading to loss of strength and even potential mobility of the encapsulate metals and/or Oil and Gas E&P RCRA wastes containing GRO and DRO contaminants.

The formation of ettringite, gypsum and other pore filling compounds may be possible only under certain conditions, such as, but not limited to, when free lime, soluble sulfates, and soluble alumina and other precursor pore filling compounds, or the like may be available and perhaps when pH may be greater than about 10. U.S. Pat. Nos. 5,002,611 and 5,152,837 may have shown the benefit of soluble silicate addition to certain, such as CFBC ashes containing free lime. By the addition of other ashes having soluble silicates which may react with the free lime in the CFBC ash, the lime may be converted perhaps preferentially to a less expansive mineral calcium silicate instead of the mineral ettringite. Embodiments of the present invention, by comparison, may deal with sequestration of the calcium ion perhaps by using inexpensive and even readily available sources of soluble carbonates or $CO_2$ gas such as to react with the calcium ion to form calcium carbonate perhaps in preference to ettringite possibly rendering the consolidated combustion ash-water combination immune to ettringite formation. As shown by Bland in U.S. Pat. Nos. 6,334,895 and 6,517,631 the use of soluble carbonates may have little effect on strength development but may have a significant impact on expansion. The amount of ettringite and even gypsum formation may be reduced with soluble carbonate treatment, while calcite concentrations may increase with treatment.

In addition, the use of soluble carbonates may be beneficial in that they may improve the ASTM C-88 soundness characteristics of the cured compacted consolidated Portland cement/combustion ash RCRA waste composite encapsulation materials. Soundness stability of aggregate made with the beneficial effect of soluble carbonate addition may enhance the durability of the encapsulated aggregate. Without the treatment, the resultant aggregate may not meet the Soundness tests and instead may disintegrate over time. With treatment, the loss can be brought within the ASTM limits. ASTM sets limits of about 15% for losses with the ASTM C-88 soundness test. A potential option may involve the direct contacting of a high $CO_2$-rich gas with the ash as a preconditioning of the ash to be used. Conceptually, the contacting of the high lime ash with a gaseous $CO_2$ stream such as flue gas or enriched flue gas could be an option for ashes perhaps with high free lime contents in that direct gas contacting may be more economical. The contacting mechanism could be integrated with the hydration or even the pre conditioning step. The $CO_2$ could react with the CaO or $Ca(OH)_2$ in the ash and may form a carbonate perhaps as in the case of soluble carbonate addition.

Figure 7:
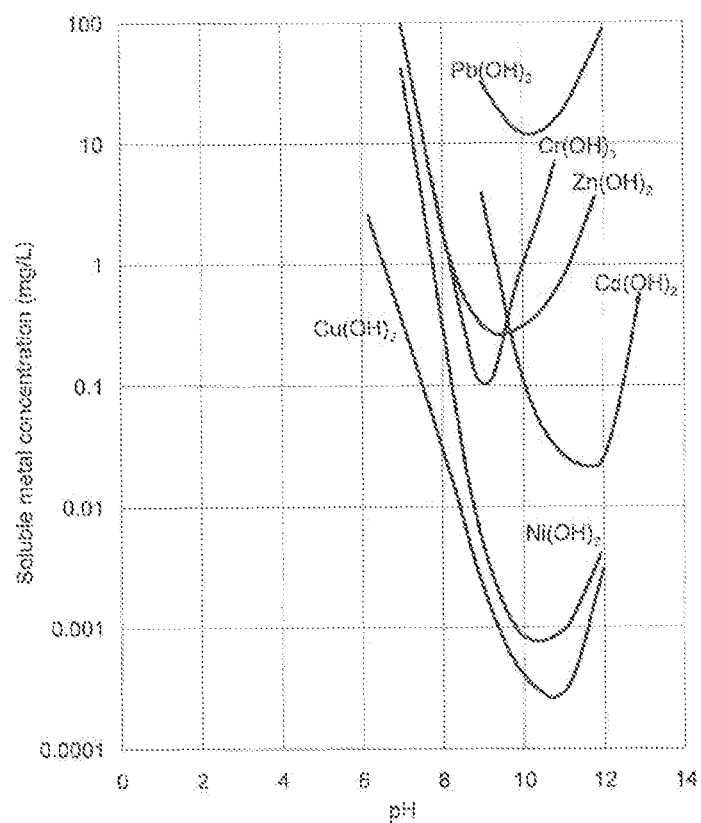
FIG. 7 shows a graph of the calculated solubility of metals as a function of pH in accordance with some embodiment of the present invention.

It may be known that the immobility of metals may be a function of the pH of the metals chemistry as shown in FIG. 7. Embodiments of the present invention may employ chemical additives perhaps to maintain the pH of the about 10 to about 12 which may convert metals to hydroxides or may convert the metals as metal carbonates or other insoluble metal complexes, or the like.

Embodiments of the present invention may include a preconditioning of the combustion ash perhaps to affect the completion of the lime hydration reaction such as in a two-step process and perhaps with controlled weight percent amount of remaining lime to hydrated CaO containing ash. The use of high energy mixing and processing can be beneficial to the resultant properties of the aggregate produced.

Normal weight aggregates may need to meet or exceed standards for road base and even concrete aggregate use as set forth by ASTM C-33 which is hereby incorporated by reference. It may be desirable to adjust the strength of and even limiting the linear expansion of cured consolidated combustion ash material produced by existing cold bonding processes, such as those disclosed by U.S. Pat. Nos. 4,624,711; 5,152,837; 5,002,611.

Many ashes from coal combustion processes may set and even harden perhaps too fast or even too slow for ease of handling or processing. For example, many of the Class C ashes may have a tendency to flash set when exposed to water. This flash setting may be noted for Class C fly ash. Flash setting can occur within about five minutes. As a result, retarders may be needed to enhance the workability of the Portland cement/combustion ash mixture. Several such retarders may be identified.

Strength development of ashes with or without Portland cement and wastes used in the aggregate process may also be dependent on the specific reaction chemistry of the individual type of ash. The type of ash may determine the suite of activator and even the strength development additives that may be required for the aggregate process. For Class F ashes, there may be no self-cementation that may occur, and the addition of a binding agent may be necessary for strength development.

Additives such as Portland cement, self-cementing ashes, and lime, or the like can be used to trigger the pozzolanic reactions. For Class C ashes which may have self-cementing character, additives such as Portland cement may be needed to enhance the strength development. For CFBC ashes which may show self-cementing characteristics, it may be necessary to add chemicals such as soluble silicates and/or aluminates, or the like to enhance the strength development, perhaps in addition to Portland cements or cementitious ashes. The addition of lime may have been shown to be needed for CFBC ashes that may be low in free lime such as PFBC ashes and ashes from the combustion of low-sulfur coals, or the like. Non-limiting examples of chemicals used to process combustion ash may include, aluminum sulfate, sodium silicates and even high sulfate resistant Portland cements, or the like.

In other embodiments of the present invention, waste water may be used as a replacement for potable water. Power plants may generate a number of liquid wastes that they may be required to dispose. Many of these wastes can be incorporated into the aggregate product. Testing may be conducted using ash from CFBC facility and perhaps a cooling tower blowdown material from another power plant. The material can be easily incorporated into the combustion ash perhaps as a pretreatment step. The resulting material may not have the detrimental effects on the strength properties of the aggregate product. In fact, there may be some evidence that it may improve strength development and even dimensional stability (expansion), particularly at extended curing conditions.

The use of alternative water in place of fresh water for ash conditioning can be economically attractive, perhaps while conserving fresh water (well) resources. For example, the use of alternative water sources can eliminate the cost of treatment and disposal of these waste waters.

The additive or specialty chemicals proposed in the various embodiments of the present invention may benefit the cold bonding process and even the product perhaps by increasing strength, reducing dimensional instability and even improving soundness durability. Waste water treatment liquors, such as cooling tower blowdown, can be incorporated in the aggregate product.

Embodiments of the present invention may provide processes and methodology needed to meet the above critical factors that may control the efficiency of encapsulation and even the long-term non-mobility of the encapsulated RCRA wastes constituents.

The treatment of combustion ash to produce aggregate may involve the production of a cured consolidated or even compacted product which may have the properties of construction aggregate and may meet various ASTM and AASHTO specifications as mentioned above.

Embodiments of the present invention may disclose both methods and apparatus to control various physical and chemical characteristics of combustion ashes with Portland cement and various RCRA wastes from the Oil and Gas E&P perhaps as they relate to cold bonding processes, and perhaps as they relate to the cured consolidated materials which may result from these processes. Specifically, embodiments of the present invention may relate to cured consolidated combustion ash materials which may have been standardized for use as normal weight aggregate for use in structural and landfill applications, or the like.

The development of economical re-use and even encapsulation technologies for these ingredients, has been slow. The obstacles are both technical, as well as regulatory and legislative. One of the prominent technical issues may be the inability to produce products which have certain required engineering properties or meet particular standards in the industry.

An issue in the field may be the increasing use of self-cementing combustion ashes, such as Class C and FBC ash, which may contain large amounts of free lime and other oxides as a replacement of the use of costly cement and lime additives in external cold bonding processes such as disclosed by U.S. Pat. Nos. 4,624,711; 5,512,837; and 5,766,338 such as to increase the strength of the cured consolidation combustion ash product. As the use of self-cementing ashes in other processes may have increased, there may have been an increased and even unresolved need for effective and economic processes for controlling the expansion in conditioned and consolidated combustion ash due to hydrate or mineral formation.

An issue which may exist with regard to processing RCRA waste, ashes, Portland cement and even additives may relate to the existing practices. Cured consolidated encapsulation materials which may result from existing apparatus and methods which may combine dry ash, RCRA waste, water and other additives at low energy may not develop optimum strength, may have high permeability, or may also have increased amounts of expansion. The amount of energy used to combine these components can be quantified with reference to "Standard Method for Mechanical Mixing of Hydraulic Cement Pastes and Mortars of Plastic Consistency", ASTM C305-82 which is hereby incorporated by reference. In actual practice, this standard may have been used to quantify the amount of energy with which wet flue gas desulfurization sludge (FGD sludge) may be processed such as disclosed in U.S. Pat. No. 4,613,374. Blending FGD sludge in a pug mill for about 20 to about 40 seconds may be a common commercial processing practice and may have been equated to about eight seconds of mixing in a Hobart N-50 mixer set at speed level 1. U.S. Pat. Nos. 4,613,374 and 5,211,750 may disclose that the manner of pug mill can be beneficial with regard to processing FGD sludge and perhaps other materials that have thixotropic properties. RCRA wastes, ashes, Portland cement and additives may not be thixotropic and yet an unexpected relationship may exist with regard to how dry ingredients may be combined with water and the enhancement of various characteristics of cured consolidated combustion ash materials.

An issue related to combining combustion ash, Portland cement and RCRA wastes with water and other additives may be the ability to disperse the water throughout the combined solids evenly at low water to solids ratios. However, water to solids ratios which may be above about 0.30 may not achieve the level of strength which may be achieved using identical types of combustion ash at water to combustion ash solids ratios less than about 0.30.

Embodiments of the present invention may include a range of compaction process methods including roll compaction, vibratory compaction, pelletizers, agglomerators, briquetters, or other compaction techniques/equipment.

Embodiments of the present invention may include additives for the pre-treatment of oily wastes may include cement; gypsum, lime, and fly ash; cement, lime, fly ash, and $H_2O_2$; pozzolan, lime:lime and kaolinite; cement and lime; cement, lime and $H_2O_2$, cement and $H_2O_2$; cement and iron; cement, lime, and iron; cement and fly ash; and perhaps even cement and organophilic clay, as well high unburnt carbon containing ashes, such as Class F and Class C off spec ASTM C-618 ashes or even other municipal or institutional heating systems that burn coal and have ashes with high unburnt carbon contents, or the like.

Embodiments of the present invention can include sand, bottom ash and/or bed ash to improve consistency of the mix with high energy mixing thereby reducing the water/solids ratio and thereby increasing strength and durability of the cured composite encapsulating materials. Embodiments of the present invention disclose basic ideas and concepts which address each of the above-mentioned problems relating to cured consolidation materials from cold bonding processes. As such, embodiments of the present invention provide apparatus and methods for the processing, consolidation and curing of encapsulated wastes composite to form novel materials, as well as, for the improvement of various characteristics relating to cured encapsulation composite materials processed by existing technology.

In embodiments, the general process for cold bonded technology may be flexible and may offer a range of processing options that can be specifically customized to the ashes and RCRA wastes being considered and the resultant cured consolidated combination material or aggregate product/application which may be desired.

Embodiments of the present invention may provide dewatering of flocculation or other wastes before use in an encapsulation process or the like. A dewatering process such as with a dewatering processor (53) may be considered a waste pretreatment (10). Dewatering may be achieved by allowing a waste to settle perhaps with a water settler (58) and then skimming off a decant perhaps with a decant removal (59) or may even be achieved by adding ash to a waste, or the like. Dewatering may include but is not limited to filtration, pressure filtration, centrifugal separation, oxidative additives, any combination thereof, or the like. Flocculant waste may be sheared (28) perhaps with a flocculant shearer (52). As may be understood in FIG. 8, a dewatering scenario 1 may include but is not limited to filtering a flocculant which may be a sheared flocculant (28) through a sand filter (29) to remove flocculant (46) from water. The flocculant (46) may be used in aggregate production perhaps fed to an aggregate production mix (34) perhaps with a flocculant feed (60). A sand filter may provide sand filtrate (30) which may include water, which may be cleaned with a PMAC filter (31) which may be a sand filtrate PMAC filter, perhaps to provide a clean sand filtrate (47) which may be fed to an aggregate production mix (34) perhaps with a clean sand filtrate feed (61). A PMAC filter may include high carbon ash or the like. Oxidizing agents (32) may be added to a clean sand filtrate perhaps to provide clean water (33). Oxidizing agents may include but are not limited to oxygen, peroxides, chlorine, ozone, fluoride, hydrogen peroxide, nitric acid, peroxydisulfufic acid, peroxy mono sulfuric acid, air, ferrate, ferrate (IV), any combination thereof, or the like.

Figure 9:
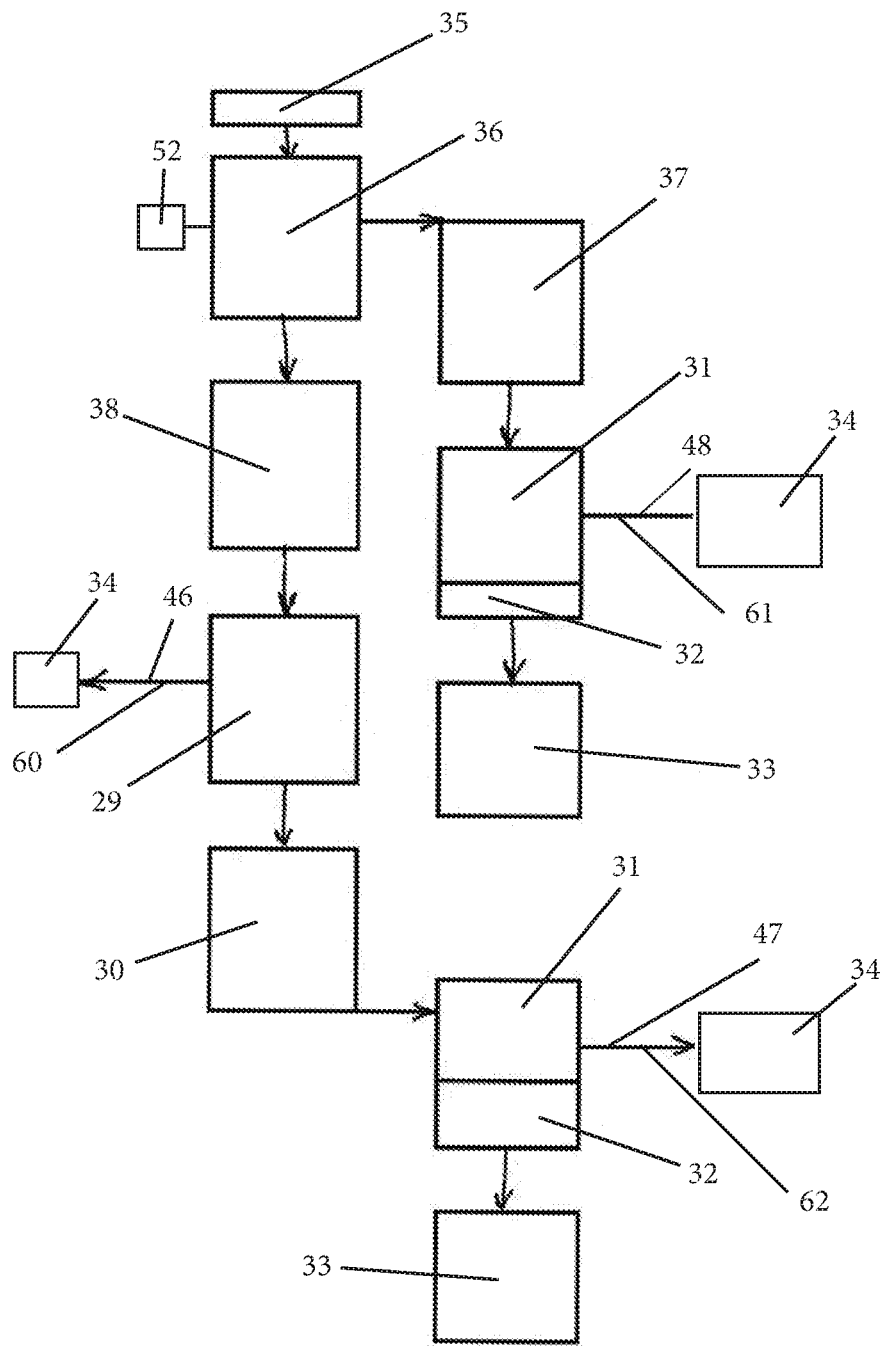
FIG. 9 shows a non-limiting example of a flow diagram for a second scenario of dewatering flocculation materials in accordance with some embodiment of the present invention.

As may be understood in FIG. 9, a dewatering scenario 2 may include but is not limited to pressure filtering perhaps with a pressure filter (36) flocculant in a waste (35) perhaps to provide a pressure filtrate (37) and filtered flocculant (38), shearing a filtered flocculant perhaps with a shearer (52), removing flocculant from water of a filtered flocculant with a sand filter (29), feeding a flocculant (46) perhaps with a flocculant feed to an aggregate production mix, cleaning sand filtrate (30) exiting a sand filter perhaps with a PMAC filter (31) which may be a sand filtrate PMAC filter, to provide a clean sand filtrate (47), feeding a clean sand filtrate (47) perhaps with a clean sand filtrate feed to an aggregate production mix (34), adding oxidizing agents (32) to a clean sand filtrate perhaps to provide clean water (33), cleaning pressure filtrate (37) exiting a pressure filter (36) perhaps with a PMAC filter (31) which may be a pressure filtrate PMAC filter, perhaps to provide a clean pressure filtrate (48), feeding a clean pressure filtrate (48) perhaps with a clean pressure filtrate feed (62) to an aggregate production mix (34); and perhaps even adding oxidizing agents (32) to a clean pressure filtrate perhaps to provide clean water (33).

Figure 10:
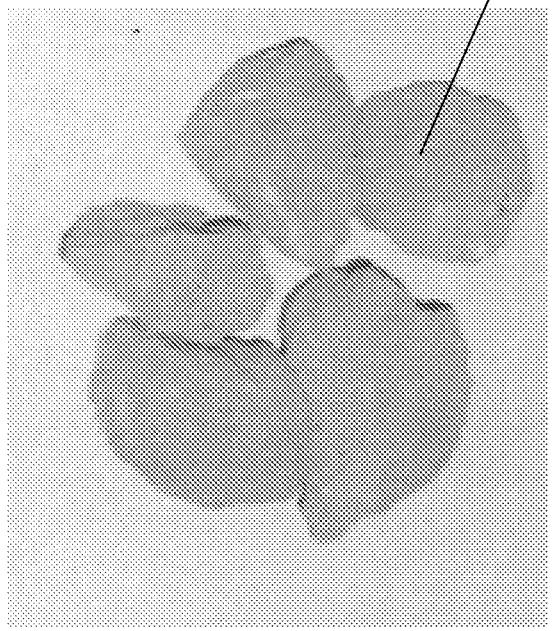
FIG. 10 shows a non-limiting example of photograph of an aggregate produced in accordance with some embodiment of the present invention.
Figure 11:
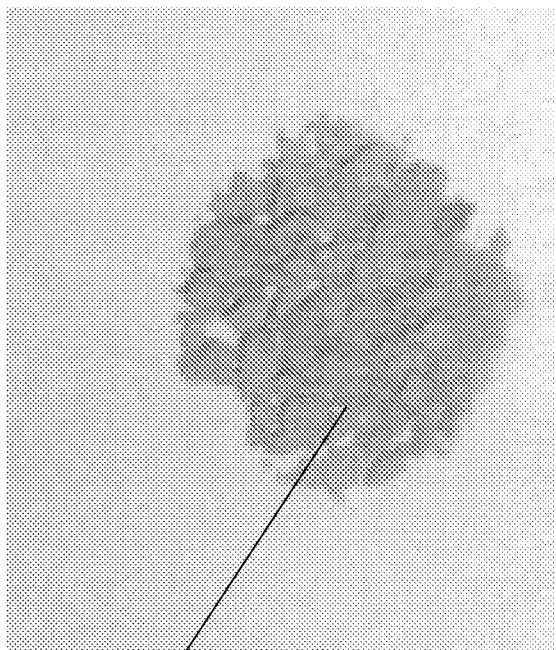
FIG. 11 shows a non-limiting example of photograph of an aggregate produced in accordance with some embodiment of the present invention.

FIGS. 10 and 11 provide non-limiting examples of an aggregate sized to about 1 inch by about 4 MESH (39) and an aggregate through 4-MESH (40). These were produced with the embodiments of the present invention. The 1-inch sized aggregate may be typical of a coarse aggregate used in Portland cement concrete, while the 4 MESH may be typical of fine aggregate used in Portland cement. As such, it may be possible to replace both the coarse aggregate and fine aggregate needs of typical Portland cement concrete.

EXAMPLES

Five non-limiting examples are discussed below which evaluate the encapsulation of Oil and Gas E&P wastes. The wastes represent (a) the encapsulation of blowback fracking sand and fluid waste, (b) the encapsulation of an oil and gas wastewater treatment flocculant, (c) the encapsulation of combined blowback (racking sand and fluid waste and oil and gas flocculant wastes, (d) encapsulated mining and metals processing waste, and (e) encapsulated diesel contaminated soil. Three wastes in the examples contain gasoline range organics ("GRO") and diesel range organics ("DRO") and one of the wastes contains heavy metals, such as lead, cadmium, arsenic, and the like.

Example 1: Fracture Blowback Flow Fluid Waste and Sand

A fracturing fluid can be injected in a gas shale which can provide parting of the shale to facilitate the release of gas in unconventional oil and gas E&P wastes which can back flow from the well. Fracture sand and waste water may be associated with this back flow. The waste may be a combination of the fracturing sand and components of the fracturing fluid. It may be desirable to encapsulate the GRO and DRO contained in the waste.

Test Series 1-1

In the example 1 tests, the wastes were encapsulated according to Scenario 1, wherein the waste may be high energy mixed with Class C fly ash with or without Portland cement with different Portland cement to 'frac' wastes ratios perhaps to assess the degree of Portland cement needed to provide good strength development and encapsulation under SPLP leaching protocol. The high energy mixture may be compacted to achieve the ASTM D-1557 compaction density and may be cured at 23 degrees Celsius under a sealed container. The percentages of the ingredients as well as the Portland cement (PC)/waste ratio and the Proctor density in lbs./cu.ft. are shown in Table 3.

TABLE 3

Mixes Using Class C Fly Ash, Portland Cement, and Contaminated Fracturing Sand

| Mix Ingredients, g | Frac WY-A | Frac WY-D |
| --- | --- | --- |
| Fracture Fluid/Sand Blowback Waste | 1500 | 1500 |
| Class C Fly Ash | 1100 | 375 |
| Portland Cement (PC) | 0 | 750 |
| Additive | 0 | 28.6 |
| Water | 167 | 91.1 |
| PC/Fly Ash Ratio | 0 | 2:1 |
| PC/Waste Ratio | 0 | 1:2 |
| Proctor Density, lbs/cu. ft | 140.99 | 150.04 |

The results of the SPLP leaching tests are presented in Table 4. There may be a slight decrease in the GRO and DRO concentrations in the leachate with the Frac WY-D sample that contains a PC/Waste ratio. Both samples meet leachate levels noted in the State of Wyoming's requirements dealing with the beneficial use of the encapsulated contaminated fracture material. Interestingly, the encapsulation of the waste without the deployment of Portland cement also meets the requirements. This may provide evidence that the use of Portland cement can be reduced significantly perhaps without affecting the leachability of the encapsulated composite. The slightly higher concentrations of GRO and DRO could also be accounted for perhaps due to the lower compacted density.

TABLE 4

Summary of the Results of SPLP Leaching Tests of Potential Contaminants in Encapsulated Composite

| | MCLG (mg/L)[1] | MCL (mg/L)[2] or TT[3] | Sample 1 1 (mg/L)[4] | Sample 2 1 (mg/L)[4] |
| --- | --- | --- | --- | --- |
| Proctor (Mix A Sample 1) | | | | |
| Arsenic | 0 | 0.010 | ND (<0.001) | ND (<0.001) |
| Barium | 2 | 2 | 0.70 | 0.82 |
| Cadmium | 0.005 | 0.005 | ND (<0.001) | ND (<0.001) |
| Chromium | 0.1 | 0.1 | 0.021 | 0.019 |
| Lead | 0 | 0.015 (TT) | ND (<0.001) | ND (<0.001) |
| Mercury | 0.002 | 0.002 | ND (<0.002) | ND (<0.002) |
| Selenium | 0.05 | 0.05 | 0.012 | 0.012 |
| Silver | No listing[5] | No listing[5] | ND (<0.001) | ND (<0.001) |
| GRO[6], ug/L | 6.6 | 6.6 | ND (<0.40) | 0.057 |
| Tot. Purge. HC[8], ug/L | | | ND (<0.04) | 0.088 |
| DRO[7] | 10.0 | 10.0 | <0.30 | 0.41 |
| Tot. Extract. HC | | | 0.43 | 0.66 |
| Proctor (Mix D Sample 1) | | | | |
| Arsenic | 0 | 0.010 | ND (<0.001) | |
| Barium | 2 | 2 | 0.87 | |
| Cadmium | 0.005 | 0.005 | ND (<0.001) | |
| Chromium | 0.1 | 0.1 | ND (<0.002) | |
| Lead | 0 | 0.015 (TT) | ND (<0.002) | |
| Mercury | 0.002 | 0.002 | ND (<0.001) | |
| Selenium | 0.05 | 0.05 | 0.002 | |
| Silver | No listing[5] | No listing[5] | ND (<0.001) | |
| GRO[6], ug/L | 6.6 | 6.6 | 0.13 | |
| Tot. Purge. HC[8], ug/L | | | 0.53 | |
| DRO[7] | 10.0 | 10.0 | 2.5 | |
| Tot. Extract. HC | | | 3.2 | |

[1]MCLG—Maximum Contaminant Level Goal - The level of a contaminant in drinking water below which there is no known or expected risk to health. MCLGs allow for a margin of safety and are non-enforceable public health goals.

[2]MCL—Maximum Contaminant Level - The highest level of a contaminant that is allowed in drinking water. MCLs are set close to MCLGs as feasible using best available treatment technology and taking cost into consideration. MCLs are enforceable standards.

[3]TT—Treatment Technique - A required process intended to reduce the level of a contaminant in drinking water.

[4]Contaminants list represent those that were not below detection levels.

[5]No listing of the MCLG and MCL in WY DEQ Fact Sheet 12.

[6]GRO—Gasoline Range Organics eluted between 2-methylpentane and 1,2,4 Trimethylbenzene.

[7]DRO—Diesel Range Organics. DRO are defined as all hydrocarbons eluting between C10 and C28.

[8]Total Purgeable hydrocarbons are defined as the total hydrocarbon response regardless of the elution time.

Test Series 1-2

A second set of mixes were processed according Scenario 1 wherein the ingredients were mixed by high energy mixing followed by compaction with a D-698 compactive weight and cured at 23 degrees Celsius and under sealed containers. The mix ingredients are presented in Table 5. The purpose of the mixes may be to use reasonable Portland cement concentrations (perhaps due to its heavy economic impact on costs) as well as lower Portland cement to 'Waste' ratios and the impact on the Proctor density as lbs/cu.ft. The mixes were also used to produce specimens to determine the strength development and to produce crushed encapsulated material as an aggregate. The data shown in Table 5 show a Proctor in the range of about 151 to about 151.4 lbs./cu.ft.

TABLE 5

Mixes Using Class C Fly Ash,
Portland Cement, and Contaminated Fracture Sand

| Mix Ingredients, g | Mix D-PE | Mix D-PF |
|---|---|---|
| Fracture Sand | 3000 | 3000 |
| Class C Fly Ash | 1100 | 1100 |
| Portland Cement (PC) | 500 | 250 |
| Water | 91.1 | 55.2 |
| PC/Fly Ash Ratio | 1:2.2 | 1:2.2 |
| PC/Waste Ratio | 1:6 | 1:12 |
| Proctor Density, lbs/cu. ft | 150.04 | 151.40 |

The strength development of the specimens is presented in Table 6. The strength data may show a rapid strength development curve having an unconfined compressive strength of an average of about 4,455 psi within about 7 days and an unconfined compressive strength average of about 5,050 psi at about 28 days and a strength of about 5660 psi at about 35 days. It may be expected that the strength of Portland cement concrete at approximately 35 days may be ⅔ of that expected at about 90 days, perhaps estimating of an unconfined compressive strength of over about 7,000 psi with these mixes.

TABLE 6

Corrected Unconfined Compressive Strength (UCS) and Proctor
Density of Proctors Prepared as Coarse Aggregate for Concrete
(Samples of Mix-D-PF composition as shown in Table 5).

| Sample No. | USC Test Age, d | Loads, lbs | Proctor Density, lb/cu. ft. | Corrected UCS, psi* |
|---|---|---|---|---|
| 1 | 7 | 74,585 | 148.7 | 5,450 |
| 2 | 7 | 47,490 | 145.2 | 3,460 |
| Average @ 7 days | | | | 4,455 |
| 4 | 28 | 60,635 | 143.2 | 4,330 |
| 5 | 28 | 59,415 | 144.5 | 4,290 |
| 6 | 28 | 64,950 | 145.5 | 4,700 |
| 7 | 28 | 84,860 | 147.5 | 6,220 |
| 8 | 28 | 78,460 | 144.1 | 5,710 |
| Average @ 28 days | | | | 5,505 |
| 9 | 35 | 72,360 | 144.9 | 5,280 |
| 3 | 35 | 82,845 | 145.7 | 6,040 |
| Average @ 35 days | | | | 5,660 |

It is noted that Table 6 shows the relative strength development, however the sample proctors may not have all been exact dimensions of forms but may have been compacted to same compaction effort. As such, the densities calculated for these samples are lower (about 3% to about 8% lower than the exact dimensions of molds). Since these proctor samples were not exact dimensions, the proctor samples may be corrected for volume for strength calculation. As such, the samples were corrected for length to diameter ratios of each specimen perhaps to achieve a corrected unconfined compressive strength.

Also note that the strength of these Proctor sized cured samples may vary with age (e.g., increases with increased curing age) and with compaction (e.g., increases with increasing density) as shown with other fly ash and cement composites. The compaction may be influenced by the reduction in water added compared to ready-mix concrete (for example, the more water, the lower the Proctor density may be).

Table 7 presents the performance related to encapsulation of the GRO, DRO and RCRA metals in the SPLP leachate extract. The data may illustrate that the SPLP leachate meet all of the criteria for acceptable leachate.

TABLE 7

Results of SPLP Leaching Tests
Contaminant Encapsulated with Fracture Sand Wastes

| | MCLG (mg/L)[1] | MCL (mg/L)[2] or TT[3] | Data 1 (mg/L)[4] Sample 1 |
|---|---|---|---|
| Proctor 2 Class C Ash (Mix D) | | | |
| Arsenic | 0 | 0.010 | ND (<0.001) |
| Barium | 2 | 2 | 0.24 |
| Cadmium | 0.005 | 0.005 | ND (<0.001) |
| Chromium | 0.1 | 0.1 | 0.106 |
| Lead | 0 | 0.015 (TT) | ND (<0.001) |
| Mercury | 0.002 | 0.002 | ND (<0.002) |
| Selenium | 0.05 | 0.05 | 0.010 |
| Silver | No listing[5] | No listing[5] | ND (<0.001) |
| GRO[6], ug/L | 6.6 | 6.6 | ND (<0.04) |
| Tot. Purgeable HC[8], ug/L | | | 33 |
| DRO[7] | 10.0 | 10.0 | ND (<0.30) |
| Tot. Extract. HC | | | ND (<0.30) |
| Proctor 3 Class C Ash (Mix E) | | | |
| Arsenic | 0 | 0.010 | ND (<0.001) |
| Barium | 2 | 2 | 0.28 |
| Cadmium | 0.005 | 0.005 | ND (<0.001) |
| Chromium | 0.1 | 0.1 | 0.054 |
| Lead | 0 | 0.015 (TT) | ND (<0.001) |
| Mercury | 0.002 | 0.002 | ND (<0.002) |
| Selenium | 0.05 | 0.05 | 0.017 |
| Silver | No listing[5] | No listing[5] | ND (<0.001) |
| GRO[6], ug/L | 6.6 | 6.6 | ND (<0.04) |
| Tot. Purgeable HC[8], ug/L | | | 37 |
| DRO[7] | 10.0 | 10.0 | 0.52 |
| Tot. Extract. HC | | | 0.72 |

[1]MCLG—Maximum Contaminant Level Goal - The level of a contaminant in drinking water below which there is no known or expected risk to health. MCLGs allow for a margin of safety and are non-enforceable public health goals.
[2]MCL—Maximum Contaminant Level - The highest level of a contaminant that is allowed in drinking water. MCLs are set close to MCLGs as feasible using best available treatment technology and taking cost into consideration. MCLs are enforceable standards.
[3]TT—Treatment Technique - A required process intended to reduce the level of a contaminant in drinking water.
[4]Contaminants list represent those that were not below detection levels.
[5]No listing of the MCLG and MCL in WY DEQ Fact Sheet 12.
[6]GRO—Gasoline Range Organics eluting between 2-methylpentane and 1,2,4 Trimethylbenzene.
[7]DRO—Diesel Range Organics. DRO are defined as all hydrocarbons eluting between C10 and C28.
[8]Total Purgeable hydrocarbons are defined as the total hydrocarbon response regardless of the elution time.

Test Series 1-3

One of the issues to implementing the proposed encapsulation process may include the variations in ash composition. For example, many utilities may be configured to condition ash to prevent dust generation during loading, transportation, and disposal, or the like. A series of mixes were tested wherein the Class C fly ash may be conditioned with water at the power plants perhaps so as to reduce the dust generation at the power plant during handling. A final conditioned product may be a dry product to a slightly lumped product. Two mixes were prepared with high energy mixing, followed by compaction in Proctor mold with a D-698 compactive effort. As shown in Table 8, the proctor density achieved with no Portland cement is about 145.23 lbs/cubic foot, while a Portland cement/conditioned fly ash ratio of about 2:1 resulted in a Proctor density of about 151.40 lbs/cubic foot. Typically, a higher density may result in a higher strength development.

TABLE 8

Mixes Using Conditioned Class C Fly Ash, Portland Cement, and Contaminated Fracture Sand.

| Mix Ingredients, g | Mix Wet PA | Mix Wet PB |
|---|---|---|
| Fracture Fluid/Sand Blow Back Waste | 3000 | 3000 |
| Conditioned Class C Fly Ash | 1762 | 500 |
| Portland Cement (PC) | 0 | 1000 |
| Water | 0 | 0 |
| PC/Fly Ash Ratio | 0 | 2:1 |
| PC/Waste Ratio | 0 | 1:3 |
| Proctor Density, lbs/cu. ft | 145.23 | 151.40 |

Test Series 1-4

Another set of tests were conducted to address the mix composition and ash conditioning on developed strength and encapsulation performance testing was conducted on the impact of conditioning of the PFA on the performance of encapsulation. The results of the compressive strength are presented in Table 9 and the leaching characteristics in Table 10.

TABLE 9

Composition of Mixes Using Untreated and Treated Ash.

| Ingredients, g | B-5-24/25 | B-5-34/35 |
|---|---|---|
| Sand | 1250 | 1250 |
| PFA-U* Untreated | 850 | |
| PFA-T* Treated | | 850 |
| PC | 425 | 425 |
| Floc | 300 | 300 |
| PMAC | 30 | 30 |
| Water | 165 | 30 |
| Proctor Density, lbs/cu ft | 142 | 140 |
| UCS[1], psi (28 days) | 3610 | 2730 |
| UCS[1], psi (56 days) | 3920 | 3040 |

[1]UCS—Unconfined Compressive Strength (ASTM C-39)
*(ASTM C-129)

It should be noted that the conditioning of the PFA may appears to retard the strength development as seen in the lower 56-day strength for the treated Ash mix (Table 9), perhaps while still allowing for the encapsulation of the GRO, DRO and SDLP RCRA metals (Table 10). It also appears that there may be a correlation between the proctor densities and the strength development. The higher the density, generally the higher the strength perhaps at longer term curing ages.

TABLE 10

Composition of the SPLP Leachate Tested by Energy Laboratories. Fixed

| Ingredients, wt. % | MCLG MCL (mg/L)[2] | MCL (mg/L)[3] or TT[4] | Mix B5-23 Untreated PFA | Mix B5-32 Treated PFA |
|---|---|---|---|---|
| GRO[6] ug/L | 6.6 | 6.6 | ND (<0.5) | ND (<1.5) |
| Tot. Purgeable HC[8], ug/L | | | ND (<0.5) | ND (<0.5) |
| DRO[7] mg/L | 10.0 | 10.0 | 0.39 | ND (<0.30) |
| Tot Extract. HC | | | 0.59 | 0.32 |
| Arsenic, mg/L | 0 | 0.010 | ND (<0.001) | ND (<0.001) |
| Barium, mg/L | 2 | 2 | 1.01 | 1.35 |
| Cadmium, mg/L | 0.005 | 0.005 | ND (<0.001) | ND (<0.001) |
| Chromium, mg/L | 0.1 | 0.1 | 0.028 | 0.071 |
| Lead, mg/L | 0 | 0.015 (TT) | ND (<0.001) | ND (<0.001) |

TABLE 10-continued

Composition of the SPLP Leachate Tested by Energy Laboratories. Fixed

| Ingredients, wt. % | MCLG MCL (mg/L)[2] | MCL (mg/L)[3] or TT[4] | Mix B5-23 Untreated PFA | Mix B5-32 Treated PFA |
|---|---|---|---|---|
| Mercury, mg/L | 0.002 | 0.002 | ND (<0.002) | ND (<0.002) |
| Selenium, mg/L | 0.05 | 0.05 | 0.006 | 0.005 |
| Silver, mg/L | No Listing[5] | No Listing[6] | ND (<0.001) | ND (<0.001) |

[1]MCLG—Maximum Contaminant Level Goal - The level of a contaminant in drinking water below which there is no known or expected risk to health. MCLGs allow for a margin of safety and are non-enforceable public health goals.
[2]MCL—Maximum Contaminant Level - The highest level of a contaminant that is allowed in drinking water. MCLs are set close to MCLGs as feasible using best available treatment technology and taking cost into consideration. MCLs are enforceable standards.
[3]TT—Treatment Technique - A required process intended to reduce the level of a contaminant in drinking water.
[4]Contaminants list represent those that were not below detection levels.
[5]No listing of the MCLG and MCL in WY DEQ Fact Sheet 12.
[6]GRO—Gasoline Range Organics eluting between 2-methylpentane and 1,2,4 Trimethylbenzene.
[7]DRO—Diesel Range Organics. DRO are defined as all hydrocarbons eluting between C10 and C28.
[8]Total Purgeable hydrocarbons are defined as the total hydrocarbon response regardless of the elution time.

Example 2: Oil and Gas Water Treatment Flocculants

Example 2 deals with the encapsulation of high organic (GRO and DRO) constituents associated with Oil and Gas E&P contaminated wastewater treatment process flocculant wastes. This type of material may be representative of many such wastes from similar processes.

Test Series 2.1

An initial series of mixes were conducted to ascertain any operational issues associated with the use of flocculant from produced water from oil and gas operations in the encapsulation process. An evaluation may examine the workability of the mix under the high energy mixing and compaction operations. The results of the initial testing are presented in Table 11. Of concern is the relatively low density of these initial tests.

TABLE 11

Mixes Using Class C (dry) Fly Ash, Portland Cement, and Floc Waste

| Mix Ingredients, g | Mix D Floc 1 | Mix E Floc 1 |
|---|---|---|
| Floc Waste[1] | 700 | 1400 |
| Class C Fly Ash (dry) | 820 | 2949.6 |
| Portland Cement (PC) | 200 | 400 |
| Water (1) | 0 | 0 |
| Fly Ash/Floc Ratio | 1.6:1 | 2.2:1 |
| PC/Floc Ratio | 1:3.5 | 1:3.5 |
| Proctor Density, lbs/cu. ft | 139.32 | 126.98 |

[1]The floc waste contains a high level of water and the mixes used high amounts of Class C ash to consume the water and thereby providing the required mixture consistency.

The results of the Synthetic Precipitation Leaching Procedure (SPLP) results for both metals and GRO and DRO concentrations in the leachate are presented in Table 12. Even with the low densities of the compacted mixes, the ability of the encapsulation process was capable to encapsulate DRO and GRO as well as metals in the compacted and cured encapsulation product. The results meet the State of Wyoming's requirements for the application as a Beneficial Reuse Permits if used as an aggregate in Portland cement concrete and other applications.

TABLE 12

SPLP Leaching Data of Potential Water Contaminants
Mixes w/D- 'PE' & 'Pf' Ash
Proctor 4 D-Ash

|  | MCLG (mg/L)[1] | MCL (mg/L)[2] or TT[3] | Data 1 (mg/L)[4] Mix D- 'PE' | Data 2 (mg/L)[4] Mix D- 'PF' |
|---|---|---|---|---|
| Arsenic | 0 | 0.010 | ND (<0.001) | ND (<0.001) |
| Barium | 2 | 2 | 1.20 | 2.31 |
| Cadmium | 0.005 | 0.005 | ND (<0.001) | ND (<0.001) |
| Chromium | 0.1 | 0.1 | 0.057 | 0.067 |
| Lead | 0 | 0.015 (TT) | ND (<0.001) | ND (<0.001) |
| Mercury | 0.002 | 0.002 | ND (<0.002) | ND (<0.002) |
| Selenium | 0.05 | 0.05 | 0.011 | 0.013 |
| Silver | No listing[5] | No listing[5] | ND (<0.001) | ND (<0.001) |
| GRO[6], microgram/L | 6.6 | 6.6 | ND (<0.04) | 0.493 |
| Tot. Purgeable HC[8], microgram/L |  |  | ND (<0.04) | 0.524 |
| DRO[7] | 10.0 | 10.0 | ND (<0.30) | ND (<0.30) |
| Tot. Extract. HC |  |  | ND (<0.30) | 0.48 |

[1]MCLG—Maximum Contaminant Level Goal - The level of a contaminant in drinking water below which there is no known or expected risk to health. MCLGs allow for a margin of safety and are non-enforceable public health goals.
[2]MCL—Maximum Contaminant Level - The highest level of a contaminant that is allowed in drinking water. MCLs are set close to MCLGs as feasible using best available treatment technology and taking cost into consideration. MCLs are enforceable standards.
[3]TT—Treatment Technique - A required process intended to reduce the level of a contaminant in drinking water.
[4]Contaminants list represent those that were not below detection levels.
[5]No listing of the MCLG and MCL in WY DEQ Fact Sheet 12.
[6]GRO—Gasoline Range Organics eluting between 2-methylpentane and 1,2,4 Trimethylbenzene.
[7]DRO—Diesel Range Organics. DRO are defined as all hydrocarbons eluting between C10 and C28.
[8]Total Purgeable hydrocarbons are defined as the total hydrocarbon response regardless of the elution time.

Test Series 2-2

Floc generated in the oil and gas industry may vary considerably in its water content. This may result in high variability of the consistency of the encapsulation mix as a result of variability of water. It may be important to ensure a consistent water/solids ratio for high performance of the product from the encapsulation/aggregate production. For this testing, the floc was allowed to settle and the decant was skimmed off the floc material.

These floc wastes may even with decanting, may exhibit high free water, and the decant floc may still contain a large amount of residual moisture. For the testing described herein, mixes used higher amounts of dry fly ash perhaps to reduce the residual moisture and may allow the high energy mixing to handle a lower moisture/solids ratio which may be necessary to achieve high Proctor densities and as such low pore volumes and even lower mobility of the encapsulated waste.

Other methods or even additives could be needed to satisfy a commercial operation. There are a number of methods and components that could be used on a commercial basis that could further dewater the floc or even fracturing materials. Processing options can include filtration, including pressure, as well as centrifugal separation, and/or oxidative additives or others, or the like. One of many process configurations is presented in FIGS. 8 and 9 as discussed herein. In this process configuration, a sand filter may be used to remove the floc from the floc waste water, perhaps producing a consistent floc feed to the aggregate production mix. It may be possible that sand or even the back blow frac sand can be used as the filter and the filter floc/sand combination can be used directly in the aggregate mix. A simulation of the sand filter concept was conducted and illustrated that if the flocs may be large, they may tend to block the upper level of the sand filter perhaps plugging off the filtration. However, shearing of the floc to chop the large flocs into smaller floc size can prevent the blockage in the upper sections of a sand filter. The sand filtrate can be further cleaned with the use of a 'PMAC' filter. The PMAC filter may be composed of a high carbon ash that may be currently disposed. The composition of the PMAC used is presented in Table 13.

TABLE 13

Composition of the High Carbon Ash
Used in the Testing

| Proximate Analysis | As Received wt. % | Ultimate Analysis Wt. % | As Received, wt. % |
|---|---|---|---|
| Moisture | 0.86 | Moisture | 0.80 |
| Ash | 70.23 | Ash | 70.23 |
| Volatile Matter | 6.40 | Carbon | 25.70 |
| Fixed Carbon | 22.50 | Hydrogen | 0.24 |
| Total | 100.0 | Nitrogen | 0.55 |
|  |  | Sulfur | 0.81 |
|  |  | Oxygen | 0.61 |
|  |  | Total | 100.00 |

Analyses by Wyoming Analytical Laboratories in Laramie, WY

Test Series 2-3

The PMAC used in the test mix designs of the aggregate may have contained about 30 g of PMAC perhaps to help attach to the GRO and DRO components in the aggregate mixture which may prevent a deleterious effect of sufficient strength development and encapsulation. An addition of the PMAC ash could help offset the impact of the GRO and DRO components on the hydration of the Portland cement resulting in low strength development.

In order to substantiate a case of PMAC attaching GRO and DRO, testing has used the PMAC in a number of encapsulation mixes as the PMAC locks up some of the GRO and GRO compounds that may potentially retard the hydration of the Portland cement used in these mixes. Test mixes with and without the PMAC showed little impact on the compacted density and the strength and leaching results are positive.

In addition, testing may have shown the ability of the PMAC to tie-up organic components in treating the floc decanted material or perhaps even the produced water. Tests were conducted to ascertain the benefit of PMAC. The decant from the floc was mixed with the PMAC and allowed to settle. The clear water above the settled ash was sampled for hydrocarbons. Table 14 shows the impact of the PMAC on the decanted fluid from the floc. The PMAC may have assisted in lowering the DRO content and to a lesser degree the GRO in the decanted products. The addition of PMAC to the decant may produce a new decant with about 43% lower GRO and a reduction of about 80% DRO in the new decant (see Table 14).

TABLE 14

Impact of PMAC in Reducing GRO,
DRO and ORO in Floc Decant

|  | Decant - 2017 Only | Decant with PMAC - 2017 | Reduction. % |
|---|---|---|---|
| Extractable Hydrocarbon GRO $nC_6$-$nC_{12}$ | 245 mg/L | 139 mg/l | 43.3 |
| Extractable Hydrocarbon DRO $nC_{12}$-$nC_{26}$ | 4,953 mg/L | 967 mg/L | 80.4 |

Analyses by Wyoming Analytical Laboratories in Laramie, WY

In a second test, the floc may be passed through a sand filter and the sand filter filtrate may be passed through a filter composed of PMAC. The results are shown in Table 15. The results show that PMAC can reduce the GRO and DRO components in the decant and can be used as a second step in further removal of GRO and DRO content of total GRO removal of about 93% to about 99% and the DRO removal of about 99%.

TABLE 15

Impact of Additional PMAC filtration on the GRO
and DRO Content of Filtrate After
the Sand Filter and Initial PMAC Decanting

|  | Decant- 2017 | Sample 11 & 12 w/Pre-wetted PMAC | Sample 13-14 w/Pre-wetted PMAC | Overall Removal (%) |
|---|---|---|---|---|
| Extractable Hydrocarbon GRO $nC_6$-$nC_{12}$ | 245 mg/L | 9 mg/L | 16 mg/L | 99.9-93.5 |
| Extractable Hydrocarbon DRO $nC_{12}$-$nC_{26}$ | 4953 mg/L | 97 mg/L | 92 mg/L | 99.9-99.9 |

Analyses by Wyoming Analytical Laboratories in Laramie, WY

The data in Tables 14 and 15 indicate that PMAC material may potentially be used for cleaning floc decant water or perhaps even produce water directly. A potential option may be to include the PMAC with the sand filter and thereby not only remove the floc but also reduce the GRO and DRO in the excess water in the floc.

Figure 8:
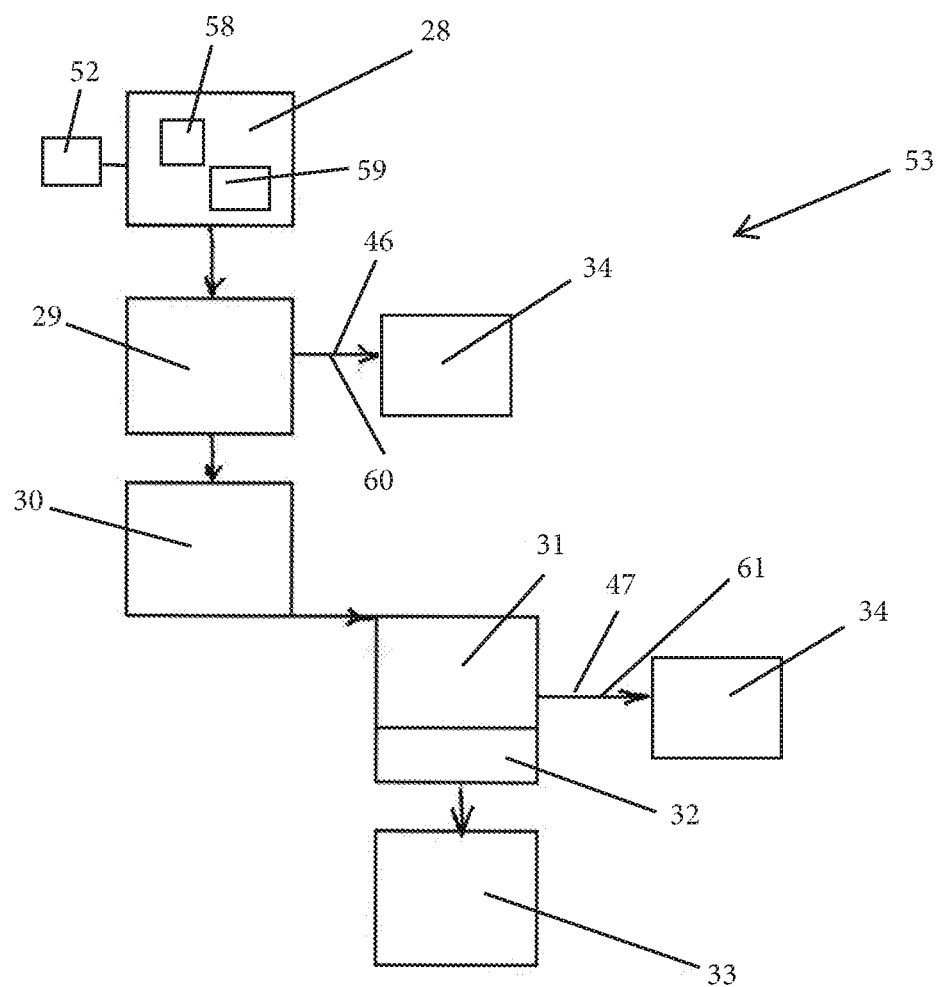
FIG. 8 shows a non-limiting example of a flow diagram for a scenario of dewatering flocculation materials in accordance with some embodiment of the present invention.

In Dewatering Scenario 1 as may be understood in FIG. 8 and discussed herein, the filtrate from the PMAC filter can employ oxidizing agents that may destroy the remaining organics in the PMAC filtrate. Possible oxidation agents might include, but is not limited to, oxygen, various peroxides, chlorine, ozone, fluoride, hydrogen peroxide, nitric acid, peroxydisulfuric acid, peroxy mono sulfuric acid, air, ferrate, ferrate (IV), or the like.

As a non-limiting example, Ferrate Fe (IV) may have been shown to lower the COD and BOD. Not only does the Fe (IV) act as an oxidizing agent, it may also act as a coagulation agent after oxidation perhaps allowing the removal of the Fe. In addition, there may be a number of peroxides from commercial suppliers, including Chemox supplied by Groundwater Solutions, Inc., which may be based on hydrogen peroxide that may decompose organic constituents to $CO_2$.

Embodiments of the present invention may provide the use of a sand filter to dewater the floc perhaps since the sand with the floc can be used in the aggregate mix and may avoid disposal costs. As a result, a clean water can be produced for use in the oil and gas operations, agriculture, and other uses, or the like. It should be noted that certain basins for oil and gas operations may have a shortage of water and its impact on production could control the industry growth in this region.

In addition to the use of sand filters and PMAC, pressure filters, centrifugal processes and oxidation additives could be used either in conjunction with or instead of sand filters and PMAC filters described above.

A second dewatering scenario, Dewatering Scenario 2, for the floc processing may be understood in FIG. 9, which may employ a pressure filter to dewater the floc. The processing flow may be similar to a sand filter scenario perhaps with the exception that the floc may be dewatered by a pressure filter, which may separate the floc from the excess water. This may be similar to decanted material yet the separation may be more precise. The decanted floc may be pressed though a cloth filter (e.g., simulating a pressure filter). The filtrate from that test showed no floc passing through the cloth.

Like in Dewatering Scenario 1, the floc collected may be sheared and passed to the sand filter perhaps following similar processing steps as in the Dewatering Scenario 1. The sand/floc combination may be used in the production of aggregate. The pressure filter filtrate may be sent to a PMAC filter and the PMAC filtrate may be oxidized to provide a clean water. Any filtrate from the sand filter may also be sent to a PMAC filter and the filtrate from the PMAC filter may be oxidized to remove any residual organics in the water.

Tests Series 2-4

A series of mixes were prepared via a high energy mixer to produce a mixture that may be composed of approximately ⅛-inch agglomerates. It should be noted that the sand, floc, and Class C ash may be mixed together for approximately 1 minute and then the Portland cement may be added and mixed for approximately 1.5 minutes. The produced mixes are presented in Tables 16 and 17. The criteria for assessing the quality/suitability of the mixes may have been based on the consistency of the mix and even the compaction (lb/cu/ft) using ASTM D-698 and D-1557 compactive energy. The D-1557 compactive energy may be higher than the D-698 compactive energy. As noted, the density of the D-698 samples are about 5-10% lower than those of the D1557 samples. The mixes are similar to those in Table 11 Mix D therein.

Strength Development Data—Selected specimens were tested for the unconfined compressive strength ("UCS") at about 28 days and about 56 days of curing in sealed containers at room temperature. UCS data for early ages were determined by CTL Thompson Laboratories in Denver, Colo. according to ASTM C-39. Unconfined compressive strengths at B-3 (about 47 days) was about 6,350 psi, C2-4 (ASTM D698 compaction) at about 43 days was about 3,760 psi, while C-5 mixes were stagnant at about 620 to about 880 psi unconfined compressive strength per ASTM C39. The compressive strengths of the frac sand-based proctors ranged from about 3,460 psi (at about 7 days) achieving over about 6,000 psi unconfined strength at about 43 days (see Tables 16 and 17).

TABLE 16

Mix Ingredients and Unconfined Compressive Strength (ASTM C-39) of Proctor Mixes

|  | Mix A-2 | Mix B-3 | Mix C1 | Mix C-2-4 | Mix C-2 | Mix C-2-3 |
|---|---|---|---|---|---|---|
| Sand | 42.48 | 43.86 | 44.12 | 40.78 | 40.78 | 40.78 |
| P-Corp Fly Ash | 35.56 | 35.08 | 36.76 | 36.70 | 36.70 | 36.70 |
| Portland Cement | 10.67 | 8.77 | 7.35 | 8.16 | 8.16 | 8.16 |
| Floc Decanted | 11.29 | 9.96 | 11.76 | 13.05 | 13.05 | 13.05 |
| PMAC | 0.00 | 1.02 | 0.00 | 1.31 | 1.31 | 1.31 |
| Water | 0.00 | 1.27 | 0.00 | 0.00 | 0.00 | 0.00 |
| Floc/PC Ratio | 1.06 | 1.14 | 1.60 | 1.60 | 1.60 | 1.60 |
| UCS[1], psi | 4,380 (56) | 6,350 (47) | 3,590 (51) | 3,760 (41) | 2,750 (51) | 2,690 (51) |

[1]UCS—Unconfined Compressive Strengths. Mix Design by AME of Laramie, WY. UCS Analyses by CTL Thompson in Denver, CO

TABLE 17

Unconfined Compressive Strengths (ASTM C 39) of Additional Proctor Samples

|  | Mix C-3 | Mix 3-2 | Mix 3-3 | Mix 3-4a | Mix 3-4 | Mix C-5 |
|---|---|---|---|---|---|---|
| Sand | 42.44 | 40.78 | 39.43 | 39.43 | 39.43 | 42.11 |
| P-Corp Fly Ash | 38.20 | 36.70 | 41.80 | 41.80 | 41.80 | 39.85 |
| Portland Cement | 5.09 | 8.16 | 5.52 | 5.52 | 5.52 | 6.02 |
| Floc Decanted | 13.58 | 13.05 | 12.62 | 12.62 | 1262 | 12.03 |
| PMAC | 0.58 | 1.31 | 0.63 | 0.63 | 0.63 | 0.00 |
| Water | 0.00 | 0.00 | 0.0 | 0.00 | 0.0 | 0.00 |
| Floc/PC Ratio | 2.67 | 1.60 | 2.29 | 2.29 | 2.29 | 2.00 |
| UCS[1], psi (Days Cured) | 1,430 (51) | 2,690 (51) | 1,960 (51) | 1,600 (49) | 1,230 (49) | 620-880 (35) |

[1]UCS—Unconfined Compressive Strength. Mix Design by AME of Laramie, WY. UCS Analyses by CTL Thompson in Denver, CO. Mix 3-4a + Mix 3-4 1557 and Mix 3-4b – Mix 3-4 1557.

Figure 12:
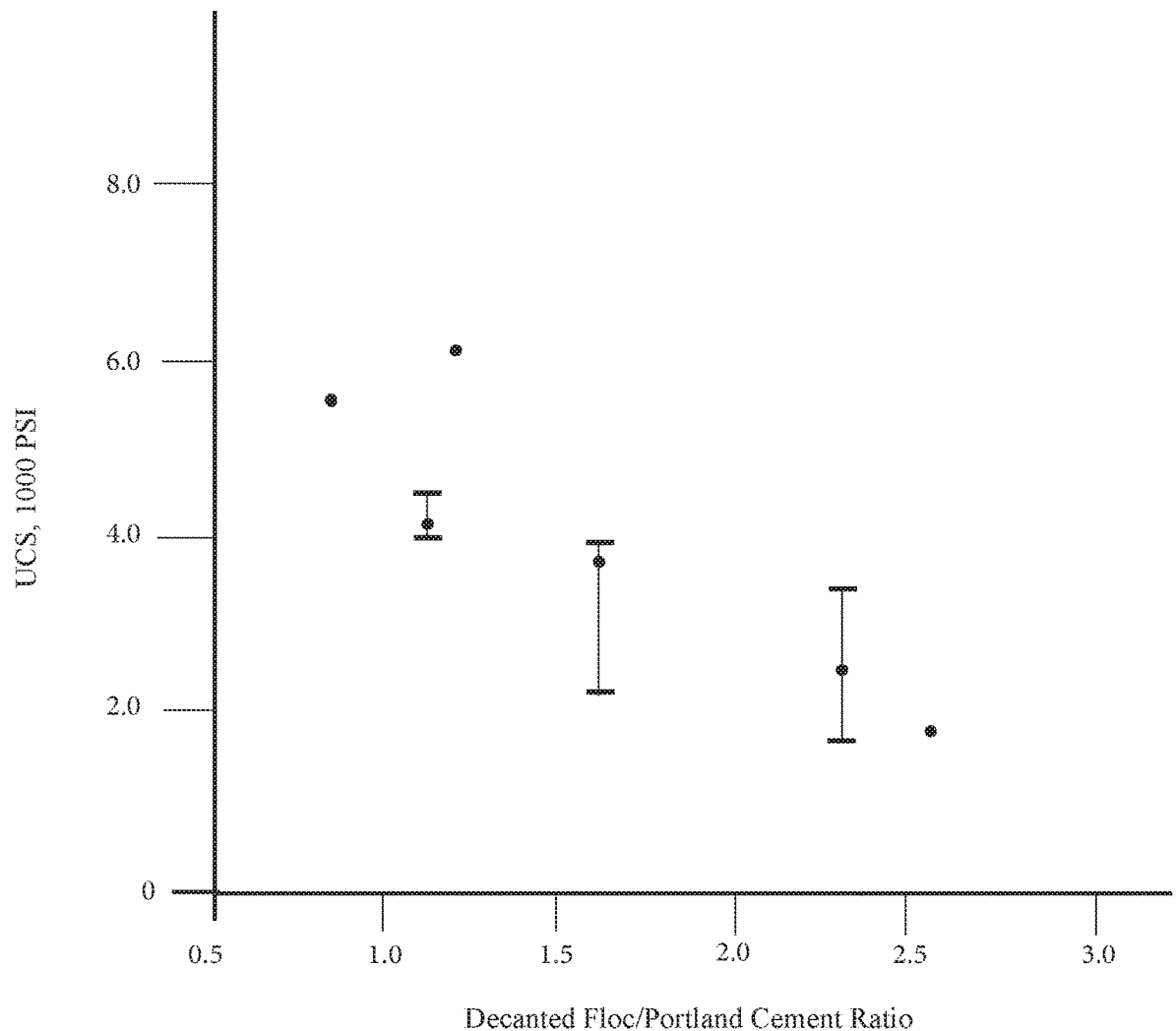
FIG. 12 shows a non-limiting example of graph of a correlation of the unconfined compressive strength as a function of the Floc/Portland Cement ratio of the final mix composition in accordance with some embodiment of the present invention.

As a result of these findings, additional testing of samples were conducted perhaps to determine if the floc/Portland cement ratio might be a controlling parameter in strength development. The samples selected ranged in floc/Portland cement ratios from about 0.71 to about 2.67. The results from these tests are presented in FIG. 12 and Table 18. FIG. 12 shows a correlation of the unconfined compressive strength as a function of the floc/Portland cement ratio of the final mix composition.

TABLE 18

Unconfined Compressive Strength as a Function of Floc/Portland Cement Ratio

| Floc/Portland Cement Ratio | Unconfined Compressive Strength (UCS), psi | Average of UCS, psi | Ave. PMAC wt. % |
|---|---|---|---|
| 2.67 | 1,430 | 1430 | 40 |
| 2.29 | 1,230-3,090 | 1968 | 25 |
| 1.60 | 2,690-3,590 | 3305 | 30 |
| 1.14 | 6,350 | 6350 | 30 |
| 1.06 | 3,810-4,380 | 4095 | 0 |
| 0.71 | 5800 | 5800 | 30 |

In summary, the selected mix for the aggregate tests may not have gained strength as expected perhaps due to the level of Portland cement to floc. It may be that the GRO and DRO had a negative impact on the hydration of Portland cement, the difference in the C-5 mix may have a low strength development, and the B-3 mix may have a higher strength development and a higher Portland cement to floc ratio. The B-3 mix may contain a small amount of PMAC which may have fixed hydrocarbons perhaps allowing less impact on the hydration of the Portland cement.

Leaching Test Data—Selected specimens were tested for Synthetic Precipitation Leaching Procedure ("SPLP") by Energy Laboratories in Billings, Mont. These zero-head tests are standard tests required under State regulations. Specifically, the amount of GRO and DRO compounds in the leachate were tested, as well as the standard metals required for state regulations. Four samples of composition were tested including the following mixes and the results are shown in Tables 19 and 20.

TABLE 19

Composition of the SPLP Leachate Tested by Energy Laboratories

| Ingredients, wt. % | MCLG (mg/L)[1] | MCL (mg/L)[2] or TT[3] | Mix B-1 | Mix B-2 |
|---|---|---|---|---|
| Sand |  |  | 44.12 | 44.32 |
| P-Corp Fly Ash |  |  | 36.76 | 35.46 |
| Portland Cement |  |  | 7.35 | 8.86 |
| Floc Decanted |  |  | 11.76 | 10.64 |
| PMAC |  |  | 0.00 | 0.00 |
| Water |  |  | 0.00 | 0.72 |
| Floc/PC Ratio |  |  | 1.60 | 1.20 |
| GRO[6] ug/L | 6.6 | 6.6 | ND (<0.04) | ND (<0.04) |
| Tot. Purgeable HC, ug/L |  |  | ND (<0.04) | ND (<0.04) |

TABLE 19-continued

Composition of the SPLP Leachate Tested by Energy Laboratories

| Ingredients, wt. % | MCLG (mg/L)[1] | MCL (mg/L)[2] or TT[3] | Mix B-1 | Mix B-2 |
|---|---|---|---|---|
| DRO[7], ug/L | 10.0 | 10.0 | ND (<0.30) | ND (<0.30) |
| Tot. Purgeable HC[8], ug/L | | | ND (<0.30) | ND (<0.30) |
| Arsenic, mg/L | 0 | 0.010 | ND (<0.0001) | ND (<0.0001) |
| Barium, mg/L | 2 | 2 | 1.48 | 0.67 |
| Cadmium, mg/L | 0.005 | 0.005 | ND (<0.0001) | ND (<0.0001) |
| Chromium, mg/L | 0.1 | 0.1 | 0.057 | 0.070 |
| Lead, mg/L | 0 | 0.015 (TT) | ND (<0.0002) | ND (<0.0002) |
| Mercury, mg/L | 0.002 | 0.002 | ND (<0.0001) | ND (<0.0001) |
| Selenium, mg/L | 0.05 | 0.05 | 0.010 | 0.0078 |
| Silver, mg/L | No Listing[5] | No Listing[5] | ND (<0.0001) | ND (<0.0001) |

[1]MCLG—Maximum Contaminant Level Goal - The level of a contaminant in drinking water below which there is no known or expected risk to health. MCLGs allow for a margin of safety and are non-enforceable public health goals.
[2]MCL—Maximum Contaminant Level - The highest level of a contaminant that is allowed in drinking water. MCLs are set close to MCLGs as feasible using best available treatment technology and taking cost into consideration. MCLs are enforceable standards.
[3]TT—Treatment Technique - A required process intended to reduce the level of a contaminant in drinking water.
4. Contaminants list represent those that were not below detection levels.
[5]No listing of the MCLG and MCL in WY DEQ Fact Sheet 12.
[6]GRO—Gasoline Range Organics eluting between 2-methylpentane and 1,2,4 Trimethylbenzene.
[7]DRO—Diesel Range Organics. DRO are defined as all hydrocarbons eluting between C10 and C28.
[8]Total Purgeable hydrocarbons are defined as the total hydrocarbon response regardless of the elution time.

TABLE 20

Composition of the SPLP Leachate Tested by Energy Laboratories

| Ingredients, wt. % | MCLG (mg/L)[1] | MCL (mg/L)[2] or TT[3] | Mix C-2 | Mix C-5-1 |
|---|---|---|---|---|
| Sand | | | 40.78 | 42.11 |
| P-Corp Fly Ash | | | 36.70 | 39.85 |
| Portland Cement | | | 8.16 | 6.02 |
| Floc Decanted | | | 13.05 | 12.03 |
| PMAC | | | 1.31 | 0.00 |
| Water | | | 0.00 | 0.00 |
| Floc/PC Ratio | | | 1.60 | 2.00 |
| GRO[6] ug/L | 6.6 | 6.6 | ND (<0.04) | ND (<0.04) |
| Tot. Purgeable HC[8], ug/L | | | ND (<0.04) | ND (<0.04) |
| DRO[7] mg/L | 10.0 | 10.0 | ND (<0.30) | ND (<0.30) |
| Tot Extract. HC | | | ND (<0.30) | ND (<0.30) |
| Arsenic, mg/L | 0 | 0.010 | ND (<0.0001) | ND (<0.0001) |
| Barium, mg/L | 2 | 2 | 0067 | 0.74 |
| Cadmium, mg/L | 0.005 | 0.005 | ND (<0.0001) | ND (<0.0001) |
| Chromium, mg/L | 0.1 | 0.1 | 0.076 | 0.077 |
| Lead, mg/L | 0 | 0.015 (TT) | ND (<0.0002) | ND (<0.0002) |
| Mercury, mg/L | 0.002 | 0.002 | ND (<0.0001) | ND (<0.0001) |
| Selenium, mg/L | 0.05 | 0.05 | 0.010 | 00.010 |
| Silver, mg/L | No Listing[5] | No Listing[5] | ND (<0.0001) | ND (<0.0001) |

NA—not available.
[1]MCLG—Maximum Contaminant Level Goal - The level of a contaminant in drinking water below which there is no known or expected risk to health. MCLGs allow for a margin of safety and are non-enforceable public health goals.
[2]MCL—Maximum Contaminant Level - The highest level of a contaminant that is allowed in drinking water. MCLs are set close to MCLGs as feasible using best available treatment technology and taking cost into consideration. MCLs are enforceable standards.
[3]TT—Treatment Technique - A required process intended to reduce the level of a contaminant in drinking water.
4. Contaminants list represent those that were not below detection levels.
[5]No listing of the MCLG and MCL in WY DEQ Fact Sheet 12.
[6]GRO—Gasoline Range Organics eluting between 2-methylpentane and 1,2,4 Trimethylbenzene.
[7]DRO—Diesel Range Organics. DRO are defined as all hydrocarbons eluting between C10 and C28.
[8]Total Purgeable hydrocarbons are defined as the total hydrocarbon response regardless of the elution time.

The data shown in Tables 19 and 20 and summarized in Table 21 may provide that the leachate composition meets all requirements for even agricultural applications. Even C-5 composition that may have showed insufficient strength development (as shown in Table 17) may have also met all SDLP leachate metals and GRO and DRO criteria.

TABLE 21

Summary of Leaching Data

| Analyte | B-1 1557 | B-2 1557 | C-5 1557 | C-5-1 1557 |
|---|---|---|---|---|
| | SPLP HC | SPLP HC | SPLP HC | SPLP H |
| GRO | ND | ND | ND | ND |
| DRO | ND | ND | ND | ND |
| Total Meta (mg/L) | SPLP Metals | SPLP Metals | SPLP Metals | SPLP Metals |
| Arsenic | ND | ND | ND | ND |
| Barium | 1.48 | 0.67 | 0.67 | 0.74 |
| Cadmium | ND | ND | ND | ND |
| Chromium | 0.057 | 0.070 | 0.076 | 0.077 |
| Lead | ND | ND | ND | ND |
| Mercury | ND | ND | ND | ND |
| Selenium | 0.010 | 0.008 | 0.010 | 0.011 |
| Silver | ND | ND | ND | ND |

Detection Limits as recorded as ND as mg/L - GRO (<0.04), DRO (<0.30), Arsenic (<0.001), Cadmium (<0.0001), Lead (<0.0002), Mercury (<0.0001) and Silver (<0.0001).

Example 3: Combination of Floc and Frac Sand

The potential of dewatering the floc with sand bed and the use of PMAC in the potential floc dewatering scenarios as may be understood in FIGS. 8 and 9 may indicate that the combination of the processing the frac sand waste and the floc wastes can show an overall synergy.

Test Series 3-1

Additional tests were conducted to evaluate a mix composition on developed strength and encapsulation performance testing was conducted to evaluate the impact of the use of frac sand instead of all-purpose sand on strength development and the performance of encapsulation. The results of the compressive strength are presented in Table 22 and the leaching characteristics in Table 23. It should be noted that the use of frac sand compared to all-purpose sand may appear to enhance the strength development perhaps as seen in the higher about 56-day strength for the frac sand mix (see Table 22). However, the use of either sand and strength may still allow for the encapsulation of the GRO, DRO, and SPLP RCRA metals (see Table 23). It may appear that there may be a correlation between the proctor densities and the strength development. The higher the density, the higher strength may be at longer term strength.

TABLE 22

Composition of Mixes Using All-Purpose Sand versus Blowback Frac Sand and Treated Ash

| Ingredients, g | B-5-34/35 | B5-45/46 |
|---|---|---|
| All Purpose Sand | 1250 | |
| Frac Sand | | 1250 |
| PFA-T * Treated | 850 | 850 |
| PC | 425 | 425 |
| Floc | 300 | 300 |
| PMAC | 30 | 30 |
| Water | 30 | 30 |
| Proctor Density, lbs/ft$^3$ | 140 | 150 |
| UCS, psi (28 days)* | 2730 | 5210 |
| UCS, psi (56 days)* | 3040 | 5800 |

*UCS—Unconfined Compressive Strength (ASTM C-39)

TABLE 23

Composition of the SPLP Leachate Tested by Energy Laboratories

| Ingredients, wt. % | MCLG (mg/L)$^1$ | MCL (mg/L)$^2$ or TT$^3$ | Mix B5-32 Treated PFA | B5-40 Frac Sand/Treated |
|---|---|---|---|---|
| GRO$^6$ ug/L | 6.6 | 6.6 | ND (<1.5) | ND (<0.5) |
| Tot. Purgeable HC$^8$, ug/L | | | ND (<0.5) | ND (<0.5) |
| DRO$^7$ mg/L | 10.0 | 10.0 | ND (<0.30) | ND (<0.30) |
| Tot Extract. HC | | | 0.32 | 0.43 |
| Arsenic, mg/L | 0 | 0.010 | ND (<0.001) | ND (<0.001) |
| Barium, mg/L | 2 | 2 | 1.35 | 1.20 |
| Cadmium, mg/L | 0.005 | 0.005 | ND (<0.001) | ND (<0.001) |
| Chromium, mg/L | 0.1 | 0.1 | 0.071 | 0.055 |
| Lead, mg/L | 0 | 0.015 (TT) | ND (<0.001) | ND (<0.001) |
| Mercury, mg/L | 0.002 | 0.002 | ND (<0.002) | ND (<0.002) |
| Selenium, mg/L | 0.05 | 0.05 | 0.005 | 0.005 |
| Silver, mg/L | No Listing$^5$ | No Listing$^5$ | ND (<0.001) | ND (<0.001) |

$^1$MCLG—Maximum Contaminant Level Goal - The level of a contaminant in drinking water below which there is no known or expected risk to health. MCLGs allow for a margin of safety and are non-enforceable public health goals.
$^2$MCL—Maximum Contaminant Level - The highest level of a contaminant that is allowed in drinking water. MCLs are set close to MCLGs as feasible using best available treatment technology and taking cost into consideration. MCLs are enforceable standards.
$^3$TT—Treatment Technique - A required process intended to reduce the level of a contaminant in drinking water.
4. Contaminants list represent those that were not below detection levels.
$^5$No listing of the MCLG and MCL in WY DEQ Fact Sheet 12.
$^6$GRO—Gasoline Range Organics eluting between 2-methylpentane and 1,2,4 Trimethylbenzene.
$^7$DRO—Diesel Range Organics. DRO are defined as all hydrocarbons eluting between C10 and C28.
$^8$Total Purgeable hydrocarbons are defined as the total hydrocarbon response regardless of the elution time.

Test Series 3-2

One of the characteristics of aggregate that may be intended for use in various Portland cement concrete and even asphaltic construction applications, is that it may reflect the potential of aggregate to experience or not Freeze-Thaw (F/T) cycle durability. As a result of the importance of F/T for commercial deployment of aggregate for use, a number of tests have been devised perhaps to address the mechanism of aggregate disintegration as the results of F/T cycles, such as different pore size/conductivity, in addition to absorption/specific gravity (ASTM Method C128) and others. F/T deterioration may occur when the retained water in the pores in aggregate freezes which may cause volume change. Such change in volume may apply a disruptive pressure which can fracture the aggregate particle and may lead to failure of the surrounding mortar. The durability of aggregates under F/T cycles may be due the absorption of water into both small and even large pores which when frozen may expand and may cause cracks and even loss of durability. Large pores may be more directly related to the deterioration than small pores which may have more solute materials and may tend not to freeze. A dependable test may include where the aggregate may be made into Portland cement concrete or other products that are being foreseen for the use of the aggregate. ASTM Method C-666 may deploy about 300 cycles of freezing and thawing and may require a significant length of time.

Statistical analyses have been conducted to ascertain if available low cost less time-consuming tests could be used which can predict the results of ASTM C666 tests. There may be a number of different tests used by Federal and State Highway Engineers to predict the long-term performance of aggregate used in highway construction concrete and asphaltic concrete project. A number of mix compositions were tested by ASTM C-128. A summary of absorption percentage is presented in Table 25. The mixes in Table 24 may be the same as those in Table 22.

TABLE 24

Relationship of Strength on Absorption and Specific Gravity

| | B5-33/36 | B5-45/46 |
|---|---|---|
| UCS, psi | | |
| 56 days | 3040 | 5800 |
| Absorption, wt. % 56 days | | |
| 56 days | 8.42 | 4.78 |
| Density (lbs/cu. ft. | 140 | 150 |

It should be noted that these mixes were made with floc that was decanted, but not further dewatering as seen in the dewatering scenarios. These mixes may rely on the increased use of PFA to absorb the excess water in floc mix and may deliver the correct consistency of the mix. The floc in the mixes may appear to form very small agglomerates of floc that may not be completely distributed throughout the mix. By further drying the floc, the floc and remaining floc water may be better distributed in the mix perhaps while providing the preferred consistency of the mix.

Deeper dewatering may be important to F/T durability perhaps because a limit used by many State and Highway Agencies may be less than about 2.3% absorption to indicate good performance in the field and these types of mixes may not follow this level due to the final destination of the water in the mix. As such, a much lower absorption and even higher strength can be accomplished with a better dewatering of the floc and frac wastes.

The ability to use absorption and even specific gravity perhaps to distinguish good performance aggregates being produced by the encapsulation process could be used for a relatively low-cost process control and even as a quality control tool.

It may be possible that the performance of these manufactured aggregates may not perform in the F/T tests as would natural aggregate perform. As such, an ASTM C-666 Freeze/Thaw testing protocol, which usually uses the criteria of 'Good' field performance with less than about 6% loss after about 300 Freeze and Thaw cycles in the ASTM C666, could be performed and even compared with the simpler ASTM C-128 performance protocol.

Example 4: Heavy Metal Encapsulation

The application of the encapsulation process can be applied to base metals perhaps associated with base metal mining and processing such as but not limited to tailings and gangue materials, including the treatment to prevent the release of these metals, such as lead, from the processing, smeltering, processing and the disposal of slag and keep the heavy metals in the processing wastes from entering the environment, or the like. An encapsulation process could allow the use of the encapsulated material in various applications, including mine backfilling and/or other applications such as road base or the like.

A problem with lead and other base metals may be that many of the ore materials are sulfide minerals which upon weathering and oxidation may result in acidic leachate perhaps provided a low pH which may increase a higher solubility of heavy metals in the leachate. A relationship of the solubility of these metals with pH may be understood in FIG. 7.

The testing involved may use a concentration of heavy metals of interest, such as Pb, and Cd in an aqueous solution or the like, perhaps mixed with Class C fly ash which may have been modified to simulate Fluidized Bed Combustion ("FBC") ash. Bland (1999) may have provided processes for the production of aggregates from FBC ash and showed information of the ash demonstrating a free CaO concentration of at least about 10%. The use of the FBC ash may not only reduce the cost of an external adjustment of the pH of an aggregate composition, but it may reduce the adjustment of the pH perhaps as compared to adding external CaO, MgO or other additives to adjust the pH. FBC ash could be sufficient to adjust the pH into the range of the lowest solubilities of the metals of interest perhaps in addition to the encapsulation properties.

Type V Portland Cement can be used in an encapsulation process perhaps in conjunction with Type I/II Portland Cement. For the encapsulation testing of high concentration of heavy metals, Type I/II/V Portland cement may be used for the encapsulation process. The use of Type V components may be necessary perhaps for sulfate resistance since the original form of these heavy metals may be as sulfides. The oxidation of the sulfides could create a high sulfate environment. The mixture may be mixed with Type I/II/V Portland cement (sulfate compatible) and sand, or the like.

The mechanism of pH adjustment and even encapsulation may provide that a final product could meet aggregate specifications. The SPLP leaching results of this test are presented in Table 25.

TABLE 25

Summary of the Strength and Leachate Composition of Encapsulation Aggregate.

| Ingredients, g | Heavy Metals - 425 Type I/II/V Portland Cement |
|---|---|
| Sand | 1500 |
| HA with 10%% CaO | 600 |
| Type I/II/V Portland Cement | 425 |
| Water | 172.5 |
| Pb in Mix, ppm | 826 |
| Cd in Mix. ppm | 331 |
| Leaching Results | |
| Pb ppm in Leaching Media, mg/L | 0.075* |
| Cd ppm in Leaching Media, mg/L | ND (<0.001) |

*ND for Pb is 0.001 mg/L

The example method of encapsulation and selection of ashes with inherent quick lime (CaO) in limestone-based sorbent FBC ash or CaO and MgO in the case of dolomite-based sorbent FBC ash may be used. Potentially, an amount of Type I/II/V Portland cement can be reduced in the mix perhaps while maintaining encapsulation of heavy metals found in mining, smelter, slag operations, or the like.

Example 5: Contaminated Soils

A series of mixes were prepared that may address encapsulation of diesel contaminated soil. The soil may be composed of a significant clay content. The soil may have required a pretreatment step perhaps to get efficient mixing even in a high energy mixer. Sand may be used to break up the clay balls that can occur with high energy mixing. The Proctor densities from this test as shown in Table 26 ranged from about 127 to about 137 lbs./cubic foot. Without the sand, the Proctor density may be the lowest of the four mixes. The pretreatment step may have allowed the high energy mixer to provide an excellent mix with the production of the small spheres that may be the signature of having the right moisture and thereby may produce the greatest Proctor density. The addition of a small amount of sand may increase the density and as such the final product could be used as a stabilized base material.

TABLE 26

Mixes Using P-Corp (dry) Fly Ash, Portland Cement, and Contaminated Soil

| Mix Ingredients, g. | Mix C Soil 1 | Mix D Soil 1 | Mix F Soil 1 | Mix G Soil 1 |
|---|---|---|---|---|
| Sand | | 300 | 300 | 400 |
| Contaminated Soil | 1100 | 1000 | 1000 | 1000 |
| Class C Fly Ash | 820 | 700 | 700 | 800 |
| Portland Cement | 200 | 200 | 200 | 200 |
| Water | 290.0 | 282.0 | 282.0 | 220.6 |
| Proctor Density, lb/cu. ft | 127.20 | 137.09 | 130.8 | 131.0 |

As such, the possible use of the various embodiments of the present invention perhaps for treatment/encapsulation of the contaminated soils can be employed perhaps with the pre-treatment in these tests. Sand can be used to provide mix consistency and even high compacted density.

Examples of alternative claims may include:
1. A method for reusing contaminants comprising the steps of:
   providing waste from a fracturing process;
   providing ash;
   providing a first supply of Portland cement;
   high energy mixing said waste from said fracturing process, said ash, and said Portland cement to create a plurality of agglomerates;
   processing said agglomerates; and
   encapsulating said agglomerates.
2. The method for reusing contaminants as described in clause 1, or any other clause, wherein said waste from said fracturing process comprises back flow fluid waste and fracture sand.
3. The method for reusing contaminants as described in clause 2, or any other clause, wherein said back flow fluid waste comprises waste water and fracturing fluid.
4. The method for reusing contaminants as described in clause 1, or any other clause, wherein said waste from said fracturing process comprises a component selected from a group consisting of gasoline range organics, diesel range organics, heavy metals, lead, cadmium, arsenic, and any combination thereof.
5. The method for reusing contaminants as described in clause 1, or any other clause, wherein said waste from said fracturing process comprises a waste selected from a group consisting of Resource Conservation and Recovery Act (RCRA) wastes, Section C RCRA wastes, and Section D RCRA wastes.
6. The method for reusing contaminants as described in clause 5, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.
7. The method for reusing contaminants as described in clause 5, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.
8. The method for reusing contaminants as described in clause 1, or any other clause, wherein said Portland cement is selected from a group consisting of Type I/II Portland cement, Type V Portland cement, and Type I/II/V Portland cement.
9. The method for reusing contaminants as described in clause 1, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.
10. The method for reusing contaminants as described in clause 1, or any other clause, wherein said step of high energy mixing said waste from said fracturing process, said ash, and said Portland cement to create said agglomerate comprises the steps of mixing said waste, said ash, and said Portland cement in a Hobart mixer for about one minute at a first speed; and continuing to mix said waste, said ash, and said Portland cement for two minutes at a higher speed.
11. The method for reusing contaminants as described in clause 10, or any other clause, wherein said first speed comprises level one and said higher speed comprises level two.
12. The method for reusing contaminants as described in clause 1, or any other clause, and further comprising a step of adding water into a mixture of said waste from said fracturing process, said ash, and said Portland cement.
13. The method for reusing contaminants as described in clause 1, or any other clause, and further comprising a step of adding a chemical into a mixture of said waste from said fracturing process, said ash, and said Portland cement.
14. The method for reusing contaminants as described in clause 13, or any other clause, wherein said chemical is selected from a group consisting of air entraining agents, retarding agents, chemical additives for Portland cement concrete, and any combination thereof.
15. The method for reusing contaminants as described in clause 1, or any other clause, and further comprising a step of adding fines into a mixture of said waste from said fracturing process, said ash, and said Portland cement.
16. The method for reusing contaminants as described in clause 1, or any other clause, wherein said agglomerates comprises a sphere shape.
17. The method for reusing contaminants as described in clause 1, or any other clause, wherein said step of processing said agglomerates comprises a step of pelletizing said agglomerates.
18. The method for reusing contaminants as described in clause 1, or any other clause, wherein said step of encapsulating said agglomerates comprises a step of coating said agglomerates with said Portland cement to create a first encapsulation of said wastes.
19. The method for reusing contaminants as described in clause 1, or any other clause, wherein said step of processing said agglomerates comprises a step of curing said agglomerates.
20. The method for reusing contaminants as described in clause 1, or any other clause, wherein said step of processing said agglomerates comprises a step of screening said agglomerates.
21. The method for reusing contaminants as described in clause 1 and further comprising the steps of producing fines from a processing step and adding said fines to a mixture of said waste, said ash, and said Portland cement.
22. The method for reusing contaminants as described in clause 1, or any other clause, and further comprising a step of providing a final aggregate with said encapsulated agglomerates.
23. The method for reusing contaminants as described in clause 22, or any other clause, and further comprising a step of using said final aggregate in an application selected from a group consisting of Portland cement concrete, asphaltic construction applications, highway construction concrete, Jersey barriers, noise barriers, ornamental exterior products, pavers, and roller compacted concrete.

24. The method for reusing contaminants as described in clause 22, or any other clause, and further comprising the steps of adding said final aggregate to a second supply of Portland cement; and providing a double encapsulation of said waste.

25. The method for reusing contaminants as described in clause 24, or any other clause, and further comprising a step of adding a mixture of ash, Portland cement, and chemicals to said final aggregate.

26. The method for reusing contaminants as described in clause 1, or any other clause, wherein said step of processing said agglomerates comprises the steps of pelletizing said agglomerates; coating said agglomerates with said Portland cement to create a first encapsulation; coating said first encapsulation with a second supply of Portland cement to create a double encapsulation of said waste; blending and compacting said double encapsulation; curing said double encapsulation; reclaiming said double encapsulation; crushing said double encapsulation; screening said double encapsulation; and creating a final aggregate.

27. The method for reusing contaminants as described in clause 1, or any other clause, wherein said step of processing said agglomerates comprises the steps of pelletizing said agglomerates; coating said agglomerates with said Portland cement and said ash to create a first encapsulation; coating said first encapsulation with a second supply of Portland cement and said ash to create a double encapsulation of said waste; blending and compacting said double encapsulation; curing said double encapsulation; reclaiming said double encapsulation; crushing said double encapsulation; screening said double encapsulation; and creating a final aggregate.

28. The method for reusing contaminants as described in clause 26, or any other clause, and further comprising a step of using said final aggregate in an application selected from a group consisting of Portland cement concrete, asphaltic construction applications, highway construction concrete, Jersey barriers, noise barriers, ornamental exterior products, pavers, and roller compacted concrete.

29. The method for reusing contaminants as described in clause 26, or any other clause, and further comprising the steps of adding said final aggregate to a third supply of Portland cement; and providing a triple encapsulation of said waste.

30. The method for reusing contaminants as described in clause 26, or any other clause, and further comprising the steps of adding said final aggregate to a third supply of Portland cement and ash; and providing a triple encapsulation of said waste.

31. The method for reusing contaminants as described in clause 29, or any other clause, and further comprising a step of adding a mixture of ash, Portland cement, and chemicals to said final aggregate.

32. The method for reusing contaminants as described in clause 1, or any other clause, wherein said step of processing said agglomerates comprises the steps of pelletizing said agglomerates; coating said agglomerates with said Portland cement to create a first encapsulation; coating said first encapsulation with a second supply of Portland cement to create a double encapsulation of said waste; blending and compacting said double encapsulation; curing said double encapsulation; reclaiming said double encapsulation; crushing said double encapsulation; screening said double encapsulation; coating said double encapsulation with a third supply of Portland cement to create a triple encapsulation of said waste; and creating a final aggregate.

33. The method for reusing contaminants as described in clause 1, or any other clause, wherein said step of processing said agglomerates comprises the steps of pelletizing said agglomerates; coating said agglomerates with said Portland cement and said ash to create a first encapsulation; coating said first encapsulation with a second supply of Portland cement and ash to create a double encapsulation of said waste; blending and compacting said double encapsulation; curing said double encapsulation; reclaiming said double encapsulation; crushing said double encapsulation; screening said double encapsulation; coating said double encapsulation with a third supply of Portland cement and ash to create a triple encapsulation of said waste; and creating a final aggregate.

34. The method for reusing contaminants as described in clause 32, or any other clause, and further comprising a step of using said final aggregate in an application selected from a group consisting of Portland cement concrete, asphaltic construction applications, highway construction concrete, Jersey barriers, noise barriers, ornamental exterior products, pavers, and roller compacted concrete.

35. The method for reusing contaminants as described in clause 32, or any other clause, and further comprising a step of adding a mixture of ash, Portland cement, and chemicals to said final aggregate.

36. The method for reusing contaminants as described in clause 32, or any other clause, and further comprising the steps of adding said final aggregate to a fourth supply of Portland cement; and providing a quadruple encapsulation of said waste.

37. The method for reusing contaminants as described in clause 36, or any other clause, and further comprising a step of adding a mixture of ash, Portland cement, and chemicals to said final aggregate.

38. The method for reusing contaminants as described in clause 1, or any other clause, and further comprising a step of providing waste from an oil and gas flocculant process.

39. The method for reusing contaminants as described in clause 38, or any other clause, wherein said high energy mixing said waste from said fracturing process, said ash, and said Portland cement to create said plurality of agglomerates comprises a step of high energy mixing said waste from said fracturing process, said waste from said oil and gas flocculant process, said ash, and said Portland cement to create a plurality of agglomerates.

40. The method for reusing contaminants as described in clause 38, or any other clause, wherein said waste from said oil and gas flocculant process comprises oil and gas exploration and production contaminated wastewater treatment flocculant.

41. The method for reusing contaminants as described in clause 38, or any other clause, wherein said waste from said oil and gas flocculant process comprises a component selected from a group consisting of gasoline range organics, diesel range organics, heavy metals, lead, cadmium, arsenic, and any combination thereof.

42. The method for reusing contaminants as described in clause 38, or any other clause, wherein said waste from said oil and gas flocculant process comprises a waste selected from a group consisting of Resource Conservation and Recovery Act (RCRA) wastes, Section C RCRA wastes, and Section D RCRA wastes.

43. The method for reusing contaminants as described in clause 42, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.

44. The method for reusing contaminants as described in clause 42, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.

45. The method for reusing contaminants as described in clause 1, or any other clause, and further comprising a step of providing waste from base metal mining and processing.

46. The method for reusing contaminants as described in clause 45, or any other clause, wherein said high energy mixing said waste from said fracturing process, said ash, and said Portland cement to create said plurality of agglomerates comprises a step of high energy mixing said waste from said fracturing process, said waste from said base metal mining, said ash, and said Portland cement to create a plurality of agglomerates.

47. The method for reusing contaminants as described in clause 45, or any other clause, wherein said waste from said base metal mining comprises a component selected from a group consisting of tailings, gangue materials, treatment components from preventing release of metals, components from processing base metals; components from smelting base metals; components from processing of slag; components from disposal of slag, ore, lead, chromium, zinc, copper, cadmium, and nickel.

48. The method for reusing contaminants as described in clause 1, or any other clause, and further comprising a step of providing waste from contaminated soil or hydrocarbon containing soil.

49. The method for reusing contaminants as described in clause 48, or any other clause, wherein said high energy mixing said waste from said fracturing process, said ash, and said Portland cement to create said plurality of agglomerates comprises a step of high energy mixing said waste from said fracturing process, said waste from said contaminated soil, said ash, and said Portland cement to create a plurality of agglomerates.

50. The method for reusing contaminants as described in clause 48, or any other clause, wherein said contaminated soil comprise diesel contaminated soil.

51. The method for reusing contaminants as described in clause 38, or any other clause, and further comprising the step of dewatering said waste from said oil and gas flocculant process.

52. The method for reusing contaminants as described in clause 51, or any other clause, wherein said step of dewatering said waste comprises the steps of allowing said waste to settle; and skim off a decant.

53. The method for reusing contaminants as described in clause 51, or any other clause, wherein said step of dewatering said waste comprises a step of adding ash to said waste.

54. The method for reusing contaminants as described in clause 53, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.

55. The method for reusing contaminants as described in clause 51, or any other clause, wherein said step of dewatering said waste comprises a step selected from a group consisting of filtration, pressure filtration, centrifugal separation, oxidative additives, and any combination thereof.

56. The method for reusing contaminants as described in clause 51, or any other clause, wherein said step of dewatering said waste comprises a step of shearing flocculant of said waste.

57. The method for reusing contaminants as described in clause 51, or any other clause, wherein said step of dewatering said waste comprises the steps of:
providing a sand filter;
removing flocculant from water of said waste with said sand filter; and
feeding said flocculant to an aggregate production mix.

58. The method for reusing contaminants as described in clause 57, or any other clause, wherein said step of dewatering said waste further comprises the steps of:
cleaning sand filtrate exiting said sand filter with a PMAC filter to provide a clean sand filtrate; and
feeding said clean sand filtrate to an aggregate production mix.

59. The method for reusing contaminants as described in clause 58, or any other clause, wherein said PMAC filter comprises high carbon ash.

60. The method for reusing contaminants as described in clause 58, or any other clause, wherein said step of dewatering said waste further comprises a step of adding oxidizing agents to said clean sand filtrate to provide clean water.

61. The method for reusing contaminants as described in clause 60, or any other clause, wherein said oxidizing agents are selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.

62. The method for reusing contaminants as described in clause 51, or any other clause, wherein said step of dewatering said waste comprises the steps of:
pressure filtering flocculant in said waste to provide a pressure filtrate and filtered flocculant;
shearing said filtered flocculant;
removing flocculant from water of said filtered flocculant with a sand filter;
feeding said flocculant to an aggregate production mix;
cleaning sand filtrate exiting said sand filter with a PMAC filter to provide a clean sand filtrate;

feeding said clean sand filtrate to an aggregate production mix;

adding oxidizing agents to said clean sand filtrate to provide clean water;

cleaning pressure filtrate exiting said pressure filter with a PMAC filter to provide a clean pressure filtrate;

feeding said clean pressure filtrate to an aggregate production mix; and adding oxidizing agents to said clean pressure filtrate to provide clean water.

63. The method for reusing contaminants as described in clause 62, or any other clause, wherein said PMAC filter comprises high carbon ash.

64. The method for reusing contaminants as described in clause 62, or any other clause, wherein said oxidizing agents are selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.

65. The method for reusing contaminants as described in clause 1, or any other clause, and further comprising a step of pretreating said ash.

66. The method for reusing contaminants as described in clause 65, or any other clause, wherein said step of pretreating said ash comprises a step selected from a group consisting of conditioning said ash; add lime to said ash; and add oxide to said ash.

67. The method for reusing contaminants as described in clause 1, or any other clause, and further comprising a step of pretreating said waste.

68. The method for reusing contaminants as described in clause 67, or any other clause, wherein said step of pretreating said waste comprises a step selected from a group consisting of: adding ash to said waste; add chemicals to said waste; add minerals to said waste; fixate oily wastes; adjust a pH of said waste; and dewater said waste.

69. The method for reusing contaminants as described in clause 1, or any other clause, and further comprising a step of maintaining a pH of a mixture of said waste from said fracturing process, said ash, and said Portland cement between about 10 to about 11 pH.

70. The method for reusing contaminants as described in clause 1, or any other clause, and further comprising a step of adding entraining agents to a mixture of said waste from said fracturing process, said ash, and said Portland cement.

71. The method for reusing contaminants as described in clause 1, or any other clause, and further comprising a step of adding an organic compound to a mixture of said waste from said fracturing process, said ash, and said Portland cement.

72. The method for reusing contaminants as described in clause 71, or any other clause, wherein said organic compound is selected from a group consisting of a surfactant and air entraining admixture surfactants.

73. The method for reusing contaminants as described in clause 1, or any other clause, wherein said agglomerate meets ASTM or AASHTO specifications.

74. The method for reusing contaminants as described in clause 1, or any other clause, and further comprising the steps of determining a selection of said ash comprising:

assessing sources of said ash, said waste, and said Portland cement;

assessing chemical and mineral characteristics of said waste, said ash, and said Portland cement;

conduct laboratory testing with high energy mixing of said waste, said ash, and said Portland cement to create a mixed composite;

curing said mixed composite;

assessing an attribute of said cured mixed composite selected from a group consisting of strength development, linear expansion, freeze/thaw resistance, soundness, abrasion, and leaching;

modifying said waste, said ash, or said Portland cement with a pre-treatment to adjust an attribute of said assessing an attribute step;

retesting with high energy mixing of said modified mixture of said waste, said ash, and said Portland cement to create a mixed composite; and assessing said cured composite for a level of waste and a ratio of Portland cement to waste.

75. A method for reusing contaminants comprising:

providing waste from an oil and gas flocculant process;

providing ash;

providing a first supply of Portland cement;

high energy mixing said waste from said oil and gas flocculant process, said ash, and said Portland cement to create a plurality of agglomerates;

processing said agglomerates; and encapsulating said agglomerates.

76. The method for reusing contaminants as described in clause 75, or any other clause, wherein said waste from said oil and gas flocculant process comprises oil and gas exploration and production contaminated wastewater treatment flocculant.

77. The method for reusing contaminants as described in clause 75, or any other clause, wherein said waste from said oil and gas flocculant process comprises a component selected from a group consisting of gasoline range organics, diesel range organics, heavy metals, lead, cadmium, arsenic, and any combination thereof.

78. The method for reusing contaminants as described in clause 75, or any other clause, wherein said waste from said oil and gas flocculant process comprises a waste selected from a group consisting of Resource Conservation and Recovery Act (RCRA) wastes, Section C RCRA wastes, and Section D RCRA wastes.

79. The method for reusing contaminants as described in clause 78, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.

80. The method for reusing contaminants as described in clause 78, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.

81. The method for reusing contaminants as described in clause 75, or any other clause, wherein said Portland cement is selected from a group consisting of Type I/II Portland cement, Type V Portland cement, and Type I/II/V Portland cement.

82. The method for reusing contaminants as described in clause 75, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.

83. The method for reusing contaminants as described in clause 75, or any other clause, wherein said step of high energy mixing said waste from said oil and gas flocculant process, said ash, and said Portland cement to create said agglomerate comprises the steps of mixing said waste, said ash, and said Portland cement in a Hobart mixer for about one minute at a first speed; and continuing to mix said waste, said ash, and said Portland cement for two minutes at a higher speed.

84. The method for reusing contaminants as described in clause 83, or any other clause, wherein said first speed comprises level one and said higher speed comprises level two.

85. The method for reusing contaminants as described in clause 75, or any other clause, and further comprising a step of adding water into a mixture of said waste from said oil and gas flocculant process, said ash, and said Portland cement.

86. The method for reusing contaminants as described in clause 75, or any other clause, and further comprising a step of adding a chemical into a mixture of said waste from said oil and gas flocculant process, said ash, and said Portland cement.

87. The method for reusing contaminants as described in clause 86, or any other clause, wherein said chemical is selected from a group consisting of air entraining agents, retarding agents, chemical additives for Portland cement concrete, and any combination thereof.

88. The method for reusing contaminants as described in clause 75, or any other clause, and further comprising a step of adding fines into a mixture of said waste from said oil and gas flocculant process, said ash, and said Portland cement.

89. The method for reusing contaminants as described in clause 75, or any other clause, wherein said agglomerates comprises a sphere shape.

90. The method for reusing contaminants as described in clause 75, or any other clause, wherein said step of processing said agglomerates comprises a step of pelletizing said agglomerates.

91. The method for reusing contaminants as described in clause 75, or any other clause, wherein said step of encapsulating said agglomerates comprises a step of coating said agglomerates with said Portland cement to create a first encapsulation of said wastes.

92. The method for reusing contaminants as described in clause 75, or any other clause, wherein said step of processing said agglomerates comprises a step of curing said agglomerates.

93. The method for reusing contaminants as described in clause 75, or any other clause, wherein said step of processing said agglomerates comprises a step of screening said agglomerates 94. The method for reusing contaminants as described in clause 75, or any other clause, and further comprising the steps of producing fines from a processing step and adding said fines to a mixture of said waste, said ash, and said Portland cement.

95. The method for reusing contaminants as described in clause 75, or any other clause, and further comprising a step of providing a final aggregate with said encapsulated agglomerates.

96. The method for reusing contaminants as described in clause 95, or any other clause, and further comprising a step of using said final aggregate in an application selected from a group consisting of Portland cement concrete, asphaltic construction applications, highway construction concrete, Jersey barriers, noise barriers, ornamental exterior products, pavers, and roller compacted concrete.

97. The method for reusing contaminants as described in clause 95, or any other clause, and further comprising the steps of adding said final aggregate to a second supply of Portland cement; and providing a double encapsulation of said waste.

98. The method for reusing contaminants as described in clause 97, or any other clause, and further comprising a step of adding a mixture of ash, Portland cement, and chemicals to said final aggregate.

99. The method for reusing contaminants as described in clause 75, or any other clause, wherein said step of processing said agglomerates comprises the steps of pelletizing said agglomerates; coating said agglomerates with said Portland cement to create a first encapsulation; coating said first encapsulation with a second supply of Portland cement to create a double encapsulation of said waste; blending and compacting said double encapsulation; curing said double encapsulation; reclaiming said double encapsulation; crushing said double encapsulation; screening said double encapsulation; and creating a final aggregate.

100. The method for reusing contaminants as described in clause 75, or any other clause, wherein said step of processing said agglomerates comprises the steps of pelletizing said agglomerates; coating said agglomerates with said Portland cement and said ash to create a first encapsulation; coating said first encapsulation with a second supply of Portland cement and ash to create a double encapsulation of said waste; blending and compacting said double encapsulation; curing said double encapsulation; reclaiming said double encapsulation; crushing said double encapsulation; screening said double encapsulation; and creating a final aggregate.

101. The method for reusing contaminants as described in clause 99, or any other clause, and further comprising a step of using said final aggregate in an application selected from a group consisting of Portland cement concrete, asphaltic construction applications, highway construction concrete, Jersey barriers, noise barriers, ornamental exterior products, pavers, and roller compacted concrete.

102. The method for reusing contaminants as described in clause 99, or any other clause, and further comprising the steps of adding said final aggregate to a third supply of Portland cement; and providing a triple encapsulation of said waste.

103. The method for reusing contaminants as described in clause 99, or any other clause, and further comprising the steps of adding said final aggregate to a third supply of Portland cement and ash; and providing a triple encapsulation of said waste.

104. The method for reusing contaminants as described in clause 102, or any other clause, and further comprising a step of adding a mixture of ash, Portland cement, and chemicals to said final aggregate.

105. The method for reusing contaminants as described in clause 75, or any other clause, wherein said step of processing said agglomerates comprises the steps of pelletizing said agglomerates; coating said agglomerates with said Portland cement to create a first encapsulation; coating said first encapsulation with a second supply of Portland cement to create a double encapsulation of said waste; blending and compacting said double encapsulation; curing said double encapsulation; reclaiming said double encapsulation; crushing said double encapsulation; screening said double encapsulation; coating said double encapsulation with a third supply of Portland cement to create a triple encapsulation of said waste; and creating a final aggregate.

106. The method for reusing contaminants as described in clause 75, or any other clause, wherein said step of processing said agglomerates comprises the steps of pelletizing said agglomerates; coating said agglomerates with said Portland cement and said ash to create a first encapsulation; coating said first encapsulation with a second supply of Portland cement and ash to create a double encapsulation of said waste; blending and compacting said double encapsulation; curing said double encapsulation; reclaiming said double encapsulation; crushing said double encapsulation; screening said double encapsulation; coating said double encapsulation with a third supply of Portland cement and ash to create a triple encapsulation of said waste; and creating a final aggregate.

107. The method for reusing contaminants as described in clause 105, or any other clause, and further comprising a step of using said final aggregate in an application selected from a group consisting of Portland cement concrete, asphaltic construction applications, highway construction concrete, Jersey barriers, noise barriers, ornamental exterior products, pavers, and roller compacted concrete.

108. The method for reusing contaminants as described in clause 105, or any other clause, and further comprising a step of adding a mixture of ash, Portland cement, and chemicals to said final aggregate.

109. The method for reusing contaminants as described in clause 105, or any other clause, and further comprising the steps of adding said final aggregate to a fourth supply of Portland cement; and providing a quadruple encapsulation of said waste.

110. The method for reusing contaminants as described in clause 109, or any other clause, and further comprising a step of adding a mixture of ash, Portland cement, and chemicals to said final aggregate.

111. The method for reusing contaminants as described in clause 75, or any other clause, and further comprising a step of providing waste from a fracturing process.

112. The method for reusing contaminants as described in clause 111, or any other clause, wherein said high energy mixing said waste from said fracturing process, said ash, and said Portland cement to create said plurality of agglomerates comprises a step of high energy mixing said waste from said fracturing process, said waste from said oil and gas flocculant process, said ash, and said Portland cement to create a plurality of agglomerates.

113. The method for reusing contaminants as described in clause 111, or any other clause, wherein said waste from said fracturing process comprises back flow fluid waste and fracture sand.

114. The method for reusing contaminants as described in clause 112, or any other clause, wherein said back flow fluid waste comprises waste water and fracturing fluid.

115. The method for reusing contaminants as described in clause 111, or any other clause, wherein said waste from said fracturing process comprises a component selected from a group consisting of gasoline range organics, diesel range organics, heavy metals, lead, cadmium, arsenic, and any combination thereof.

116. The method for reusing contaminants as described in clause 111, or any other clause, wherein said waste from said fracturing process comprises a waste selected from a group consisting of Resource Conservation and Recovery Act (RCRA) wastes, Section C RCRA wastes, and Section D RCRA wastes.

117. The method for reusing contaminants as described in clause 116, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.

118. The method for reusing contaminants as described in clause 116, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.

119. The method for reusing contaminants as described in clause 75, or any other clause, and further comprising a step of providing waste from base metal mining processing.

120. The method for reusing contaminants as described in clause 119, or any other clause, wherein said high energy mixing said waste from said oil and gas flocculant process, said ash, and said Portland cement to create said plurality of agglomerates comprises a step of high energy mixing said waste from said oil and gas flocculant process, said waste from said base metal mining, said ash, and said Portland cement to create a plurality of agglomerates.

121. The method for reusing contaminants as described in clause 199, or any other clause, wherein said waste from said base metal mining comprises a component selected from a group consisting of tailings, gangue materials, treatment components from preventing release of metals, components from processing base metals; components from smeltering base metals; components from processing of slag; components from disposal of slag, ore, lead, chromium, zinc, copper, cadmium, and nickel.

122. The method for reusing contaminants as described in clause 75, or any other clause, and further comprising a step of providing waste from contaminated soil or hydrocarbon containing soil.

123. The method for reusing contaminants as described in clause 122, or any other clause, wherein said high energy mixing said waste from said oil and gas flocculant process, said ash, and said Portland cement to create said plurality of agglomerates comprises a step of high energy mixing said waste from said oil and gas flocculant process, said waste from said contaminated soil, said ash, and said Portland cement to create a plurality of agglomerates.

124. The method for reusing contaminants as described in clause 122, or any other clause, wherein said contaminated soil comprise diesel contaminated soil.

125. The method for reusing contaminants as described in clause 75, or any other clause, and further comprising the step of dewatering said waste from said oil and gas flocculant process.

126. The method for reusing contaminants as described in clause 125, or any other clause, wherein said step of dewatering said waste comprises the steps of allowing said waste to settle; and skim off a decant.

127. The method for reusing contaminants as described in clause 125, or any other clause, wherein said step of dewatering said waste comprises a step of adding ash to said waste.

128. The method for reusing contaminants as described in clause 127, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.

129. The method for reusing contaminants as described in clause 125, or any other clause, wherein said step of dewatering said waste comprises a step selected from a group consisting of filtration, pressure filtration, centrifugal separation, oxidative additives, and any combination thereof.

130. The method for reusing contaminants as described in clause 125, or any other clause, wherein said step of dewatering said waste comprises a step of shearing flocculant of said waste.

131. The method for reusing contaminants as described in clause 125, or any other clause, wherein said step of dewatering said waste comprises the steps of:
providing a sand filter;
removing flocculant from water of said waste with said sand filter; and
feeding said flocculant to an aggregate production mix.

132. The method for reusing contaminants as described in clause 131, or any other clause, wherein said step of dewatering said waste further comprises the steps of:
cleaning sand filtrate exiting said sand filter with a PMAC filter to provide a clean sand filtrate; and
feeding said clean sand filtrate to an aggregate production mix.

133. The method for reusing contaminants as described in clause 132, or any other clause, wherein said PMAC filter comprises high carbon ash.

134. The method for reusing contaminants as described in clause 132, or any other clause, wherein said step of dewatering said waste further comprises a step of adding oxidizing agents to said clean sand filtrate to provide clean water.

135. The method for reusing contaminants as described in clause 134, or any other clause, wherein said oxidizing agents are selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.

136. The method for reusing contaminants as described in clause 125, or any other clause, wherein said step of dewatering said waste comprises the steps of:
pressure filtering flocculant in said waste to provide a pressure filtrate and filtered flocculant;
shearing said filtered flocculant;
removing flocculant from water of said filtered flocculant with a sand filter;
feeding said flocculant to an aggregate production mix;
cleaning sand filtrate exiting said sand filter with a PMAC filter to provide a clean sand filtrate;
feeding said clean sand filtrate to an aggregate production mix;
adding oxidizing agents to said clean sand filtrate to provide clean water;
cleaning pressure filtrate exiting said pressure filter with a PMAC filter to provide a clean pressure filtrate;
feeding said clean pressure filtrate to an aggregate production mix; and
adding oxidizing agents to said clean pressure filtrate to provide clean water.

137. The method for reusing contaminants as described in clause 136, or any other clause, wherein said PMAC filter comprises high carbon ash.

138. The method for reusing contaminants as described in clause 136, or any other clause, wherein said oxidizing agents are selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.

139. The method for reusing contaminants as described in clause 75, or any other clause, and further comprising a step of pretreating said ash.

140. The method for reusing contaminants as described in clause 139, or any other clause, wherein said step of pretreating said ash comprises a step selected from a group consisting of conditioning said ash; add lime to said ash; and add oxide to said ash.

141. The method for reusing contaminants as described in clause 75, or any other clause, and further comprising a step of pretreating said waste.

142. The method for reusing contaminants as described in clause 141, or any other clause, wherein said step of pretreating said waste comprises a step selected from a group consisting of: adding ash to said waste; add chemicals to said waste; add minerals to said waste; fixate oily wastes; adjust a pH said waste; and dewater said waste.

143. The method for reusing contaminants as described in clause 75, or any other clause, and further comprising a step of maintaining a pH of a mixture of said waste from said oil and gas flocculant process, said ash, and said Portland cement between about 10 to about 11 pH.

144. The method for reusing contaminants as described in clause 75, or any other clause, and further comprising a step of adding entraining agents to a mixture of said waste from said oil and gas flocculant process, said ash, and said Portland cement.

145. The method for reusing contaminants as described in clause 75, or any other clause, and further comprising a step of adding an organic compound to a mixture of said waste from said oil and gas flocculant process, said ash, and said Portland cement.

146. The method for reusing contaminants as described in clause 145, or any other clause, wherein said organic compound is selected from a group consisting of a surfactant and air entraining admixture surfactants.

147 The method for reusing contaminants as described in clause 75, or any other clause, wherein said agglomerate meets ASTM or AASHTO specifications.

148. The method for reusing contaminants as described in clause 75, or any other clause, and further comprising the steps of determining a selection of said ash comprising:
 assessing sources of said ash, said waste, and said Portland cement;
 assessing chemical and mineral characteristics of said waste, said ash, and said Portland cement;
 conduct laboratory testing with high energy mixing of said waste, said ash, and said Portland cement to create a mixed composite;
 curing said mixed composite;
 assessing an attribute of said cured mixed composite selected from a group consisting of strength development, linear expansion, freeze/thaw resistance, soundness, abrasion, and leaching;
 modifying said waste, said ash, or said Portland cement with a pre-treatment to adjust an attribute of said assessing an attribute step;
 retesting with high energy mixing of said modified mixture of said waste, said ash, and said Portland cement to create a mixed composite; and
 assessing said cured composite for a level of waste and a ratio of Portland cement to waste.

149. A contaminant reuse system comprising:
 a plurality of agglomerates comprising waste from a fracturing process, ash, and a first supply of Portland cement resulting from high energy mixing;
 an agglomerates processor; and
 a plurality of encapsulated agglomerates.

150. The contaminant reuse system as described in clause 149, or any other clause, wherein said waste from said fracturing process comprises back flow fluid waste and fracture sand.

151. The contaminant reuse system as described in clause 150, or any other clause, wherein said back flow fluid waste comprises waste water and fracturing fluid.

152. The contaminant reuse system as described in clause 149, or any other clause, wherein said waste from said fracturing process comprises a component selected from a group consisting of gasoline range organics, diesel range organics, heavy metals, lead, cadmium, arsenic, and any combination thereof.

153. The contaminant reuse system as described in clause 149, or any other clause, wherein said waste from said fracturing process comprises a waste selected from a group consisting of Resource Conservation and Recovery Act (RCRA) wastes, Section C RCRA wastes, and Section D RCRA wastes.

154. The contaminant reuse system as described in clause 153, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.

155. The contaminant reuse system as described in clause 153, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.

156. The contaminant reuse system as described in clause 149, or any other clause, wherein said Portland cement is selected from a group consisting of Type I/II Portland cement, Type V Portland cement, and Type I/II/V Portland cement.

157. The contaminant reuse system as described in clause 149, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.

158. The contaminant reuse system as described in clause 149, or any other clause, wherein said high energy mixing comprises mixing said waste, said ash, and said Portland cement in a Hobart mixer for about one minute at a first speed; and continuing to mix said waste, said ash, and said Portland cement for two minutes at a higher speed.

159. The contaminant reuse system as described in clause 158, or any other clause, wherein said first speed comprises level one and said higher speed comprises level two.

160. The contaminant reuse system as described in clause 149, or any other clause, wherein said agglomerates further comprises water.

161. The contaminant reuse system as described in clause 149, or any other clause, wherein said agglomerates further comprises a chemical.

162. The contaminant reuse system as described in clause 161, or any other clause, wherein said chemical is selected from a group consisting of air entraining agents, retarding agents, chemical additives for Portland cement concrete, and any combination thereof.

163. The contaminant reuse system as described in clause 149, or any other clause, wherein said agglomerates further comprises fines.

164. The contaminant reuse system as described in clause 149, or any other clause, wherein said agglomerates comprises a sphere shape.

165. The contaminant reuse system as described in clause 149, or any other clause, wherein said agglomerates processer comprises a pelletizer.

166. The contaminant reuse system as described in clause 149, or any other clause, wherein encapsulated agglomerates comprises a first encapsulation.

167. The contaminant reuse system as described in clause 149, or any other clause, wherein said agglomerates processer comprises a curing process.

168. The contaminant reuse system as described in clause 149, or any other clause, wherein said agglomerates comprises a screener.

169. The contaminant reuse system as described in clause 149, or any other clause, and further comprising recycled fines from said agglomerates processer and wherein said plurality of said agglomerates further comprises recycled fines.
170. The contaminant reuse system as described in clause 149, or any other clause, and further comprising a final aggregate with said encapsulated agglomerates.
171. The contaminant reuse system as described in clause 170, or any other clause, wherein said final aggregate is configured to be used in an application selected from a group consisting of Portland cement concrete, asphaltic construction applications, highway construction concrete, Jersey barriers, noise barriers, ornamental exterior products, pavers, and roller compacted concrete.
172. The contaminant reuse system as described in clause 170, or any other clause, and further comprising a double encapsulation of said waste; said double encapsulating comprises said final aggregate coated with a second supply of Portland cement.
173. The contaminant reuse system as described in clause 170, or any other clause, and further comprising a double encapsulation of said waste; said double encapsulating comprises said final aggregate coated with a second supply of Portland cement and ash.
174. The contaminant reuse system as described in clause 172, or any other clause, wherein said double encapsulation further comprises a mixture of ash, Portland cement, and chemicals.
175. The contaminant reuse system as described in clause 149, or any other clause, wherein said agglomerates processor comprises a pelletizer of said agglomerates.
176. The contaminant reuse system as described in clause 175, or any other clause, and further comprising:
a double encapsulation comprising said encapsulated agglomerates coated with a second supply of Portland cement;
a double encapsulation processor comprising a blending processor, compacting processor, curing processor, reclaiming processor, crushing processor, and screening processor configured to produce a final aggregate.
177. The contaminant reuse system as described in clause 175, or any other clause, wherein said final aggregate is configured to be used in an application selected from a group consisting of Portland cement concrete, asphaltic construction applications, highway construction concrete, Jersey barriers, noise barriers, ornamental exterior products, pavers, and roller compacted concrete.
178. The contaminant reuse system as described in clause 175, or any other clause, and further comprising a triple encapsulation comprising said final aggregate of said double encapsulation coated with a third supply of Portland cement.
179. The contaminant reuse system as described in clause 175, or any other clause, and further comprising a triple encapsulation comprising said final aggregate of said double encapsulation coated with a third supply of Portland cement and ash.
180. The contaminant reuse system as described in clause 178, or any other clause, wherein said triple encapsulation comprises a mixture of ash, Portland cement, and chemicals.
181. The contaminant reuse system as described in clause 149, or any other clause, wherein said agglomerates processor comprises a pelletizer processor; and further comprising:
a double encapsulation comprising said encapsulated agglomerates coated with a second supply of Portland cement;
a double encapsulation processor comprising a blending processor, compacting processor, curing processor, reclaiming processor, crushing processor, and screening processor;
a triple encapsulation comprising said processed double encapsulation coated with a third supply of Portland cement; and
a triple encapsulation processor comprising a reclaiming processor, crushing processor, and screening processor configured to produce a final aggregate.
182. The contaminant reuse system as described in clause 149, or any other clause, wherein said agglomerates processor comprises a pelletizer processor;
and further comprising:
a double encapsulation comprising said encapsulated agglomerates coated with a second supply of Portland cement and ash;
a double encapsulation processor comprising a blending processor, compacting processor, curing processor, reclaiming processor, crushing processor, and screening processor;
a triple encapsulation comprising said processed double encapsulation coated with a third supply of Portland cement and ash; and
a triple encapsulation processor comprising a reclaiming processor, crushing processor, and screening processor configured to produce a final aggregate.
183. The contaminant reuse system as described in clause 181, or any other clause, wherein said final aggregate is configured to be used in an application selected from a group consisting of Portland cement concrete, asphaltic construction applications, highway construction concrete, Jersey barriers, noise barriers, ornamental exterior products, pavers, and roller compacted concrete.
184. The contaminant reuse system as described in clause 181, or any other clause, wherein said triple encapsulation comprises a mixture of ash, Portland cement, and chemicals.
185. The contaminant reuse system as described in clause 181, or any other clause, and further comprising a quadruple encapsulation comprising said final aggregate in a fourth supply of Portland cement.
186. The contaminant reuse system as described in clause 185, or any other clause, wherein said quadruple encapsulation comprises a mixture of ash, Portland cement, and chemicals.
187. The contaminant reuse system as described in clause 149, or any other clause, wherein said plurality of agglomerates further comprises waste from an oil and gas flocculant process.
188. The contaminant reuse system as described in clause 187, or any other clause, wherein said waste from said oil and gas flocculant process comprises oil and gas exploration and production contaminated wastewater treatment flocculant.
189. The contaminant reuse system as described in clause 187, or any other clause, wherein said waste from said oil and gas flocculant process comprises a component selected from a group consisting of gasoline range organics, diesel range organics, heavy metals, lead, cadmium, arsenic, and any combination thereof.
190. The contaminant reuse system as described in clause 187, or any other clause, wherein said waste from said oil and gas flocculant process comprises a waste selected from a group consisting of Resource Conservation and Recovery Act (RCRA) wastes, Section C RCRA wastes, and Section D RCRA wastes.
191. The contaminant reuse system as described in clause 190, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.
192. The contaminant reuse system as described in clause 190, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.
193. The contaminant reuse system as described in clause 149, or any other clause, wherein said plurality of agglomerates further comprises waste from base metal mining and processing.
194. The contaminant reuse system as described in clause 193, or any other clause, wherein said waste from said base metal mining comprises a component selected from a group consisting of tailings, gangue materials, treatment components from preventing release of metals, components from processing base metals; components from smeltering base metals; components from processing of slag; components from disposal of slag, ore, lead, chromium, zinc, copper, cadmium, and nickel.
195. The contaminant reuse system as described in clause 149, or any other clause, wherein said plurality of agglomerates further comprises waste from contaminated soil or hydrocarbon containing soil.
196. The contaminant reuse system as described in clause 195, or any other clause, wherein said contaminated soil comprise diesel contaminated soil.
197. The contaminant reuse system as described in clause 187, or any other clause, and further comprising a dewatering processor of said waste from said oil and gas flocculant process.
198. The contaminant reuse system as described in clause 197, or any other clause, wherein said dewatering processor comprises a water settler and a decant removal.
199. The contaminant reuse system as described in clause 197, or any other clause, wherein said dewatering processor is configured to add ash to said waste.
200. The contaminant reuse system as described in clause 199, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.
201. The contaminant reuse system as described in clause 197, or any other clause, wherein said dewatering processor is selected from a group consisting of filtration, pressure filtration, centrifugal separation, oxidative additives, and any combination thereof.
202. The contaminant reuse system as described in clause 197, or any other clause, wherein dewatering processor comprises a flocculant shearer.
203. The contaminant reuse system as described in clause 197, or any other clause, wherein said dewatering processor comprises a sand filter configured to remove flocculant from water of said waste; and a flocculant feed to an aggregate production mix.
204. The contaminant reuse system as described in clause 203, or any other clause, wherein said dewatering processor further comprises a sand filtrate PMAC filter configured to provide a clean sand filtrate; and a clean sand filtrate feed to an aggregate production mix.
205. The contaminant reuse system as described in clause 204, or any other clause, wherein said PMAC filter comprises high carbon ash.
206. The contaminant reuse system as described in clause 204, or any other clause, wherein said dewatering processor further comprises an oxidizing agent configured to clean sand filtrate and provide clean water.
207. The contaminant reuse system as described in clause 206, or any other clause, wherein said oxidizing agent is selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.
208. The contaminant reuse system as described in clause 197, or any other clause, wherein said dewatering processor comprises:
   a pressure filter of flocculant in said waste configured to provide a pressure filtrate and filtered flocculant;
   a filtered flocculant shearer;
   a sand filter configured to remove flocculant from water of said filtered flocculant;
   a flocculant feed to an aggregate production mix;
   a sand filtrate PMAC filter configured to provide a clean sand filtrate;
   clean sand filtrate feed to an aggregate production mix;
   an oxidizing agent configured to clean sand filtrate and provide clean water;
   a pressure filtrate PMAC filter configured to provide a clean pressure filtrate;
   a clean pressure filtrate feed to an aggregate production mix; and
   an oxidizing agent configured to said clean pressure filtrate and to provide clean water.
209. The contaminant reuse system as described in clause 208, or any other clause, wherein said PMAC filter comprises high carbon ash.
210. The contaminant reuse system as described in clause 208, or any other clause, wherein said oxidizing agents are selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.
211. The contaminant reuse system as described in clause 149, or any other clause, and further comprising an ash pretreatment.
212. The contaminant reuse system as described in clause 211, or any other clause, wherein said ash pretreatment comprises an ash conditioner; lime; and oxide.
213. The contaminant reuse system as described in clause 149, or any other clause, and further comprising a waste pretreatment.

214. The contaminant reuse system as described in clause 213, or any other clause, wherein said waste pretreatment is selected from a group consisting of: ash; chemicals; minerals; fixate of oily wastes; pH adjuster; and a dewatering processor.

215. The contaminant reuse system as described in clause 149, or any other clause, and further comprising a pH monitor of said plurality of agglomerates configured to maintain a pH between about 10 to about 11 pH.

216. The contaminant reuse system as described in clause 149, or any other clause, wherein said plurality of agglomerates further comprises entraining agents.

217. The contaminant reuse system as described in clause 149, or any other clause, wherein said plurality of agglomerates further comprises an organic compound.

218. The contaminant reuse system as described in clause 217, or any other clause, wherein said organic compound is selected from a group consisting of a surfactant and air entraining admixture surfactants.

219. The contaminant reuse system as described in clause 149, or any other clause, wherein said agglomerates meet ASTM or AASHTO specifications.

220. A contaminant reuse system:
a plurality of agglomerates comprising waste from an oil and gas flocculant process, ash, and a first supply of Portland cement resulting from high energy mixing;
an agglomerates processor; and
a plurality of encapsulated agglomerates.

221. The contaminant reuse system as described in clause 220, or any other clause, wherein said waste from said oil and gas flocculant process comprises oil and gas exploration and production contaminated wastewater treatment flocculant.

222. The contaminant reuse system as described in clause 220, or any other clause, wherein said waste from said oil and gas flocculant process comprises a component selected from a group consisting of gasoline range organics, diesel range organics, heavy metals, lead, cadmium, arsenic, and any combination thereof.

223. The contaminant reuse system as described in clause 220, or any other clause, wherein said waste from said oil and gas flocculant process comprises a waste selected from a group consisting of Resource Conservation and Recovery Act (RCRA) wastes, Section C RCRA wastes, and Section D RCRA wastes.

224. The contaminant reuse system as described in clause 223, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.

225. The contaminant reuse system as described in clause 223, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.

226. The contaminant reuse system as described in clause 220, or any other clause, wherein said Portland cement is selected from a group consisting of Type I/II Portland cement, Type V Portland cement, and Type I/II/V Portland cement.

227. The contaminant reuse system as described in clause 220, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.

228. The contaminant reuse system as described in clause 220, or any other clause, wherein said high energy mixing comprises mixing said waste, said ash, and said Portland cement in a Hobart mixer for about one minute at a first speed; and continuing to mix said waste, said ash, and said Portland cement for two minutes at a higher speed.

229. The contaminant reuse system as described in clause 228, or any other clause, wherein said first speed comprises level one and said higher speed comprises level two.

230. The contaminant reuse system as described in clause 220, or any other clause, wherein said agglomerates further comprises water.

231. The contaminant reuse system as described in clause 220, or any other clause, wherein said agglomerates further comprises a chemical.

232. The contaminant reuse system as described in clause 231, or any other clause, wherein said chemical is selected from a group consisting of air entraining agents, retarding agents, chemical additives for Portland cement concrete, and any combination thereof.

233. The contaminant reuse system as described in clause 220, or any other clause, wherein said agglomerates further comprises fines.

234. The contaminant reuse system as described in clause 220, or any other clause, wherein said agglomerates comprises a sphere shape.

235. The contaminant reuse system as described in clause 220, or any other clause, wherein said agglomerates processer comprises a pelletizer.

236. The contaminant reuse system as described in clause 220, or any other clause, wherein encapsulated agglomerates comprises a first encapsulation.

237. The contaminant reuse system as described in clause 220, or any other clause, said agglomerates processer comprises a curing process.

238. The contaminant reuse system as described in clause 220, or any other clause, wherein said agglomerates comprises a screener.

239. The contaminant reuse system as described in clause 220, or any other clause, and further comprising recycled fines from said agglomerates processer and wherein said plurality of said agglomerates further comprises recycled fines.

240. The contaminant reuse system as described in clause 220, or any other clause, and further comprising a final aggregate with said encapsulated agglomerates.

241. The contaminant reuse system as described in clause 240, or any other clause, wherein said final aggregate is configured to be used in an application selected from a group consisting of Portland cement concrete, asphaltic construction applications, highway construction concrete, Jersey barriers, noise barriers, ornamental exterior products, payers, and roller compacted concrete.

242. The contaminant reuse system as described in clause 240, or any other clause, and further comprising a double encapsulation of said waste; said double encapsulating comprises said final aggregate coated with a second supply of Portland cement.

243. The contaminant reuse system as described in clause 240, or any other clause, and further comprising a double encapsulation of said waste; said double encapsulating comprises said final aggregate coated with a second supply of Portland cement and ash.

244. The contaminant reuse system as described in clause 242, or any other clause, wherein said double encapsulation further comprises a mixture of ash, Portland cement, and chemicals.

245. The contaminant reuse system as described in clause 220, or any other clause, wherein said agglomerates processer comprises a pelletizer of said agglomerates.

246. The contaminant reuse system as described in clause 245, or any other clause, and further comprising:
   a double encapsulation comprising said encapsulated agglomerates coated with a second supply of Portland cement;
   a double encapsulation processor comprising a blending processor, compacting processor, curing processor, reclaiming processor, crushing processor, and screening processor configured to produce a final aggregate.

247. The contaminant reuse system as described in clause 245, or any other clause, wherein said final aggregate is configured to be used in an application selected from a group consisting of Portland cement concrete, asphaltic construction applications, highway construction concrete, Jersey barriers, noise barriers, ornamental exterior products, payers, and roller compacted concrete.

248. The contaminant reuse system as described in clause 245, or any other clause, and further comprising a triple encapsulation comprising said final aggregate of said double encapsulation coated with a third supply of Portland cement.

249. The contaminant reuse system as described in clause 245, or any other clause, and further comprising a triple encapsulation comprising said final aggregate of said double encapsulation coated with a third supply of Portland cement and ash.

250. The contaminant reuse system as described in clause 248, or any other clause, wherein said triple encapsulation comprises a mixture of ash, Portland cement, and chemicals.

251. The contaminant reuse system as described in clause 220, or any other clause, wherein said agglomerates processor comprises a pelletizer processor;
   and further comprising:
   a double encapsulation comprising said encapsulated agglomerates coated with a second supply of Portland cement;
   a double encapsulation processor comprising a blending processor, compacting processor, curing processor, reclaiming processor, crushing processor, and screening processor;
   a triple encapsulation comprising said processed double encapsulation coated with a third supply of Portland cement; and
   a triple encapsulation processor comprising a reclaiming processor, crushing processor, and screening processor configured to produce a final aggregate.

252. The contaminant reuse system as described in clause 220, or any other clause, wherein said agglomerates processor comprises a pelletizer processor;
   and further comprising:
   a double encapsulation comprising said encapsulated agglomerates coated with a second supply of Portland cement and ash;
   a double encapsulation processor comprising a blending processor, compacting processor, curing processor, reclaiming processor, crushing processor, and screening processor;
   a triple encapsulation comprising said processed double encapsulation coated with a third supply of Portland cement and ash; and
   a triple encapsulation processor comprising a reclaiming processor, crushing processor, and screening processor configured to produce a final aggregate.

253. The contaminant reuse system as described in clause 251, or any other clause, wherein said final aggregate is configured to be used in an application selected from a group consisting of Portland cement concrete, asphaltic construction applications, highway construction concrete, Jersey barriers, noise barriers, ornamental exterior products, pavers, and roller compacted concrete.

254. The contaminant reuse system as described in clause 251, or any other clause, wherein said triple encapsulation comprises a mixture of ash, Portland cement, and chemicals.

255. The contaminant reuse system as described in clause 251, or any other clause, and further comprising a quadruple encapsulation comprising said final aggregate in a fourth supply of Portland cement.

256. The contaminant reuse system as described in clause 255, or any other clause, wherein said quadruple encapsulation comprises a mixture of ash, Portland cement, and chemicals.

257. The contaminant reuse system as described in clause 220, or any other clause, wherein said plurality of agglomerates further comprises waste from a fracturing process.

258. The contaminant reuse system as described in clause 257, or any other clause, wherein said waste from said fracturing process comprises back flow fluid waste and fracture sand.

259. The contaminant reuse system as described in clause 258, or any other clause, wherein said back flow fluid waste comprises waste water and fracturing fluid.

260. The contaminant reuse system as described in clause 257, or any other clause, wherein said waste from said fracturing process comprises a component selected from a group consisting of gasoline range organics, diesel range organics, heavy metals, lead, cadmium, arsenic, and any combination thereof.

261. The contaminant reuse system as described in clause 257, or any other clause, wherein said waste from said fracturing process comprises a waste selected from a group consisting of Resource Conservation and Recovery Act (RCRA) wastes, Section C RCRA wastes, and Section D RCRA wastes.

262. The contaminant reuse system as described in clause 261, or any other clause, wherein said Section D RCRA wastes are selected from a group consisting of produced waters, drilling fluids, drill cuttings, rigwash, well completion fluids, workover wastes, gas plant dehydration wastes, gas plant sweetening wastes, spent filters and backwash, packing fluids, produced sand, production tank bottoms, gathering line pigging wastes, hydrocarbon-bearing soil, and waste crude oil from primary Field Site.
263. The contaminant reuse system as described in clause 261, or any other clause, wherein said Section C RCRA wastes are selected from a group consisting of used fracture fluid/sand wastes, painting wastes, service company wastes, refinery wastes, used equipment lubrication oil, used hydraulic oil, waste solvents, waste compressor oil, sanitary wastes, boiler cleaning wastes, incinerator ash, laboratory wastes, transportation pipeline wastes, pesticide wastes, drums, insulation, and miscellaneous solids.
264. The contaminant reuse system as described in clause 220, or any other clause, wherein said plurality of agglomerates further comprises waste from base metal mining and processing.
265. The contaminant reuse system as described in clause 264, or any other clause, wherein said waste from said base metal mining comprises a component selected from a group consisting of tailings, gangue materials, treatment components from preventing release of metals, components from processing base metals; components from smeltering base metals; components from processing of slag; components from disposal of slag, ore, lead, chromium, zinc, copper, cadmium, and nickel.
266. The contaminant reuse system as described in clause 220, or any other clause, wherein said plurality of agglomerates further comprises waste from contaminated soil or hydrocarbon containing soil.
267. The contaminant reuse system as described in clause 266, or any other clause, wherein said contaminated soil comprise diesel contaminated soil.
268. The contaminant reuse system as described in clause 220, or any other clause, and further comprising a dewatering processor of said waste from said oil and gas flocculant process.
269. The contaminant reuse system as described in clause 268, or any other clause, wherein said dewatering processor comprises a water settler and a decant removal.
270. The contaminant reuse system as described in clause 268, or any other clause, wherein said dewatering processor is configured to add ash to said waste.
271. The contaminant reuse system as described in clause 270, or any other clause, wherein said ash is selected from a group consisting of ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.
272. The contaminant reuse system as described in clause 268, or any other clause, wherein said dewatering processor is selected from a group consisting of filtration, pressure filtration, centrifugal separation, oxidative additives, and any combination thereof.
273. The contaminant reuse system as described in clause 268, or any other clause, wherein dewatering processor comprises a flocculant shearer.
274. The contaminant reuse system as described in clause 268, or any other clause, wherein said dewatering processor comprises a sand filter configured to remove flocculant from water of said waste; and a flocculant feed to an aggregate production mix.
275. The contaminant reuse system as described in clause 274, or any other clause, wherein said dewatering processor further comprises a sand filtrate PMAC filter configured to provide a clean sand filtrate; and a clean sand filtrate feed to an aggregate production mix.
276. The contaminant reuse system as described in clause 275, or any other clause, wherein said PMAC filter comprises high carbon ash.
277. The contaminant reuse system as described in clause 275, or any other clause, wherein said dewatering processor further comprises an oxidizing agent configured to clean sand filtrate and provide clean water.
278. The contaminant reuse system as described in clause 277, or any other clause, wherein said oxidizing agents are selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.
279. The contaminant reuse system as described in clause 268, or any other clause, wherein said dewatering processor comprises:
a pressure filter of flocculant in said waste configured to provide a pressure filtrate and filtered flocculant;
a filtered flocculant shearer;
a sand filter configured to remove flocculant from water of said filtered flocculant;
a flocculant feed to an aggregate production mix;
a sand filtrate PMAC filter configured to provide a clean sand filtrate;
clean sand filtrate feed to an aggregate production mix;
an oxidizing agent configured to clean sand filtrate and provide clean water;
a pressure filtrate PMAC filter configured to provide a clean pressure filtrate;
a clean pressure filtrate feed to an aggregate production mix; and
an oxidizing agent configured to said clean pressure filtrate and to provide clean water.
280. The contaminant reuse system as described in clause 279, or any other clause, wherein said PMAC filter comprises high carbon ash.
281. The contaminant reuse system as described in clause 279, or any other clause, wherein said oxidizing agents are selected from a group consisting of oxygen, peroxides, chlorine, ozone, fluoride, hydrogen peroxide, nitric acid, peroxydisulfuric acid, peroxy mono sulfuric acid, air, ferrate, ferrate (IV), and any combination thereof.
282. The contaminant reuse system as described in clause 220, or any other clause, and further comprising an ash pretreatment.
283. The contaminant reuse system as described in clause 282, or any other clause, wherein said ash pretreatment comprises an ash conditioner; lime; and oxide.
284. The contaminant reuse system as described in clause 220, or any other clause, and further comprising a waste pretreatment.
285. The contaminant reuse system as described in clause 284, or any other clause, wherein said waste pretreatment is selected from a group consisting of: ash; chemicals; minerals; fixate of oily wastes; pH adjuster; and a dewatering processor.
286. The contaminant reuse system as described in clause 220, or any other clause, and further comprising a pH monitor of said plurality of agglomerates configured to maintain a pH between about 10 to about 11 pH.

287. The contaminant reuse system as described in clause 220, or any other clause, wherein said plurality of agglomerates further comprises entraining agents.
288. The contaminant reuse system as described in clause 220, or any other clause, wherein said plurality of agglomerates further comprises an organic compound.
289. The contaminant reuse system as described in clause 288, or any other clause, wherein said organic compound is selected from a group consisting of a surfactant and air entraining admixture surfactants.
290. The contaminant reuse system as described in clause 220, or any other clause, wherein said agglomerates meet ASTM or AASHTO specifications.

As can be easily understood from the foregoing, the basic concepts of the present invention may be embodied in a variety of ways. It involves both encapsulation techniques as well as devices to accomplish the appropriate encapsulation system. In this application, the encapsulation techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements, Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "mixture" should be understood to encompass disclosure of the act of "mixing"—whether explicitly discussed or not—and, conversely, were there effectively disclosure of the act of "mixing", such a disclosure should be understood to encompass disclosure of a "mixture" and even a "means for mixing" Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any acts of law, statutes, regulations, or rules mentioned in this application for patent; or patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed below or in any other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

1. U.S. Patents

| Pat. No. | Kind Code | Date Issued | Patentee |
| --- | --- | --- | --- |
| 3,765,920 | | 1973 Oct. 16 | Humphrey |
| 3,959,172 | | 1976 May 25 | Brownell et al. |
| 4,206,080 | | 1980 Jun. 3 | Sato et al. |
| 4,234,632 | | 1980 Nov. 18 | Lubowitz |
| 4,250,134 | | 1981 Feb. 10 | Minnick |
| 4,344,796 | | 1982 Aug. 17 | Minnick |
| 4,539,119 | | 1985 Sept. 3 | Cann |
| 4,687,373 | | 1987 Aug. 18 | Falk et al. |
| 4,772,330 | | 1988 Sept. 20 | Kobayashi et al. |

-continued

| Pat. No. | Kind Code | Date Issued | Patentee |
|---|---|---|---|
| 4,880,582 | | 1989 Nov. 14 | Spanjer et al. |
| 5,002,611 | | 1991 Mar. 26 | Rademaker |
| 5,037,286 | | 1991 Aug. 6 | Roberts |
| 5,100,473 | | 1992 Mar. 31 | Mitsuda et al. |
| 5,152,837 | | 1992 Oct. 06 | Rademaker |
| 5,211,750 | | 1993 May 18 | Smith et al. |
| 5,286,430 | | 1994 Feb. 15 | Downs et al. |
| 5,342,442 | | 1994 Aug. 30 | Nechvatal et al. |
| 5,364,572 | | 1994 Nov. 15 | Wu et al. |
| 5,669,969 | | 1997 Sept. 23 | Meade et al. |
| 6,334,895 | | 2002 Jan. 1 | Bland |
| 6,416,691 | B1 | 2002 Jul. 9 | Pildysh |
| 6,517,631 | B2 | 2003 Feb. 11 | Bland |
| 6,808,562 | B2 | 2004 Oct. 26 | Bland |
| 7,754,169 | B2 | 2010 Jul. 13 | Constantz et al. |

2. U.S. Patent Application Publications

| Publication No. | Kind Code | Date Published | Patentee |
|---|---|---|---|
| 20050059849 | A1 | 2005 Mar. 17 | Liu |
| 20080237141 | A1 | 2008 Oct. 2 | Kerfoot |
| 20090245939 | A1 | 2009 Oct. 1 | Burns et at |
| 20130243674 | A1 | 2013 Sept. 19 | Constantz et al. |

| IP No. | Country Code | Kind Code | Date Published/Issued | Patentee |
|---|---|---|---|---|

Thus, the applicant(s) should be understood to have support to claim and make a statement of invention to at least: i) each of the encapsulation devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC,* 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 10 or any other claim" or the like, it could be re-drafted as dependent on claim 1, claim 9, or even claim 11 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A method for reusing contaminants comprising the steps of:
   providing waste from a fracturing process;
   providing ash;
   providing a first supply of Portland cement;
   high energy mixing said waste from said fracturing process, said ash, and said Portland cement to create a plurality of agglomerates;
   processing said agglomerates;
   encapsulating said agglomerates:
   providing a final aggregate with said encapsulated agglomerates;
   adding said final aggregate to a second supply of Portland cement; and
   providing a double encapsulation of said waste.

2. The method for reusing contaminants as described in claim 1 wherein said ash chosen from ash from flue gas desulfurization technologies; ash from wet scrubbers; ash from wet flue gas desulfurization technologies; ash from dry scrubber flue gas desulfurization technologies; ash from spray driers; ash from sorbent injection technologies; ash from fluidized bed combustion; fly ash; bottom ash; fluidized bed combustion bed ashes; Class C ash; Class F ash; pozzolanic fly ashes; pulverized fuel ashes; ashes from combustion of carbonaceous fuels; or any combination thereof.

3. The method for reusing contaminants as described in claim 1 wherein said step of high energy mixing said waste from said fracturing process, said ash, and said Portland cement to create said agglomerate comprises the steps of mixing said waste, said ash, and said Portland cement in a Hobart mixer for about one minute at a first speed; and continuing to mix said waste, said ash, and said Portland cement for two minutes at a higher speed.

4. The method for reusing contaminants as described in claim 1 and further comprising a step of adding a chemical into a mixture of said waste from said fracturing process, said ash, and said Portland cement.

5. The method for reusing contaminants as described in claim 4 wherein said chemical chosen from air entraining agents, retarding agents, chemical additives for Portland cement concrete, and any combination thereof.

6. The method for reusing contaminants as described in claim 1 wherein said agglomerates comprises a sphere shape.

7. The method for reusing contaminants as described in claim 1 wherein said step of processing said agglomerates comprises a step of pelletizing said agglomerates.

8. The method for reusing contaminants as described in claim 1 wherein said step of encapsulating said agglomerates comprises a step of coating said agglomerates with said Portland cement to create a first encapsulation of said wastes.

9. The method for reusing contaminants as described in claim 1 wherein said step of processing said agglomerates comprises a step of curing said agglomerates.

10. The method for reusing contaminants as described in claim 1 wherein said step of processing said agglomerates comprises a step of screening said agglomerates.

11. The method for reusing contaminants as described in claim 1 and further comprising the steps of producing fines from a processing step and adding said fines to a mixture of said waste, said ash, and said Portland cement.

12. The method for reusing contaminants as described in claim 1 and further comprising a step of using said final aggregate in an application chosen from Portland cement concrete, asphaltic construction applications, highway construction concrete, Jersey barriers, noise barriers, ornamental exterior products, pavers, and roller compacted concrete.

13. The method for reusing contaminants as described in claim 1 and further comprising the steps of adding said final aggregate to a third supply of Portland cement; and providing a triple encapsulation of said waste.

14. The method for reusing contaminants as described in claim 1 and further comprising the steps of adding said final aggregate to a third supply of Portland cement and ash; and providing a triple encapsulation of said waste.

15. The method for reusing contaminants as described in claim 1 and further comprising a step of pretreating said waste.

16. The method for reusing contaminants as described in claim 15 wherein said step of pretreating said waste comprises a step chosen from adding ash to said waste; add chemicals to said waste; add minerals to said waste; fixate oily wastes; adjust a pH of said waste; and dewater said waste.

17. The method for reusing contaminants as described in claim 1 and further comprising a step of maintaining a pH of a mixture of said waste from said fracturing process, said ash, and said Portland cement between about 10 to about 11 pH.

18. The method for reusing contaminants as described in claim 1 and further comprising a step of adding entraining agents to a mixture of said waste from said fracturing process, said ash, and said Portland cement.

19. The method for reusing contaminants as described in claim 1 wherein said agglomerate meets ASTM or AASHTO specifications.

20. The method for reusing contaminants as described in claim 1 and further comprising the steps of determining a selection of said ash comprising:
   assessing sources of said ash, said waste, and said Portland cement;
   assessing chemical and mineral characteristics of said waste, said ash, and said Portland cement;
   conduct laboratory testing with high energy mixing of said waste, said ash, and said Portland cement to create a mixed composite;
   curing said mixed composite;
   assessing an attribute of said cured mixed composite chosen from strength development, linear expansion, freeze/thaw resistance, soundness, abrasion, and leaching;
   modifying said waste, said ash, or said Portland cement with a pre-treatment to adjust an attribute of said assessing an attribute step;
   retesting with high energy mixing of said modified mixture of said waste, said ash, and said Portland cement to create a mixed composite;

assessing said cured composite for a level of waste and a ratio of Portland cement to waste.

\* \* \* \* \*